United States Patent [19]
Kisaichi et al.

[11] Patent Number: 5,786,776
[45] Date of Patent: Jul. 28, 1998

[54] CHARACTER INPUT TERMINAL DEVICE AND RECORDING APPARATUS

[75] Inventors: Kazuhiro Kisaichi, Hino; Nobuhiro Inoue, Hachioji; Toshihiko Nannichi, Fuchu; Jitsu Iwaki, Kunitachi; Toshiro Nose, Sagamihara; Katsunari Sasaki, Tachikawa; John Riley, Hino, all of Japan

[73] Assignee: Kabushiki Kaisha Toshiba, Kanagawa-ken, Japan

[21] Appl. No.: 614,246

[22] Filed: Mar. 12, 1996

[30] Foreign Application Priority Data

Mar. 13, 1995 [JP] Japan ................... 7-052183

[51] Int. Cl.$^6$ ................................................. H03K 17/94
[52] U.S. Cl. ........................... 341/23; 341/21; 341/22; 364/709.12; 364/710.08; 395/796
[58] Field of Search .................. 341/20, 21, 22, 341/23; 345/169, 173; 379/52, 96; 395/760, 794, 796; 364/709.11, 709.12, 709.14, 709.15, 710.05, 710.07, 710.08

[56] References Cited

U.S. PATENT DOCUMENTS

| | | | |
|---|---|---|---|
| 4,872,196 | 10/1989 | Kisaichi et al. | 379/58 |
| 5,128,672 | 7/1992 | Kaehler | 341/23 |
| 5,200,988 | 4/1993 | Riskin | 379/52 |

*Primary Examiner*—Michael Horabik
*Assistant Examiner*—Andrew Hill
*Attorney, Agent, or Firm*—Finnegan, Henderson, Farabow, Garrett & Dunner, L.L.P.

[57] ABSTRACT

Texts including required message are entered with a small number of keys such as those of a cellular telephone. In this case, a conversion table is unnecessary and the number of key operations is reduced. The number of input characters or input character strings composed by sequentially selecting one from a plurality of alphabets distributed to sequentially entered keys is relevant to the number of operation keys (N) raised to the number of distributed character (M) power (=NM) including meaningless characters or character strings and, with respect to these, character conversion is executed by referring to a dictionary means, through the operation of the conversion next candidate key. The dictionary means stores numeric strings and words of meaningful characters or character strings among the said characters and character strings.

25 Claims, 74 Drawing Sheets

FIG.6

| MEM1 | | | | MEM2 | | | |
|---|---|---|---|---|---|---|---|
| OUT 3 | OUT 2 | OUT 1 | OUT 0 | 2 | 1 | 0 | SET VALUE |
| 0 | 1 | 1 | 1 | "1" | "2" | "3" | |
| 1 | 1 | 1 | 1 | "4" | "5" | "6" | SET VALUE |
| 1 | 1 | 1 | 1 | "7" | "8" | "9" | |
| 1 | 1 | 1 | 1 | "*" | "0" | "#" | |
| | | | M2 | 0 | 1 | 1 | |
| | | | M1 | 1 | 0 | 1 | VALUE OF LATCH 25 |
| | | | M0 | 1 | 1 | 0 | |

| CODE | WORD | OTHER DICTIONARY INFORMATION |
|---|---|---|
| 86596 | Tokyo | * * * * * |
| 566366 | London | * * * * * |
| 92824 | watch | * * * * * |
| 25625 | clock | * * * * * |

FIG.11

| |
|---|
| SINGLE CHARACTER WORD |
| 2 CHARACTER WORD |
| 3 CHARACTER WORD |
| 4 CHARACTER WORD |
| 5 CHARACTER WORD |
| : |
| n CHARACTER WORD |

| KEY TYPE | CANDIDATE ORDER (PMEM) | | | |
|---|---|---|---|---|
| | 1 | 2 | 3 | 4 |
| 1 | 2 | 4 | 5 | |
| 2 | 1 | 5 | 3 | |
| 3 | 2 | 6 | 5 | |
| 4 | 1 | 5 | 7 | |
| 5 | 2 | 6 | 8 | 4 |
| 6 | 3 | 5 | 9 | |
| 7 | 4 | 8 | 5 | |
| 8 | 7 | 5 | 9 | 0 |
| 9 | 6 | 8 | 0 | |
| 0 | 8 | | | |

FIG.38

| CODE | CANDIDATE | PROPERTY INFORMATION |
|---|---|---|
| 9274464866 | Washington | PLACE,PERSON'S NAME |
| 86596 | Tokyo | PLACE (PLACE NAME) |
| 566366 | London | PLACE (PLACE NAME) |
| 639 | new | GENERAL |
| 2665 | book | GENERAL |
| 5646 | John | PERSON'S NAME |
| 263739 | Andrew | PERSON'S NAME |
| 8674422 | Toshiba | ASSOCIATION |
| 272624 | branch | ASSOCIATION |
| 6666 | noon | TIME |
| 16125625 | 1 O'clock | TIME |
| 26125625 | 2 O'clock | TIME |

77 INSTRUCTION CONTENT MEMORY

| MODE | PROPERTY INSTRUCTION CONTENT |
|---|---|
| COMMUNICATION | 0 |
| DATA COMMUNICATION | 0 |
| CHARACTER INPUT | INSTRUCTION BY KEY INPUT |
| TELEPHONE NUMBER REGISTRATION | aaa |
| FIXED PHRASE 1 | bbb |
| RETRIEVAL 1 | PLACE NAME |
| RETRIEVAL 2 | ASSOCIATION NAME |
| RETRIEVAL 3 | ccc |
| ⋮ | ⋮ |

FIG.50

HIGHER 4 BIT →

LOWER 4 BIT ↓

|   | 4 | 5 | 6 | 7 |
|---|---|---|---|---|
| 0 |   | P |   | p |
| 1 | A | Q | a | q |
| 2 | B | R | b | r |
| 3 | C | S | c | s |
| 4 | D | T | d | t |
| 5 | E | U | e | u |
| 6 | F | V | f | v |
| 7 | G | W | g | w |
| 8 | H | X | h | x |
| 9 | I | Y | i | y |
| A | J | Z | j | z |
| B | K |   | k |   |
| C | L |   | l |   |
| D | M |   | m |   |
| E | N |   | n |   |
| F | O |   | o |   |

FIG.53

This_is_a_pen. _That_is_a_book.

FIG.54 shift +
T H I S _ I S _ A _ P E N . _ T H A T shift +
I S _ A _ B O O K .

FIG.55 caps T caps H I S _ I S _ A _ P E N . _ caps T caps H A T _ I S _ A _ B O O K .

|   | あ<br>A | い<br>I | う<br>U | え<br>E | お<br>O |
|---|---|---|---|---|---|
| K | か<br>KA | き<br>KI | く<br>KU | け<br>KE | こ<br>KO |
| S | さ<br>SA | し<br>SI | す<br>SU | せ<br>SE | そ<br>SO |
| T | た<br>TA | ち<br>TI | つ<br>TU | て<br>TE | と<br>TO |
| N | な<br>NA | に<br>NI | ぬ<br>NU | ね<br>NE | の<br>NO |
| H | は<br>HA | ひ<br>HI | ふ<br>HU | へ<br>HE | ほ<br>HO |
| M | ま<br>MA | み<br>MI | む<br>MU | め<br>ME | も<br>MO |
| Y | や<br>YA |  | ゆ<br>YU |  | よ<br>YO |
| R | ら<br>RA | り<br>RI | る<br>RU | れ<br>RE | ろ<br>RO |
| W | わ<br>WA |  |  |  | を<br>WO |

FIG.60

| CODE | KANA | CHINESE CHARACTER | OTHER DICTIONARY INFORMATION |
|---|---|---|---|
| 41281 | とうきょう | 東京 | ＊＊＊＊＊＊ |
| 528 | なごや | 名古屋 | ＊＊＊＊＊＊ |
| 2814 | きょうと | 京都 | ＊＊＊＊＊＊ |
| 1132 | おおさか | 大阪 | ＊＊＊＊＊＊ |

FIG.61

| |
|---|
| SINGLE CHARACTER WORD |
| 2 CHARACTER WORD |
| 3 CHARACTER WORD |
| 4 CHARACTER WORD |
| 5 CHARACTER WORD |
| : |
| n CHARACTER WORD |

FIG.64

| ENGLISH | LED | AUTUMN | POND | TAB |
|---|---|---|---|---|
| JAPANESE (CHINESE CHARACTER) | AKA (赤) | AKI (秋) | IKE (池) | OKE (桶) |

| ENGLISH | TOKYO | OFFER | ---------- |
|---|---|---|---|
| JAPANESE | 東京 | 提供 | ---------- |
| JAPANESE READING | TOKIYOU | TEIKIYOU | ---------- |

FIG.66

$$\begin{array}{ll} GA & が \\ GI & ぎ \\ GU & ぐ \\ GE & げ \\ GO & ご \end{array} \begin{pmatrix} KA & か \\ KI & き \\ KU & く \\ KE & け \\ KO & こ \end{pmatrix} \quad \begin{array}{ll} ZA & ざ \\ JI & じ \\ ZU & ず \\ ZE & ぜ \\ ZO & ぞ \end{array} \begin{pmatrix} SA & か \\ SI & き \\ SU & く \\ SE & け \\ SO & こ \end{pmatrix} \quad \begin{array}{ll} DA & だ \\ DI & ぢ \\ DZU & づ \\ DE & で \\ DO & ど \end{array} \begin{pmatrix} TA & た \\ TI & ち \\ TU & つ \\ TE & て \\ TO & と \end{pmatrix}$$

FIG.67

$$\begin{array}{ll} BA & ば \\ BI & び \\ BU & ぶ \\ BE & べ \\ BO & ぼ \end{array} \begin{pmatrix} HA & は \\ HI & ひ \\ HU & ふ \\ HE & へ \\ HO & ほ \end{pmatrix} \quad \begin{array}{ll} PA & ぱ \\ PI & ぴ \\ PU & ぷ \\ PE & ぺ \\ PO & ぽ \end{array} \begin{pmatrix} HA & は \\ HI & ひ \\ HU & ふ \\ HE & へ \\ HO & ほ \end{pmatrix}$$

| DESTINATION IDENTIFICATION | RANGE INFORMATION |
|---|---|
| AAA | KANA |
| BBB | CHINESE CHARACTER |
| CCC | KANA |
| ⋮ | ⋮ |
|  |  |

| CODE | KANA | CANDIDATE | PROPERTY INFORMATION |
|---|---|---|---|
| 1281 | とうきょう | 東京 | PLACE NAME |
| 528 | なごや | 名古屋 | PLACE NAME |
| 2814 | きょうと | 京都 | PLACE NAME |
| 1132 | おおさか | 大阪 | PLACE NAME |
| 3060 | しんぶん | 新聞 | GENERAL |
| 1511 | いのうえ | 井上 | PERSON'S NAME |
| 4136 | とうしば | 東芝 | ASSOCIATION NAME |
| 65 | ひの | 日野 | PLACE NAME |
| 3 | し | 市 | PLACE NAME |
| 2068141 | こんぴゅーた | コンピュータ | GENERAL |
| 400 | でんわ | 電話 | GENERAL |
| 2431 | ください | 下さい | GENERAL |
| 79 | まる | 。 | SYMBOL |
| 6 | ぶ | 部 | ASSOCIATION NAME |
| 2 | か | 課 | ASSOCIATION NAME |

FIG.84

MATRIX CHARACTER DISPOSITION TABLE

| COLUMN \ ROW | 1 | 2 | 3 | 4 | 5 | 6 | 7 | 8 | 9 | 0 |
|---|---|---|---|---|---|---|---|---|---|---|
| 1 | あ | い | う | え | お | A | B | C | D | E |
| 2 | か | き | く | け | こ | F | G | H | I | J |
| 3 | さ | し | す | せ | そ | K | L | M | N | O |
| 4 | た | ち | つ | て | と | P | Q | R | S | T |
| 5 | な | に | ぬ | ね | の | U | V | W | X | Y |
| 6 | は | ひ | ふ | へ | ほ | Z | : | ' | , | . |
| 7 | ま | み | む | め | も | * | / | + | − | = |
| 8 | や | ( | ゆ | ) | よ | # | ¥ | · | % | $ |
| 9 | ら | り | る | れ | ろ | ! | ? | ~ | < | > |
| 0 | わ | を | ん | ° | ˝ | @ | ♂ | ♀ | ℃ | |

FIG.85

DESIRED INPUT CHARACTER : clock

NUMERAL TO BE INPUT : 1837301836

FIXED PHRASE CODE TABLE

| CODE | MESSAGE CONTENT |
|------|----------------|
| 00 | CANCEL MESSAGE. |
| 01 | CALL OFFICE. |
| 02 | SELL IT. |
| 03 | CHEER US. |
| 04 | CARRY OUT. |
| 05 | REPORT CONDITION. |
| 06 | WAIT THERE. |
| 07 | CALL ME WHEN YOU ARE FREE. |
| 08 | CALL HOME. |
| 09 | BUY IT. |

FIG.88 input word : clock number : 22255566622255☐

CHARACTER INPUT TERMINAL DEVICE AND RECORDING APPARATUS

FIELD OF THE INVENTION

The present invention relates to a character input device and a character input method and more particularly to the character input device and method adopted for a device such as mobile information terminals for which the number of keys is restricted.

DESCRIPTION OF THE PRIOR ART

In the prior art, various character input devices such as cellular telephone are provided using mobile information terminals. First, as shown in FIG. 83 it is known to use ten key (dial key) 203 disposed four by three from the center toward the bottom on the front of a of a cellular telephone handset 201. Regarding input methods,the following two methods are known.

In the first method, a character matrix table as shown in FIG. 84 is employed. The correspondence between a pair of digits and a character (symbol) should be memorized. Referring to the table, a character (symbol) may be input by entering a pair of digits corresponding to the matrix of the desired character (symbol). For instance, for entering "clock", "1837301836" should be pushed on a ten key 203 as shown in FIG. 85. Then, "clock" corresponding to the string of numeric pairs would be displayed on a display section 202 of a cellular telephone shown in FIG. 83.

In the second method, the correspondence between numeric codes and fixed phrases is memorized; and a code corresponding to the desired fixed phrase is entered by pressing the ten key 203 referring to a fixed-phrase code table. For example, suppose that fixed phrase character code strings are stored in correspondence with binary codes as shown in FIG. 86. In this case, if "call office" should is the desired entry, "01" should be input by operating the ten key 208.

Then "call office" corresponding to the input code would be displayed in the display section 202 of the cellular telephone shown in FIG. 83.

In the character input methods, however, key input can not be executed. In principle, without a conversion table. On the other hand, a cellular telephone is known wherein a plurality of alphabets is distributed to respective key of the ten key 208 as shown in FIG. 87. In such a device, the correspondence between the frequency of key presses and characters is memorized. When the frequency of key operation of each key is equal to one, the leftmost one of corresponding indicated characters is input; and when the frequency is increased by one, the character which will be input shifts by one column to the right. For instance, for entering "clock", "22255566622255" should be pressed on the ten key 203, as shown in FIG. 88. As the result, "clock" corresponding to the frequency of key operation will be displayed in the display section 202 of the cellular telephone shown in FIG. 83.

Such a character input device makes the forementioned conversion table unnecessary, but the key operation frequency increases considerably so as to, sometimes provoke, entering error if one falls to count operation frequency exactly.

U.S. Pat. No. 4,872,196 discloses another method, but it requires also some troublesome key operation.

For entering Japanese language, the pun method is adopted to play on words with numbers for arranging numbers to input the readings of number for pager or others. For instance, the numeral "1" can read as "ichi" and "9" as "ku"; so the reading "i" may be adopted for the numeral "1" and combined with the reading "ku" of the numeral "9", the numeric string "19" can read as "iku". As the Japanese word "iku" means "go" in English, "19" is entered to obtain a Chinese character meaning "go". In this method, however, it is presumed that one is familiar with such complicated numerical play on words and the message contained therein. An additional objection is that such unreasonable readings of numeric strings may not always transmit the contents of the messages and therefore the interlocutor will not always understand one's intent.

DISCLOSURE OF THE INVENTION

It is an object of the present invention to provide a character input method and a character input device requiring no conversion table and allowing one to input necessary messages or other inputs without increasing key operation frequency and Another object of the present invention is to provide a character input device requiring no conversion table though characters are inputs through numeric keys and allowing the input of necessary messages without increasing key operation frequency independent of languages used.

Another object of the present invention is to provide a character input device allowing confirmation of the operation of an intended key by means of a display.

Moreover, another object of the present invention is to provide a character input device allowing selection of the desired word by displaying candidates when a plurality of words correspond to the key operation.

Moreover, another object of the present invention is to provide a character input device allowing selection of the intended word or character from among a plurality of candidate words or characters corresponding to the key operation, by touching the portion of a display screen corresponding to the intended word or character.

Additionally, still another object is to provide a character input device allowing to obtain an appropriate word or character even if the input is not correct.

Furthermore, still another object is to provide a character input device allowing to limitation of the transmitted character code to an appropriate range among a plurality of character systems when the concerned language is composed of a plurality of character systems such as Japanese.

Moreover, still another object is to provide a character input device outputting candidate character or candidate word considering the property of the input character or the input character string.

Also, still another object is to provide a character input device outputting a phrase with a capital initial.

Moreover, still another object is to provide a character input device allowing to input Japanese.

The character input device of the present invention comprises a dictionary means storing the correspondence of input character or input character string and candidate character or candidate character string obtained as the result of conversion, an input means for entering characters or character strings including a plurality of keys to which a plurality of characters is distributed, a conversion/next candidate key for directing character conversion and a decision key for deciding the conversion result, an output means for at least displaying and outputting candidate character or candidate character string obtained as the result of conversion, and a character conversion means for obtaining candidate character or candidate character string, by retrieving the said dictionary means, for the input character or the input character string entered from said input means as the result of conversion and for supplying this candidate character or candidate character string to the said output means. As a result of such composition, when one operates keys to which a plurality of characters is distributed and presses the conversion/next candidate key, for the input character or character string, the dictionary means will be retrieved to obtain the candidate character or candidate character string and this candidate character or candidate character string will be supplied to the output means. Numeric keys to which a plurality of characters is distributed are adopted as the plurality of keys.

In the foregoing, kana are distributed to the plurality of key for composing a character input device for Japanese input. In another composition, alphabets are distributed to the plurality of keys for composing a character input device for alphabetic input. In other compositions, characters of a desired language are distributed to the plurality of keys for composing a character input device for the input of the corresponding language.

In the character input device of the present invention, when a key of the input means to which characters are distributed is operated, a code corresponding to this key is detected and supplied to the output means for display. For example, a numeral, an alphabet, a hira-kana or a kata-kana corresponding to the operated key is displayed as it is.

In the character input device of the present invention, when a key of the input means to which characters are distributed is operated, the dictionary means will be retrieved to obtain the candidate character or candidate character string and this candidate character or candidate character string will be supplied to the output means for display. In this case, preferably, the first candidate character or candidate character string is supplied for display.

In the character input device of the present invention, when the dictionary means is retrieved for obtaining candidate character or candidate character string and a plurality of candidate characters or candidate character strings are found, these candidate characters or candidate character strings are supplied to the output means by the predetermined number for display. Moreover, one candidate character or candidate character string may be selected from the displayed plurality of candidate characters or candidate character strings.

In the character input device of the present invention, a touch panel is provided in the display section of candidate character or candidate character string of the output means and when an input operation is executed on the touch panel of the display section of candidate character or candidate character string, the concerned operation position is detected for confirming the conversion result based on the correspondence of this result of detection and the display position of candidate character or candidate character string.

In the character input device of the present invention, when candidate character or candidate character string can not be obtained in the processing of the character conversion means, modification will be made on the input character or input character string for revocation in this case, preferably, the last character of the input character string is deleted for reconvert the input character string. In another approach, a candidate table is provided for keys which might be operated erroneously during the key operation and the input character or input character string may be modified according to this candidate table.

The character input device of the present invention comprises a transmission means for transmitting the confirmed character or character string and a range information acquisition means for obtaining range information of character codes which can be processed by the receiving party terminal and the character conversion means retrieves the dictionary means based on the range information of the receiving party terminal obtained by the said range information acquisition means. In this case, preferably, it is provided a range information table for correlating identification information of the receiving party terminal and the range information of character codes which can be processed and the dictionary means is retrieved based on the range information obtained from the said range information table according to the identification information of the receiving party terminal.

In the character input device of the present invention, the property of input character of input character string is determined based on information to be entered. For obtaining candidate character or candidate character string by retrieving the dictionary means, the candidate character or candidate character string corresponding to the determined property information is obtained and by supplying the said output means with this candidate character or candidate character string, only candidate character or candidate character string having the property which agrees with the property determined above will be displayed by the output means. In this case, preferably, it is provided an instruction content memory storing the correspondence of a plurality of modes concerned with the processing and the instruction content for obtaining the property and the mode in process will be detected, the instruction content corresponding to this mode is obtained from the said instruction content memory for obtaining the property of character or character string concerned with the input base on the concerned instruction content. In another composition, it is provided a cursor position memory storing correlated property information of character or character string concerned with the input corresponding the cursor position, during the input of character or character string for obtaining the property of character or character string concerned with the input base on the cursor display position and the said cursor position memory. On the other hand, in another example, the composition permits to obtain the property of input concerned character or character string in accordance with the instruction content of the property of further input concerned character or character string and when an operator instructs the property, the property of further input concerned character or character string can be specified, and then only candidate character or candidate character string having the property which agrees with the specified property will be displayed by the output means.

In the character input device of the present invention, the head of input phrase is detected automatically and this head is automatically output in capital initial. In this case, when one or more space code or a return code proceeds a character and follows a period, the character is taken as the leading character and capitalized.

The character input device of the present invention is mounted on a cellular telephone and comprises the composition of the character input device disclosed above. This would permit to input characters on a cellular telephone so as to realize, without saying address book, phrase accumulation, message communication with an interlocutor by a cellular telephone. Indicators or keys on a cellular telephone will be used as character input means.

The character input device of the present invention is characterized by that, when a string which is meaningful when the string is composed by sequentially selecting any one alphabet corresponding to respective key operation among a plurality of alphabets generated by each key operation through the key operation using a ten key to which a plurality of alphabets are distributed respectively is input by using a word dictionary registered corresponding to the numeric string representing the key name on the ten key and sequentially operating keys to which desired alphabets are attributed among numeric keys to which the said plurality of alphabets are distributed respectively, the said word dictionary is retrieved based on the numeric string representing the name of the operated key for obtaining a word which is a character or a character string.

In place of said alphabets characters of different language may be attributed. In Japanese, for instance, hira-kana or kata-kana may be employed. Moreover, key indicators of a cellular telephone may be adopted as key or indicator. Still in another example, a representative character of the plurality of alphabets, hira-kana or kata-kana attributed to keys is displayed before the operation of a conversion key.

BRIEF DESCRIPTION OF DRAWINGS

FIG. 6 is a composition diagram of a memory table included in the input control section, essential part of the character input device shown in FIG. 3.

FIG. 10 is a schematic composition diagram of the dictionary, essential part of the character input device shown in FIG. 3.

FIG. 11 is a concrete composition diagram of the dictionary, essential part of the character input device shown in FIG. 3.

FIG. 18 is a diagram for illustrating the display procedure of the character input device according to the second embodiment of the present invention.

FIG. 33 is a diagram for illustrating the inside of the error correction table, essential part of the character input device according to the eighth embodiment of the present invention.

FIG. 38 is a composition diagram of the word dictionary of the character input device according to the ninth embodiment of the present invention.

FIG. 50 is a diagram for illustrating codes of lower case and capital letters of alphabet.

FIG. 53 is a diagram illustrating the input result by the character input device of FIG. 48 and FIG. 52.

FIG. 54 is a diagram for illustrating the procedure of character input operation by a conventional method.

FIG. 55 is a diagram for illustrating the procedure of character input operation by another conventional method.

FIG. 56 is a diagram for illustrating the procedure of character input operation by the character input device shown in FIG. 48 and FIG. 52.

FIG. 59 is a diagram for illustrating hira-kana matrix.

FIG. 60 is a schematic composition diagram of the dictionary, essential part of the character input device shown in FIG. 3.

FIG. 61 is a concrete composition diagram of the dictionary, essential part of the character input device corresponding to Japanese input.

FIG. 64 is a diagram for illustrating the Japanese input method using the character input method of the present invention.

FIG. 65 is a diagram for illustrating the Japanese input method using the character input method of the present invention.

FIG. 66 is a diagram for illustrating the Japanese input method using the character input method of the present invention.

FIG. 67 is a diagram for illustrating the Japanese input method using the character input method of the present invention.

FIG. 82 is a flowchart illustrating the operation of the dictionary retrieval section, essential part of the character input device corresponding to Japanese input of the present invention.

FIG. 84 is a diagram showing a conversion table used for the conventional character input.

FIG. 85 is a diagram for illustrating the character input operation by the conversion table of FIG. 84.

Figure 88:
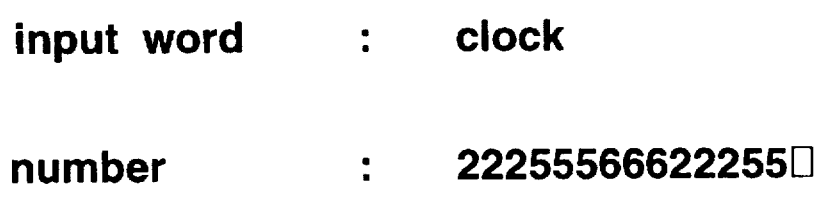

FIG. 88 is a diagram for illustrating the character input operation by the ten key of FIG. 87.

DESCRIPTION OF PREFERRED EMBODIMENTS

Figure 1:
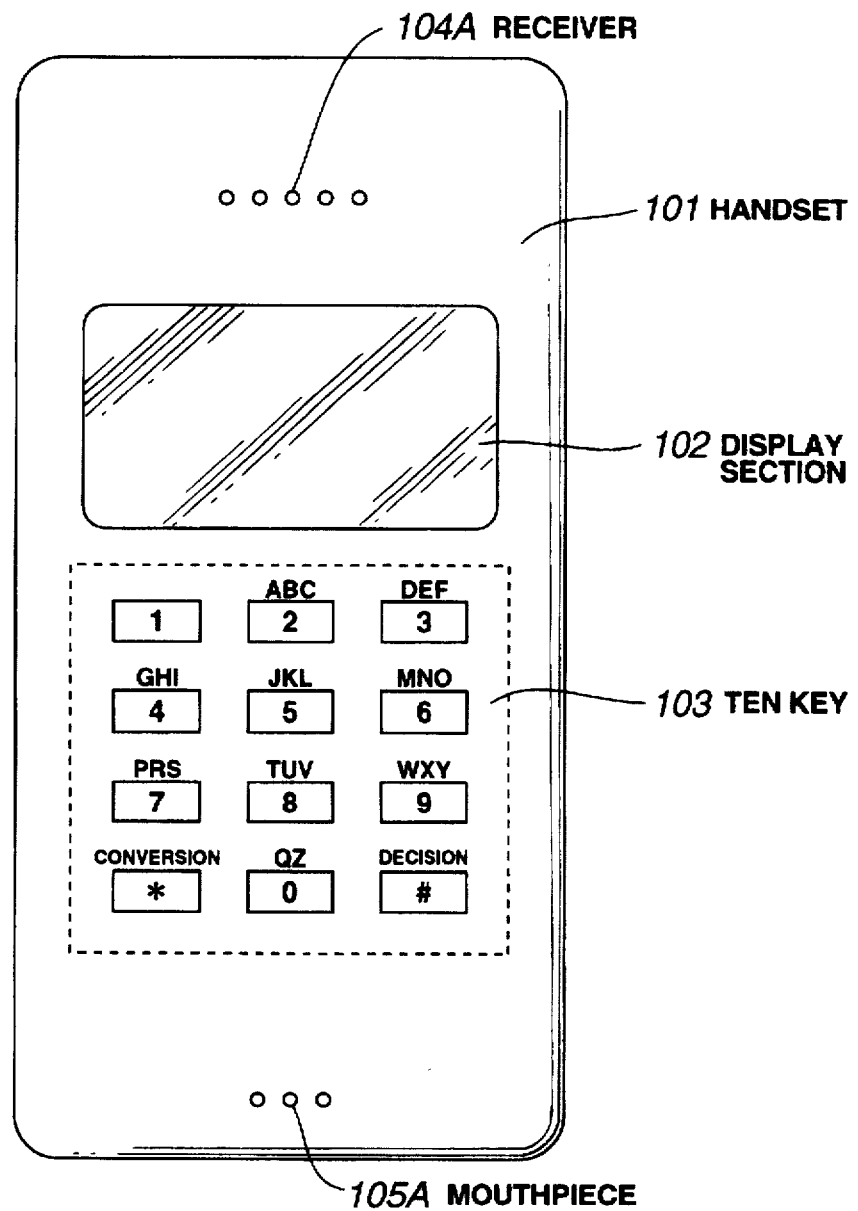
FIG. 1 is a front view of a cellular telephone including the character input device according to an embodiment of the present invention.

FIG. 1 is a front view of a cellular telephone including the character input device according to an embodiment of the present invention. A handset 101 is composed of a rather flat rectangular parallelopipedal case, a ten key (dial key) 103 comprising keys in 4 rows 3 columns from the center to the bottom of the surface thereof and a display section 102 for displaying characters, symbols or other information at the top thereof. Above the display section 102, there is provided a receiver section 104A for listening to the transmitted voice, and below the ten key 103, there is provided a mouthpiece section 105A for inputting the voice.

Figure 2:
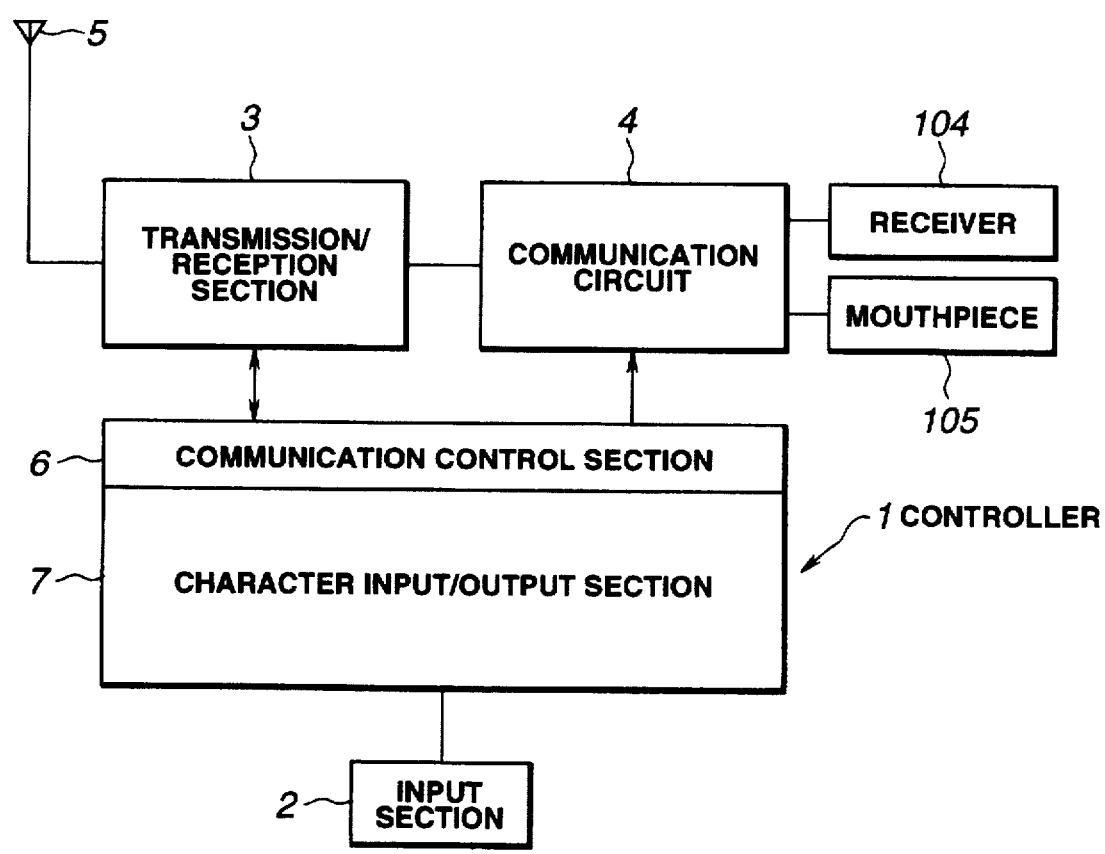
FIG. 2 is a composition diagram of a cellular telephone including the character input device according to an embodiment of the present invention.

FIG. 2 illustrates the inner composition diagram of the forementioned cellular telephone. The cellular telephone comprises a controller 1 for controlling respective parts, a input section 2 for entering information, an antenna 5 for transmitting receiving a radio wave, a transmission/reception section 3 connected to the antenna 5 for transmitting/receiving signals and a communication circuit 4 for emitting/receiving voice signals between this transmission/reception section 3 and the receiver 104/mouthpiece 105. The receiver 104 and mouthpiece 105 correspond respectively to the receiver section 104A and mouthpiece section 105A of FIG. 1. The controller 1 comprises a communication control section 6 for controlling the communication and a character input/output section 7 for processing character input/output according to the input from the input section 2. The communication control section 6 performs sending control in response to the input from the input section 2, call in control in response to call-accepted signal incoming through the antenna 5 and the transmission/reception section 3, amplitude adjustment in respect of the communication circuit 4 or other controls. Moreover, the communication control section 6 have a function to send through the transmission/reception section data transferred from the character input/output section 7 and to transfer the received data to the character input/output section 7. The input section 2 includes a mode selector switch for switching over between the operation mode as telephone and the operation mode as character input device. This mode selector switch may be a hook switch and, if a hook switch is employed, the operation mode as character input device is selected during on-hook condition.

Figure 3:
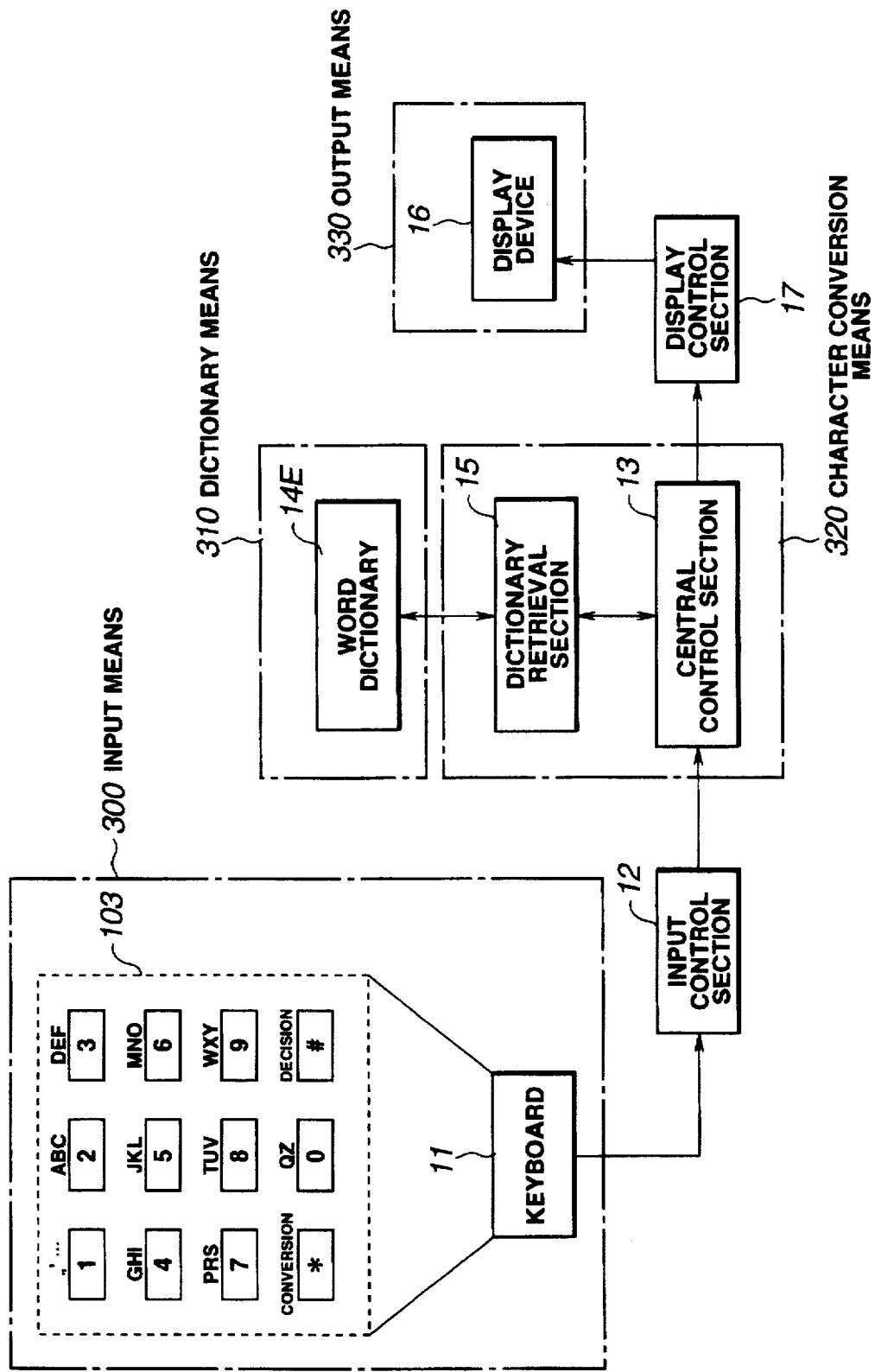
FIG. 3 is a composition diagram of the character input device according to the first embodiment of the present invention.

FIG. 3 is a composition diagram of the cellular telephone of FIG. 1 when it is put in the operation mode of character input device. This composition shows the portion comprising the input section 2 and the character input/output section 7 of FIG. 2.

The character input device includes a keyboard 11 for entering characters or others, an input control section 12 for collection information of key operation on the keyboard 11 and for delivering to a central control section 13, a central control section 13 for integrally control respective sections of the character input device, a word dictionary 14B which is a dictionary means 310 storing the correspondence between input character or input character string and candidate character or candidate character string as the result of conversion, a dictionary retrieval section 15 for retrieving the corresponding candidate character or candidate character string referring to the word dictionary 14E concerning the input character or character string delivered from the central control section 13, a display device 16 comprising LCD or others for displaying characters or other information, and a display control section 17 for controlling the control for displaying candidate character or candidate character string or others on the display device 18 under the control of the central control section. A plurality of alphabetic letters are distributed to respective numeric keys of the ten key 103 of the keyboard 11. Namely, in the usual dial key disposition, three letters, "A", "B" and "C" of the alphabet are allocated to the numeric key "2", three letters, "D", "E" and "F" of the alphabet are allocated to the numeric key "3" and so on up to the key "0". However no letter is allocated to the key "1" or period, comma, apostrophe or other symbols are allocated as mentioned below. To the key "0" are allocated "Q" and "Z". Moreover, "*" key is used as conversion key for directing conversion and retrieval of the next candidate, and "#" key is used as decision key for selecting and confirming the desired word when it is displayed. In the foregoing, the keyboard 11 comprises a plurality of keys to which a plurality of alphabetic letters is allocated, a conversion key for directing character conversion and a decision key for confirming the result of conversion so as to constitute an input means 300. The display device 16 constitutes an output means 330 for at least displaying and outputting candidate character or candidate character string as the result of conversion. The central control section 13 and the dictionary retrieval section 15 constitute a character conversion means 320 for obtaining candidate character or candidate character string through retrieval of the dictionary means 310 in respect of a character corresponding to a key or of a plurality of characters corresponding to a plurality of keys entered from the input means 300, and for supplying the output means 330 with this candidate character or candidate character string.

Figure 4:
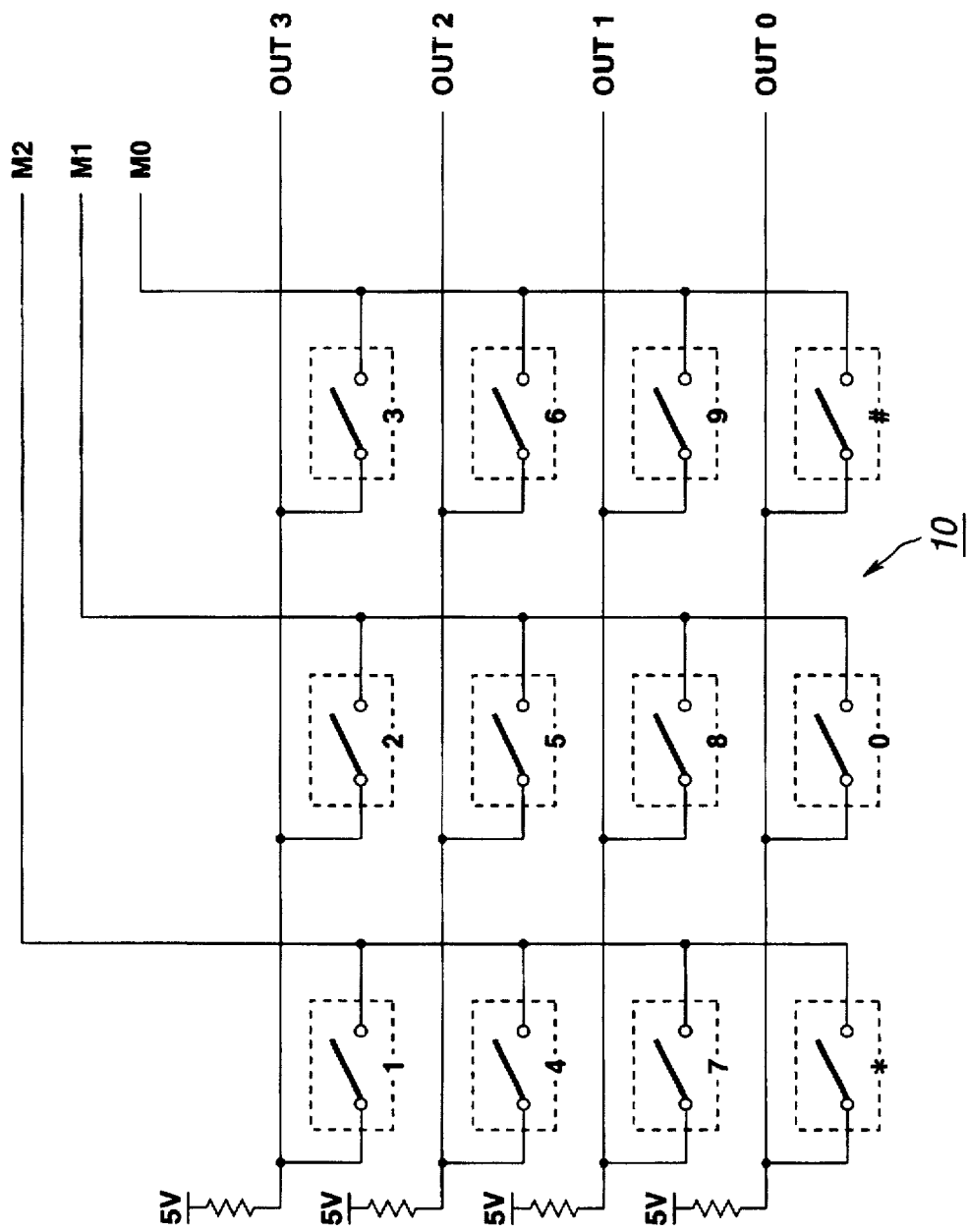
FIG. 4 is a composition diagram of the key matrix section, essential part of the character input device shown in FIG. 3.

FIG. 4 is a composition diagram of the said keyboard 11. Each key of the ten key 103 is provided with a key matrix 10, one contact of respective switch is constantly supplied with the power of 5V via a pull-up resistor and a line Out 0–Out 3 along the row and the line Out 0–Out 3 along the row terminates at the control section 12. On the other hand, the other contact of the respective switch of the key matrix 10 is connected to the line M0–M2 along the column, and the line M0–K2 along the column terminates at the input control section.

Figure 5:
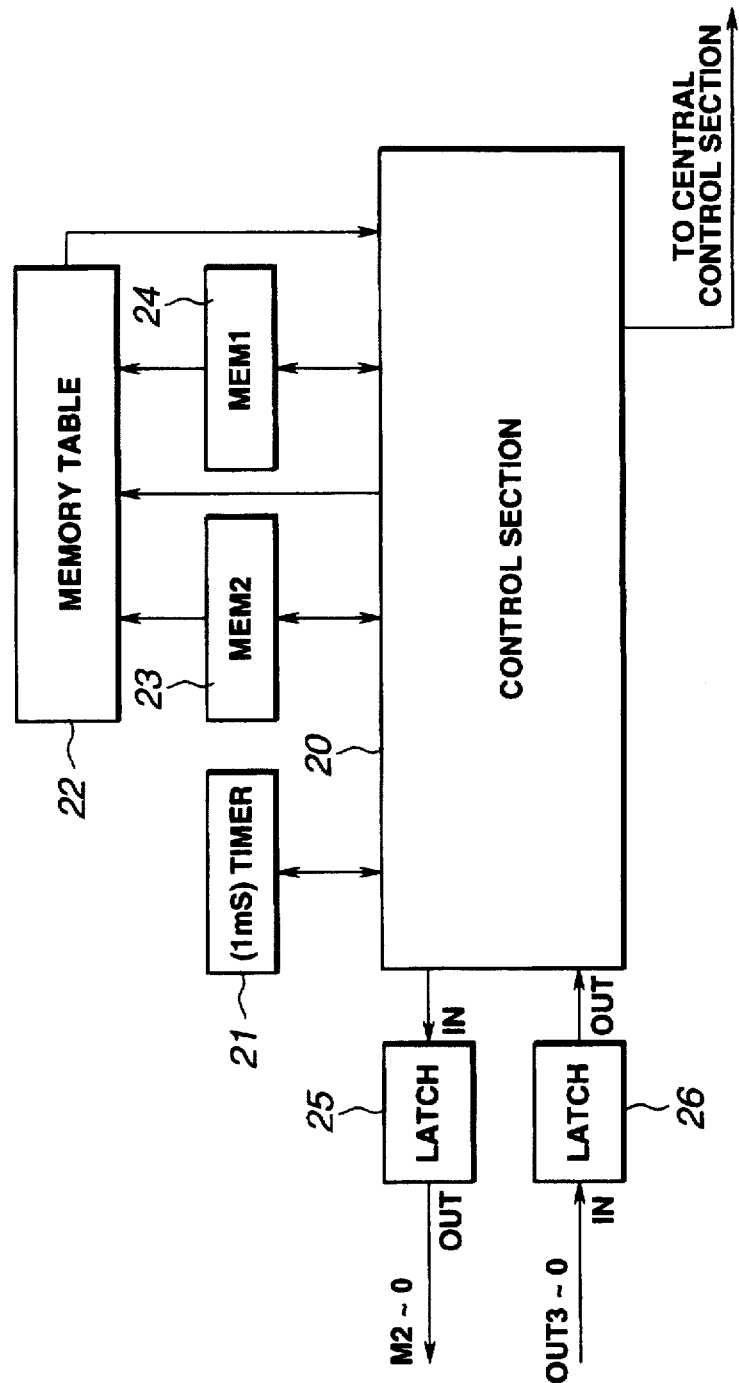
FIG. 5 is a composition diagram of the input control section, essential part of the character input device shown in FIG. 3.

On the other hand, FIG. 5 is a composition diagram of the input control section 15. The input control section 12 comprises a control section for integral control, a timer 21, a memory table 22, a memory (MEM2) 23, a memory (MEM1) 24 and latches 25, 26. The latch 25 is a circuit for latching a drive signal to the line M0–M2 along the column supplied from the control section 20 and the latch 26 is a circuit for taking and latching the signal of the line Out1–Out3 along the row. The timer 21 is arranged to remove chattering which appears during the key operation and to notify the control section 20 with predetermined time interval (1 mS) for the double reading of the key operation. The drive signal delivered to the latch 25 is set in the memory 23, while the detection signal held by the latch 26 at that time is set in the memory 24. The memory table 22 stores the data for specifying the operated key, the content thereof is shown in FIG. 6. In other words, when the data to be set in the memory 23 is respectively the set value "1", "2" and "3" of MEM2 in FIG. 6, 3 patterns arranged in row making M2–M0 of 3 rows under MEM2 one set correspond respectively, showing that they are set in the latch 25. Therefore, when one of 3 patterns arranged in row making M2–M0 of 3 rows under MEM2 one set is set in the latch 25, one of numerals of the set value "1", "2" and "3" of MEM2 in FIG. 6 is set in the memory 23. One of 4 patterns making Out0–Out3 along right 4 rows of MEM1 in FIG. 6 one set is set in the latch 26 and this value is set in the memory 24. As a result, the numeral of the intersection of one of 4 patterns of MEM1 in FIG. 6 and one of set values "1", "2" and "3" of MEM2 represent the numeral of the operated key. For instance, when "1" is set in the memory 23 and "1011" is set in the memory 24, the memory table 22 outputs a code representing "5" key. It shows that "(M2–M0=)101" is set in the latch 25.

The control section 20 reads the key according to the program of the flowchart shown in FIG. 7, so the operation of the control section will be described referring to this flowchart. First, the signal is latched by a latch 25 for outputting "0" to all of lines M0–M2 along the column (S1), then the appearance of "0" on any of lines Out0–Out3 along the row based on the signal latched by a latch 26 (S2). When "0" appears, it waits 1 mS referring to a timer 21 (S3) and the signal of the lines Out0–Out3 in row direction is taken to be sent in a memory 24 (S4). It also comprises the steps of waiting 1 mg referring to the timer 21 (S5), taking the signal of lines Out0–Out3 in row direction form the latch 26 and detecting if it is equal to the content already set in the memory 24 (S6). Here, if it is not equal, the operation continues by returning to the step S2 while the result of the first and the second reads is identical, the signal "110(–M2M1M0)" is latched by the latch 25 for outputting "0" only to the line M0 in column direction, "0" is set in the memory 23 (S7) and it is detected where does "0" exist among the signals or lines Out–Out3 in row direction latched by the latch 26 (S8). In other words, when "0" is delivered only to the line M0 in column direction. If one of 4 keys connected to the line M0 in column direction of FIG. 4 is operated, "0" appears on one of signals of lines Out0–Out3 in row direction. Here, if "0" does not appear on any of signals of lines Out0–Out3 in row direction, the signal "101" is latched by the latch 25 for outputting "0" only to the line M1 in column direction, "1" is set in the memory 23 (S9) and it is detected where does "0" exist among the signals of lines Out–Out3 in row direction latched by the latch 26 (S10). In other words, when "0" is delivered only to the line M1 in column direction, if one of 4 keys connected to the line M1 in column direction of FIG. 4 is operated, "0" appears on one of signals of lines Out0–Out3 in row direction. Here again, if "0" does not appear on any of signals of lines Out0–Out3 in row direction, the signal "011" is latched by the latch 25 for outputting "0" only to the line M2 in column direction, "2" is set in the memory 23 (S11) and it is detected where does "0" exist among the signals of lines Out–Out3 in row direction latched by the latch 26 (S12). In other words, when "0" is delivered only to the line M2 in column direction, if one of 4 keys connected to the line M2 in column direction of FIG.4 is operated, "0" appears on one of signals of lines Out0–Out3 in row direction.

As the result of the forementioned processing, in any case, if "0" does not appear on any of lines Out0–Out3 in row direction, the operation continues by returning to the step S1 while if "02" appears on any signal of lines Out0–Out3 in row direction in any of the said steps S8, S10 and S12, the signal of lines Out0–Out3 in row direction is taken from the latch 26 and set in the memory 24 (S13). Next, the control section 20 direct the memory table 22 to output, as a result, the memory table 22 is retrieved based on the signal set in memories 23, 24 (S14),and the code corresponding to the key output form the memory table 22 is delivered to the central control section 13. Then, the signal is latched by the latch 25 for delivering "0" to all of lines M0–M2 in column direction (S15), it is detected if all of lines Out0–Out3 in row direction become (return to) "1" (S16) and, if all "1" is obtained, after waiting 1 mS after the detection referring to the timer 21 (S17), it is detected if all of lines Out0–Out3 in row direction become (return to) "1" (S18) and, if all "1" is obtained, the operation continues by returning to the step S1. Thus, a code showing which key of the ten key 103 is operated (for instance, a code corresponding to a numeral) is delivered to the central control section 13.

Figure 8:
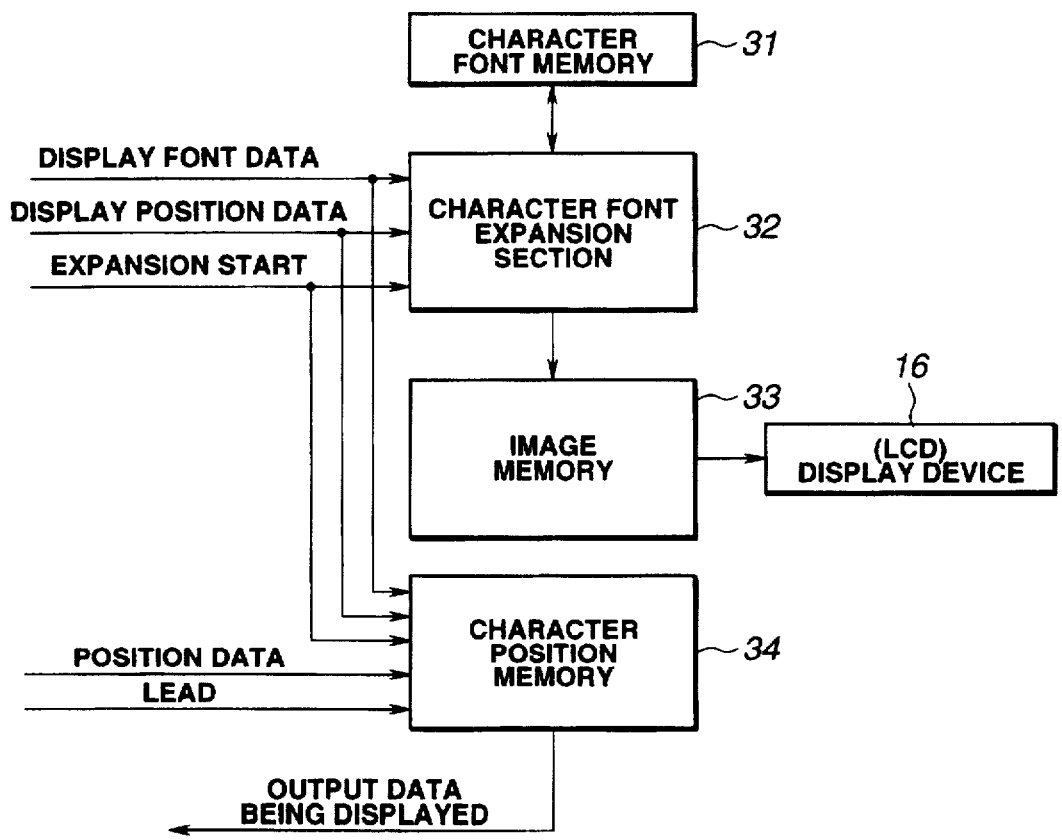
FIG. 8 is a composition diagram of the display control section, essential part of the character input device shown in FIG. 3.

FIG. 8 is a detailed composition diagram of the display control section 17 of the character input device. The display control section 17 comprises a character font memory 31 storing character font (character pattern), a character font expansion section 32 for expanding this font stored in the character font memory in a image memory 33 under the control of the central control section 13, an image (bit map) memory 33 for holding by bit map the image data to be displayed on a (LCD) display device 16 and a character position memory 34 for storing the display font data (character code) being displayed with the display position.

The said display control section 17 is supplied with display font data, display position data, expansion start instruction signal and position data (address) of the character position memory 34 from the central control section 13. Namely, when the display font data is delivered with the expansion start instruction signal, the character font expansion section 32 accesses the character font memory 31 to take out he display font corresponding to the delivered display font data and stores in the corresponding position of the image memory 33 based on the display position data (coordinates of the image memory 33). As the result, the data position of the image memory 33 corresponding in one-to-one relation to the pixel of the image of LCD display device 16, the pixel data of the display font expanded at the concerned position will be memorized. On the other hand, the character position memory 34 stores the display font data and the display position data at the location of the position data delivered from the central control section 13. As the central control section 13 can read it by means of a lead signal, it can read the data being displayed (display font data) with its display position data and transmit to the other terminal via the communication control section 6, the transmission/reception section 3 and the antenna 5 of FIG. 2, or perform other processing.

Figure 9:
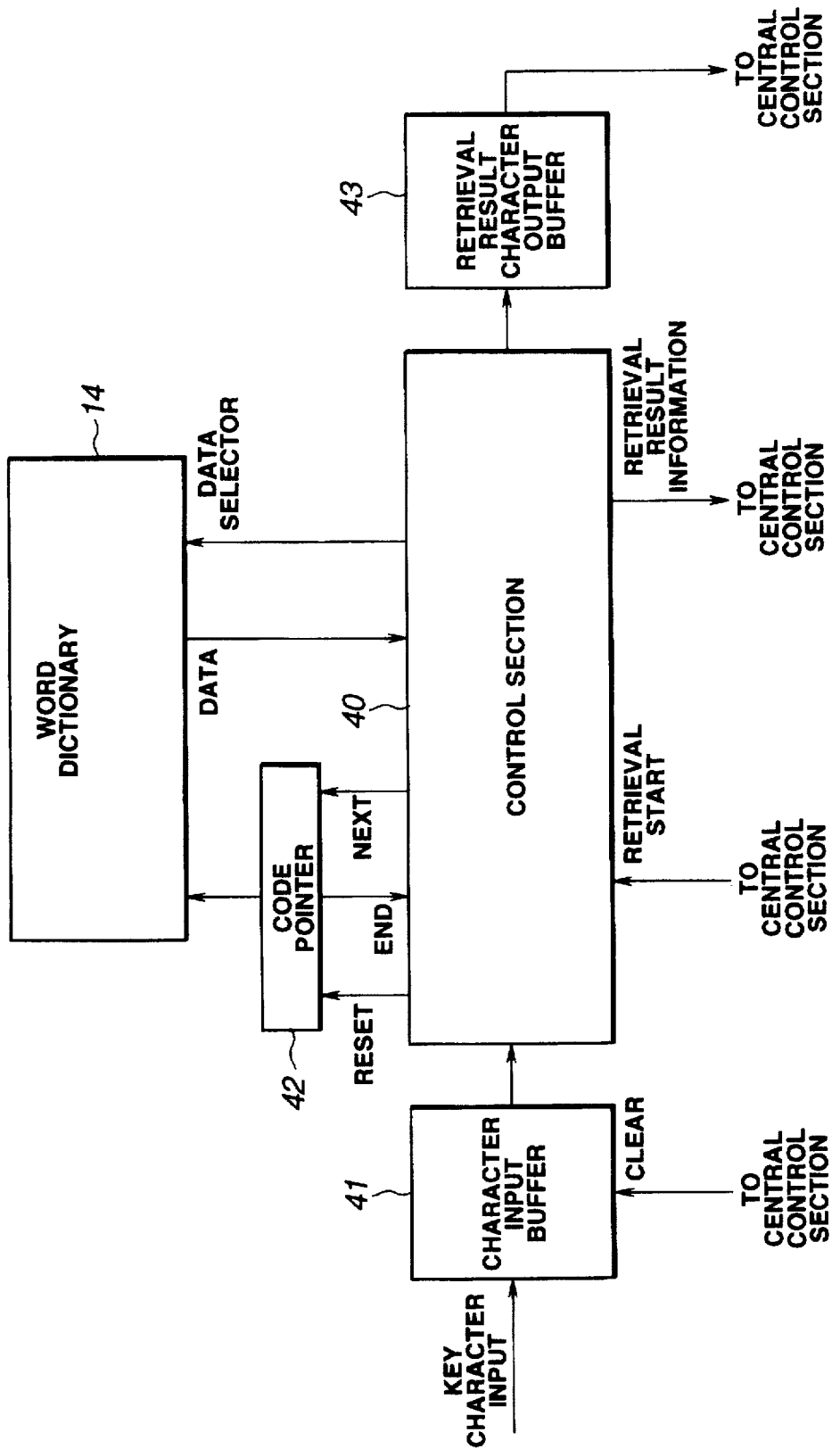
FIG. 9 is a composition diagram of the dictionary retrieval section, essential part of the character input device shown in FIG. 3.

FIG. 9 is a detailed composition diagram of the dictionary retrieval section 15 of the said character input device. The dictionary retrieval section 15 comprises a control section 40 for integrally controlling the entire dictionary retrieval section 15, a character input buffer 41 for storing character or character string entered from the key, a code pointer 42 used for the dictionary retrieval of the word dictionary 14E and a retrieval result character output buffer 43 for holding codes of candidate character or character string obtained by the dictionary retrieval.

Figure 12:
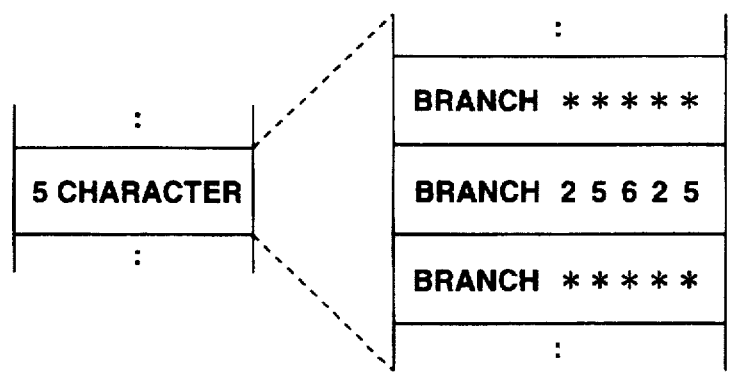
FIG. 12 is a composition diagram of essential parts of the dictionary shown in FIG. 11.
Figure 13:
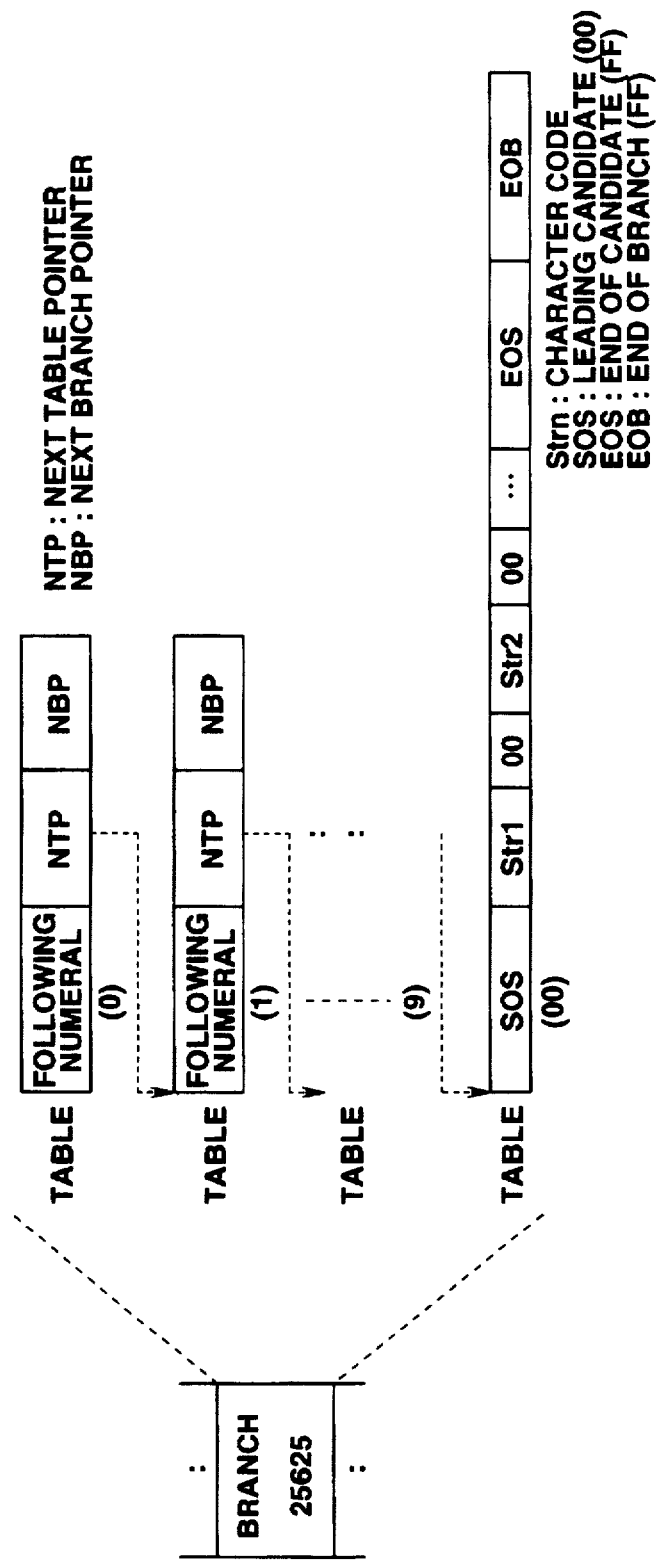
FIG. 13 is a more detailed concrete composition diagram of the essential section of the dictionary shown in FIG. 12.

FIG. 10 shows the content memorized in the word dictionary 14E. Namely, in correspondence to the numeric code by the operation of the ten key 103, dictionary information comprising alphabetic character or character string (word), property information including article, location, time and other information are stored in correspondence at each other. To be more specific, the word dictionary 14E is composed as shown in FIG. 11 to FIG. 13. First, the word dictionary 14E is composed of blocks divides into character number unit as shown in FIG. 11. As shown in FIG. 12, the block corresponding to respective number of characters is composed of a plurality of branches corresponding to numeric string of the concerned number of characters. Here, a plurality of branches corresponding to numeric strings of 5 characters exists in the block of 5 characters and the branch corresponding to the numeric string "25625" among them is shown explicitly while the specific numeral is shown by "*" in other branches. Moreover, FIG. 13 shows the content of the branch corresponding to the numeric string "25625". The branch contains tables corresponding to the following numerals (0) to (9) if they exist (two tables if only (1) and (8) exist as the following numeral) and a table corresponding to SOS(00) indicating the leading candidate corresponding to the numeric string when there is no following numeral. The table corresponding to the following numerals (0) to (9) contains corresponding following numerals, a pointer NTP of the next table and a pointer NBP of the next branch in set. On the other hand, the table corresponding to SOS (00) contains a code SOS(00) indicating the leading candidate of the case when no following numeral exist (corresponding to the numeric string "25625" in this case), a character or character string code Str1–Strn (represent n candidates by character code from 1 to n), a code EOS (FF) indicating the end of candidate character or candidate character string code and a code EOB (PP) indicating the end of the branch in set. If a plurality of candidates exist, the code SOS(00) is registered also between respective ones of the plurality of candidates. If the property information should be memorized, it is set after the character code Str1–Strn of the respective candidate with a symbol indicating the property information.

If a plurality of candidate character or candidate character string exist as mentioned above, it is because a plurality of alphabetic letters are allocated to a single key. For instance, when "6" key is operated and then "6" key is operated, as "6" key corresponds to "M", "N" and "O", among string inputs by the combination of any of "M", "N" and "O" corresponding to the first operation of "6" key and any of "M", "N" and "O" corresponding to the next operation of "6" key, as meaningful candidate character strings, words "on", "no" or others exist. While for the numeric string "25625" shown as example in FIG. 13, as meaningful words, "clock", "block" or others exist. In the present invention, it is adopted a method wherein the input is made by sequentially operating the key to which the desired character is allocated among a plurality of keys to which a plurality of characters are allocated respectively. The strings meaningful when they are composed by selecting any one character corresponding to the respective key operation among a plurality of characters generated by the respective key operation through this input are memorized in the word dictionary 14E in string correspondence by the key name (for instance, in correspondence with numeral string if it is numeric key) and the dictionary is retrieved based on the string be the name of the operated key for obtaining a character or character string (word).

Figure 14:
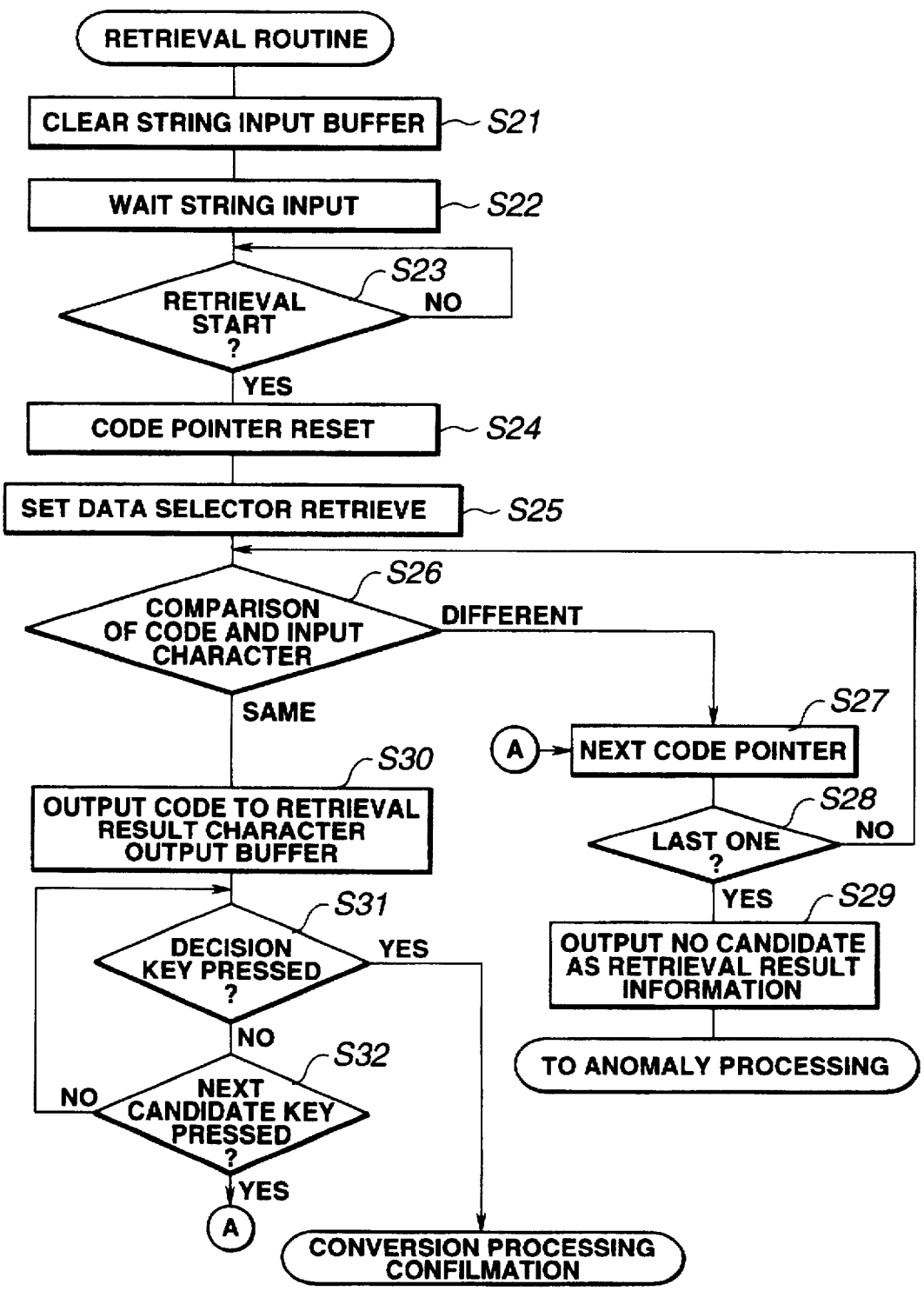
FIG. 14 is a flowchart for illustrating the operation of the dictionary retrieval section, essential part of the character input device shown in FIG. 3.

The control section 40 of the word dictionary 14E shown in FIG. 9 processing the retrieval of the word dictionary 14E according to the program of the flowchart shown in FIG. 14, the operation of the control section 40 will be described according to this flowchart. The control section 40 clears a character input buffer 41 (S21) and waits for the arrival of the code of input character or input character string (code of numeric key) (S22). In this example, the operator wants to enter "clock" as input character as shown in ST1 in FIG. 15. There, the operator operates the corresponding key of the ten key of a cellular telephone. Different from the ten key 103 of FIG. 1, alphabetic letters are indicated directly on the rounded key top of the ten key 103 in FIG. 15. This shows that an appropriate input can be made both by the ten key 103 in the form of FIG. 1 or this ten key 103 of FIG. 15 for this character input device. The numeric key of the ten key 103 is operated "25625" as shown by ST2 in FIG. 15. It is shown that the operator made input desiring the encircled word "clock" among alphabetic letters corresponding to "25625" of ST2.

Figure 7:
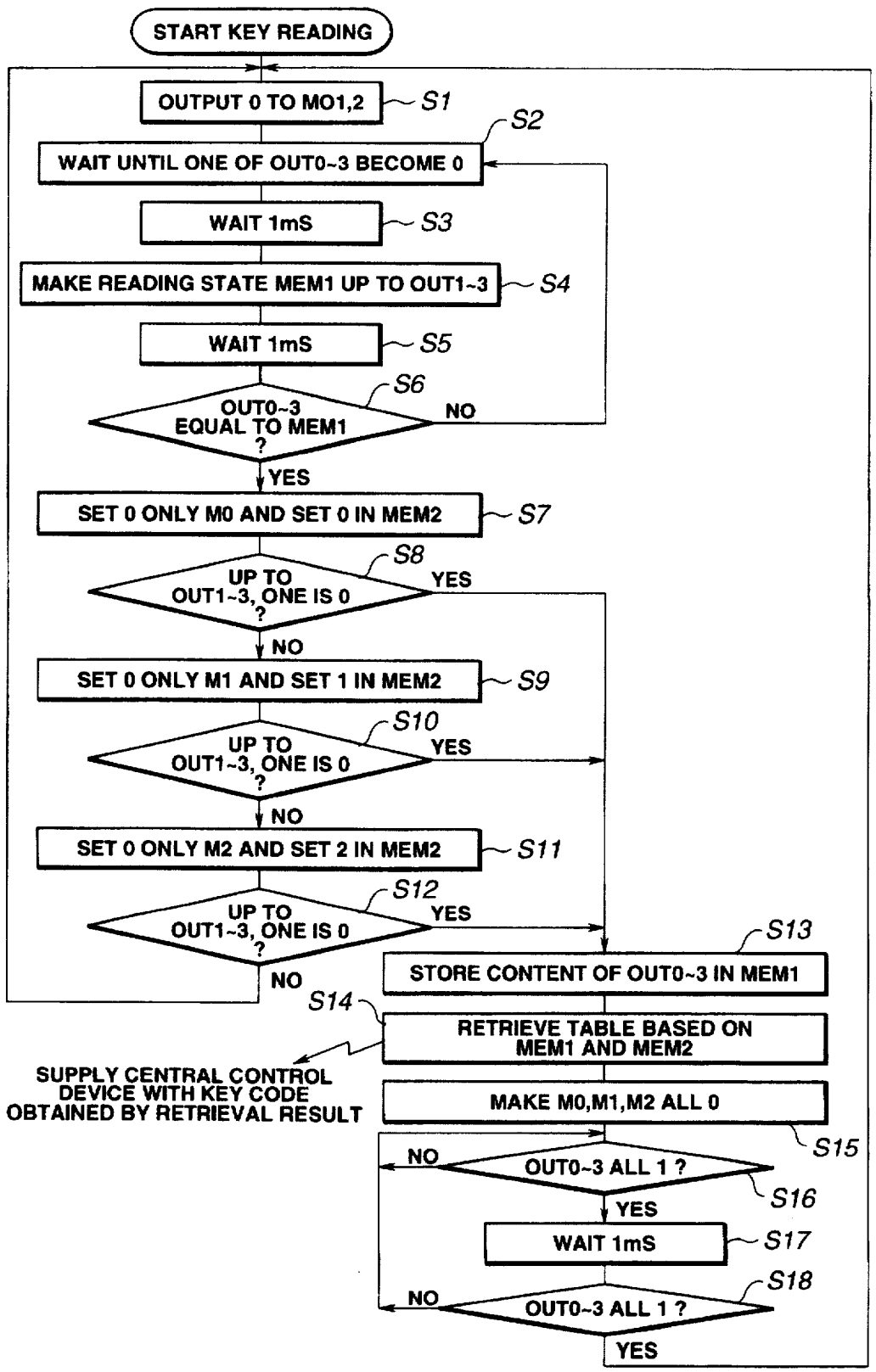
FIG. 7 is a flowchart for illustrating the operation of the input control section, essential part of the character input device shown in FIG. 3.

Then, by the operation of the input control section 12 described for FIG. 7, a code corresponding to the operated numeric key is obtained and a code string corresponding to the said "25625" is stored in the character input buffer 41. Next, the operator presses "*" key, that is conversion/next candidate key for conversion as shown by ST3 in FIG. 15. The operation of this "*" is also converted into a code by the operation of the input control section 12 described for FIG. 7 and then delivered to the central section 13. On reception, the central control section 13 transmits a retrieval start signal to the central control section 40 of FIG. 9. There, as shown in FIG. 14, the control section 40 monitoring the retrieval start (S23) resets a code pointer 42 (S24) and put a data selector signal in set state (S25). Next, the control section 40 takes out codes stored in the character input buffer 41 from the beginning and start the retrieval from the block of single character of the word dictionary 14E. The retrieval procedure is identical for any number, so the description will begin with the retrieval in the block of 3 characters.

Figure 16:
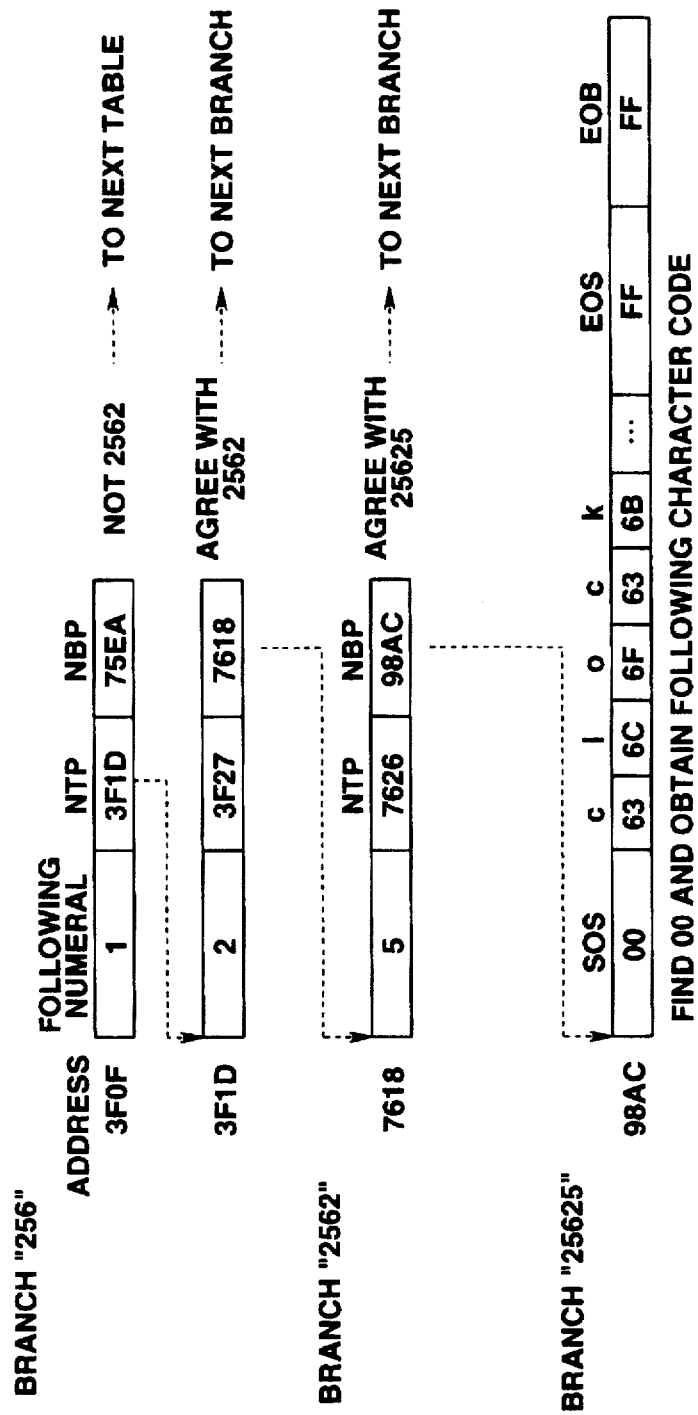

FIG. 16 is a diagram for illustrating the processing from the retrieval in the block of 3 characters. It arrives at the table of the address "3F0F" of the block of 3 characters in response to the numeric string "256". The following number in this table is "1" and different from the fourth number "2" of the numeric string "25625" stored in the character input buffer 41, so the next table will be retrieved based on NTP. Here exist only a candidate with the numeral "1" following the numeric string "526" and a candidate with "2". Usually, tables of following numerals as much as they exist such as table with the following numeral "1", then table with the following numeral "2", then table with the following numeral "3" and so on before arriving at the table of the required following numeral.

When the following numeral agrees, it arrives at the first table of the branch "2562" of 4 characters based on NBP of this table. In this table, as the following numeral is "5", it agrees with the fifth numeral "5" of the numeric string "25625" stored in the character input buffer 41. When the following numeral agrees, it arrives at the next branch "25625" based on NBP of this table. Here, originally, as there is no following numeral stored in the character input buffer 41, it retrieves a table wherein "00" is set in the area of following numeral. In this example of FIG. 16. It is supposed there is no candidate having a numeral following the numeric string "25625" even in the word dictionary 14E or no table. It arrives from the table of the branch "2562" directly to the table of the address "98AC" where "00(−SOS)" is set in the area of following numeral.

In the example of FIG. 16, as "clock" is set by code "63, 6C, 6F, 63, 6B" in the first candidate character string, the code "63, 6C, 6F, 63, 6B" of the concerned "clock" is read in response to the output value "0" of the code pointer 42. The forementioned processing corresponds with the processing from "Retrieval" (S25) to the loop (S26, S27, S28) in FIG. 14. The increment of the code pointer 42 in the step 27 corresponds to the sequential table retrieval in FIG. 16 and, at the same time, to the read-out by specifying respective candidate character in the target table. Therefore, in practice, the retrieval of candidate character made in FIG. 16 is equivalent to the retrieval of the word dictionary 14E shown in FIG. 10. In this example "clock" is obtained, however, if a candidate character corresponding to the entered numeric string does not stored in the word dictionary 14E, the value is increased by supplying the code pointer 42 with NEXT signal (S27), the loop from S28 to S26 is reiterated and eventually. If candidate character or candidate character string can not be retrieved, it branches to YES at S28. In other words, END signal is returned from the code pointer 42. There, the control section 40 transmits "No candidate" as retrieval result information to the central control section 13. Receiving this "No candidate", the central control section 13 supplies the display control section 17 with character font "No candidate" for displaying that no candidate exist by means of LCD display device 16 (S29).

The code of "clock" obtained as mentioned above is transmitted to the retrieval result character output buffer 43 (S30). Base on the retrieval result information, the central control section 13 is notified with the result in output, the code of "clock" is taken into the central control section 13 from the retrieval result character output buffer 43, transmitted to the display control section 17 and then delivered to the (LCD) display device 16 for visualization as described for FIG. 8. Namely "clock" is displayed on the (LCD) display device 16. The control section 40 of the word dictionary 14E monitors the operation of the decision key or the next candidate key (S31, S32). The operation of the decision key or the next candidate key is transmitted from the input control section 12 to the central control section 13 as in the operation of the forementioned conversion key.

Figure 15:
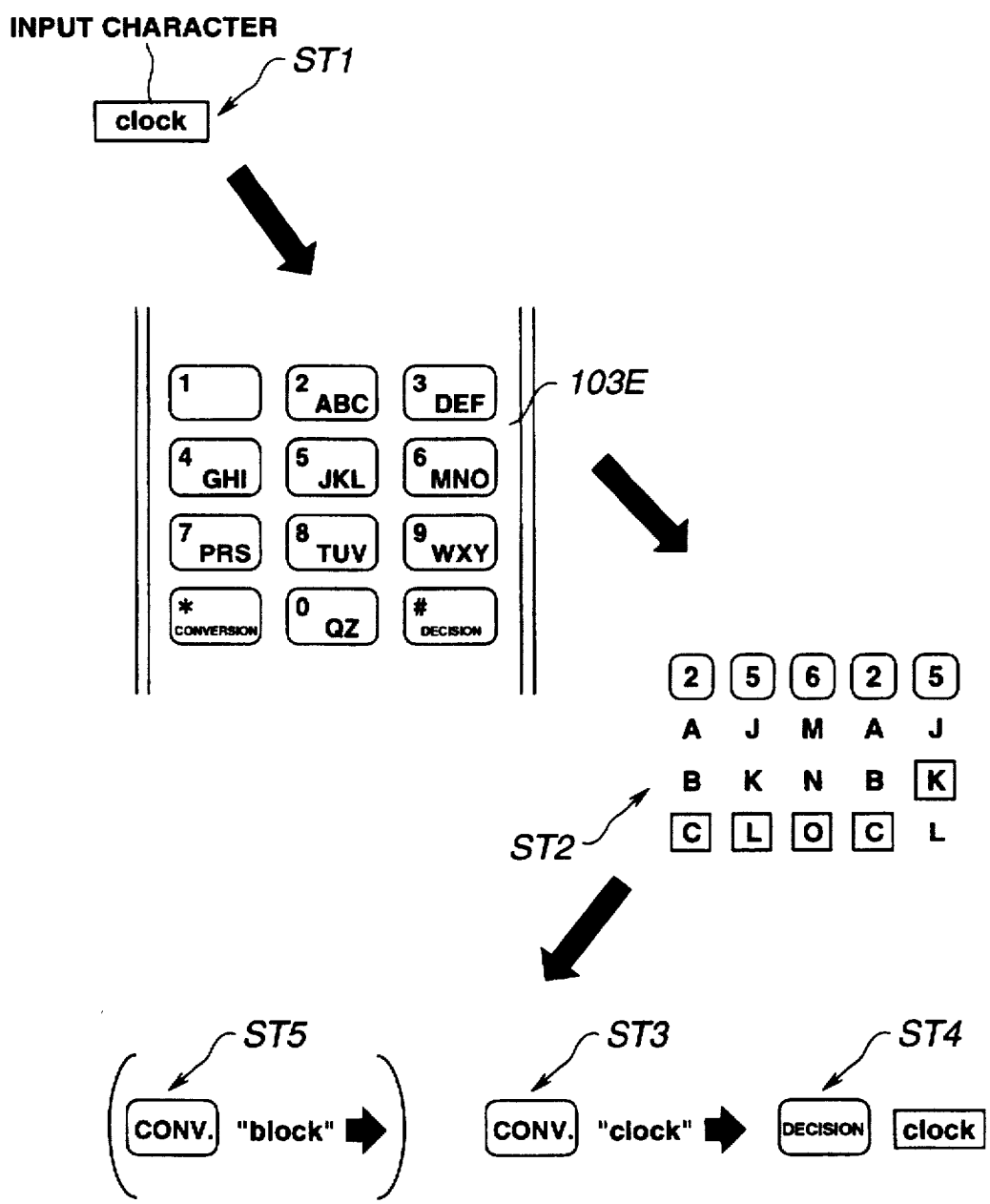
FIG. 15 is a diagram for illustrating the input operation using the character input device according to the first embodiment of the present invention.

In the example of FIG. 15, as "clock" is the desired character, the decision key is pressed as shown in ST4. Receiving the code of the decision key, the central control section 13 shifts the retrieval signal to inactive. Receiving this, the control section 40 of the dictionary retrieval section 15 branches to YES from the step 31 for confirming the said candidate character. When first "block" and then "clock" are stored in the word dictionary 14E in correspondence with "25625", first "block" is displayed as shown in parentheses at ST5 in FIG. 15, the next candidate key is operated in response to this, the value of the code pointer 42 is increased by receiving NEXT signal (S27), the code of the next candidate "clock" is obtained for proceeding from S26 to S30. In this case also, as "clock" is the intended word, the decision key is pressed as shown in ST4. The further processing is as shown above.

As mentioned above, the character input device according to the first embodiment of the present invention comprising respective key to which a plurality of alphabetic letters is allocated and moreover, the conversion/next candidate key and the decision key, it allows to input and select appropriately candidate character strings composed of candidate character corresponding to an alphabetic letter allocated to the operated key or the combination of alphabetic string allocated to a plurality of operated key. Namely, it is appropriate for a information terminal provided with few keys.

Figure 17:
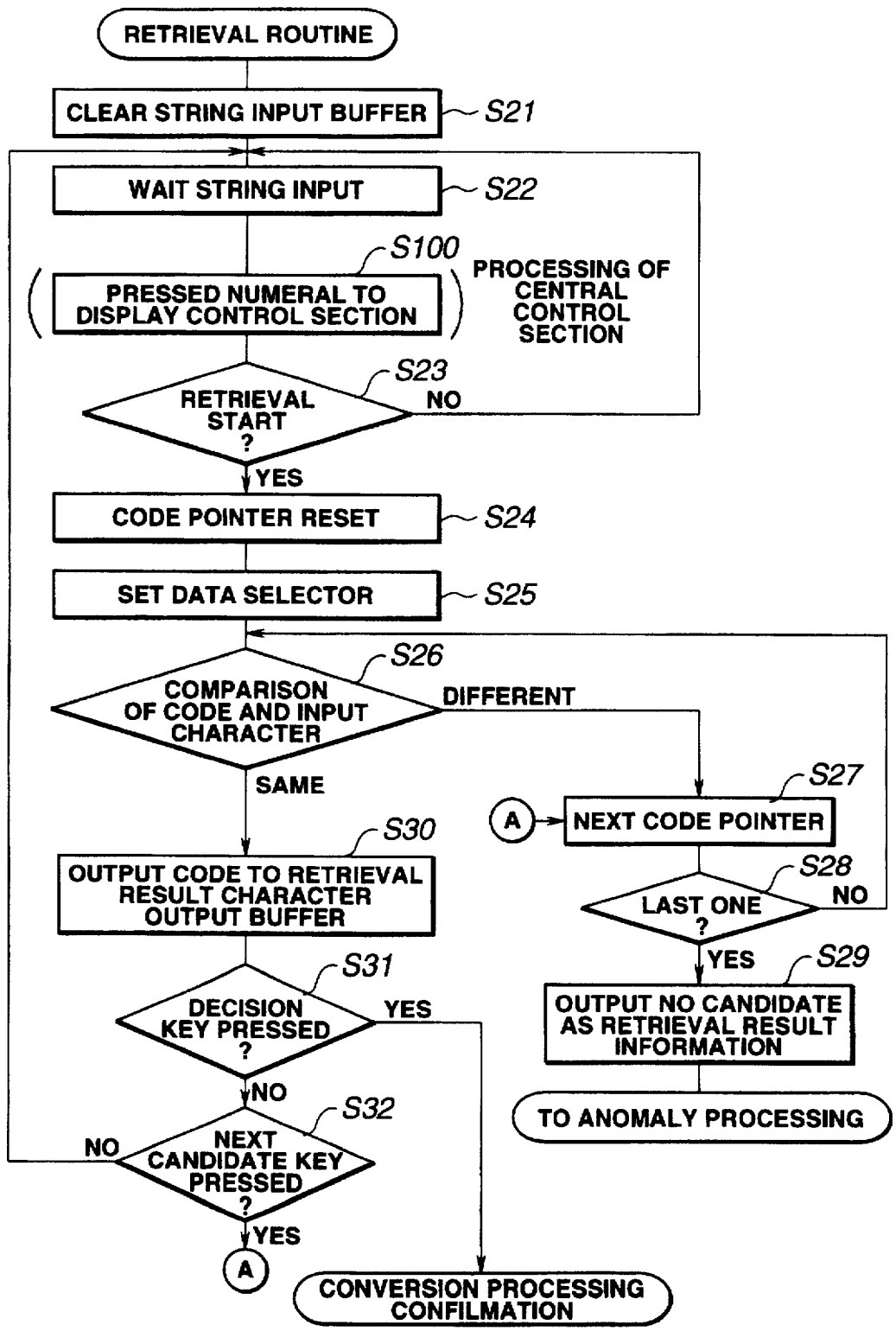
FIG. 17 is a flowchart for illustrating the operation of the dictionary retrieval section, essential part of the character input device according to the second embodiment of the present invention.

In the said first embodiment, as nothing is displayed in the display section 102 if "*" key, that is conversion/next candidate key, in not operated, the operator can not check if the key operation is correct so as to deteriorate the maniability. So in the second embodiment, the program corresponding to the flowchart of FIG. 14 with which the control section 40 of the dictionary retrieval section 15 is replaced by a program corresponding to the flowchart of FIG. 17. In other words, in the step S22, the control section 40 for waits for the arrival of the code of input character or input character string (numeric code). When a numeric key of the ten key 103 is operated, the central control section 13 stores the corresponding code in the character input buffer 41 and, at the same time, transmits to the display control section 17 as shown by the step S100 in FIG. 17. Thus, the dictionary retrieval section 15 (control section 40) function as code sending means for detecting the code corresponding to the operated key (numeric code) and transfers to the display control section 17 for display. The display control section 17 patterns it to write in the image memory 33 for displaying the corresponding number. The control section 40 monitors the operation of "*" key, that is conversion/next candidate key (S23) and if the code corresponding to "*" key does not arrive. It returns to the step S22 to wait for the arrival of the code corresponding to the input character or input character string (numeric key code).

Figure 18:
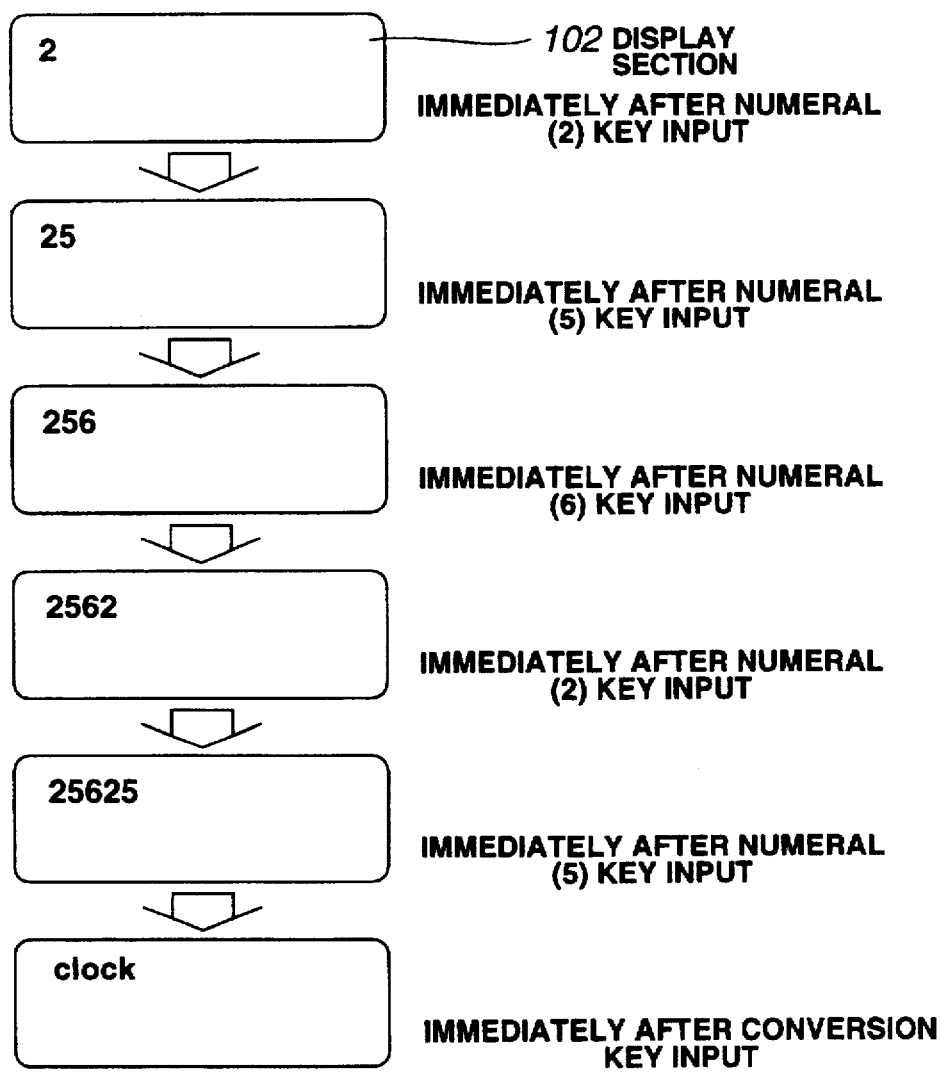
FIG. 18 is a diagram for illustrating the dictionary retrieval by the input operation using the character input device according to the first embodiment of the present invention.

If "25625" is key entered corresponding to "clock", each time respective key is operated, the number corresponding to the operated key appears increasing from "2", "25", . . . , "25625" as shown in FIG. 18 so as to allow to check the acceptance of key input and the exact operation thereof, namely to check if the numeric key to which respective alphabetic letters composing "clock" is operated. When "*" key, that is conversion/next candidate key, is operated, the character conversion is performed using the word dictionary 14E as in the first embodiment, the code of the corresponding candidate character is read from the word dictionary 14E and displayed in place of the display of the said numeric string "25625". Here, the example of FIG. 18 shows that the first candidate character string of the table corresponding to the numeric string "25625" of the word dictionary 14E is "clock".

Figure 19:
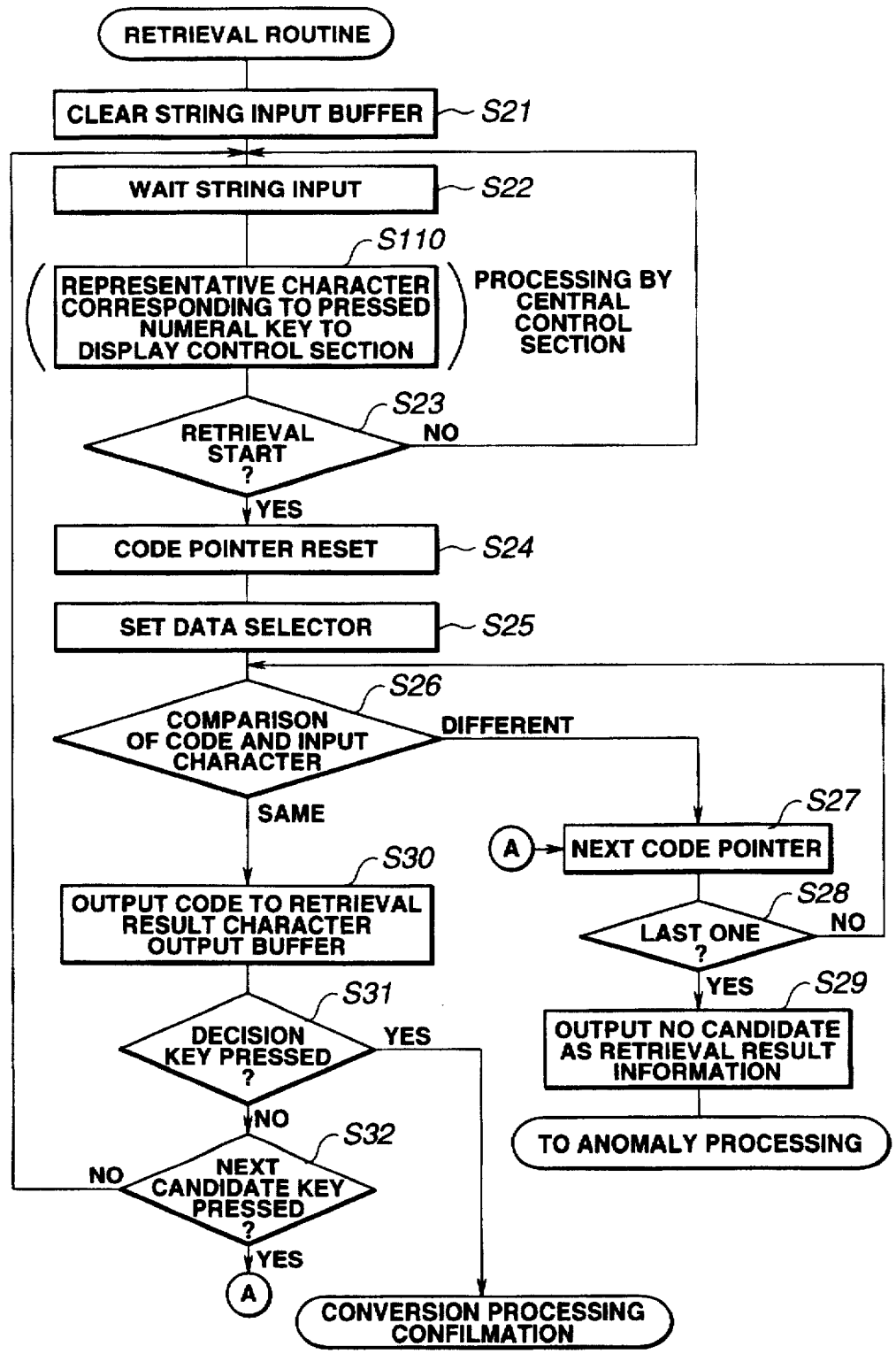
FIG. 19 is a flowchart for illustrating the operation of the dictionary retrieval section, essential part of the character input device according to the third embodiment of the present invention.

FIG. 19 shows a flowchart corresponding to the program with which the control section 40 of the dictionary retrieval section 15 is provided in the character input device according to the third embodiment. In this embodiment also, the control section 40 waits for the arrival of the code corresponding to the input character or input character string (numeric key code). if a numeric key of the ten key 103 is operated, the central control section 13 stores the corresponding code in the character input buffer 41 and transfers to the display control section 17 the first alphabetic letter which is representative alphabetic letter among a plurality of alphabetic letters allocated to the numeric key as shown in S110 of FIG. 19. Namely, the central control section 13 is provided with a conversion table between the numeric code and the first alphabet, that is the representative alphabetic letter, obtain the representative alphabetic letter from the numeric code for transferring it to the display control section 17. The display control section 17 patterns it to write into the image memory 33 for displaying the corresponding character. To be more specific, the said table is a table wherein code of "2" and code of "a", code of "3" and code of "d", code of "4" and code of "g", . . . . code of "0" and code of "q" are associated.

Figure 20:
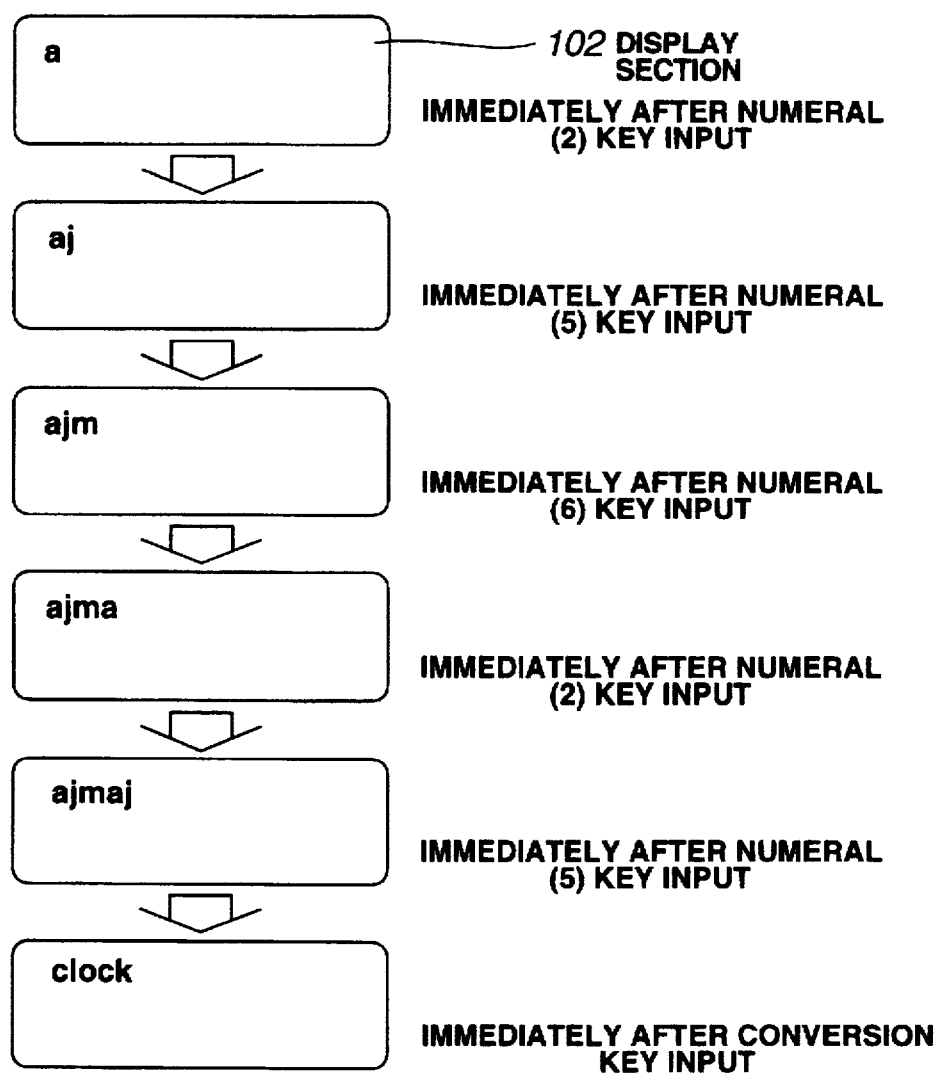
FIG. 20 is a diagram for illustrating the display procedure of the character input device according to the third embodiment of the present invention.

As shown in FIG. 19, the control section 40 monitors the operation of "*" key, that is conversion/next candidate key (S23), and if the code corresponding to "*" key does not arrive, it returns to the step S22 to wait for the arrival of the code corresponding to the input character or input character string (numeric key code). As in the first embodiment, if "25652" is key entered corresponding to "clock", each time respective key is operated, as shown in FIG. 20, the representative character of the operated key is displayed increasingly from "a", "aj", . . . . , "ajmaj" so as to allow to check the acceptance of such key input, the correctness of its operation, namely the operation of the key to which allocated respective alphabetic letter composing "clock". When "*" key, that is conversion/next candidate key is operated, the character conversion is performed using the word dictionary 14E as in the first embodiment, the code of the corresponding candidate character is read from the word dictionary 14E and displayed in place of the display of the representative alphabetic string "ajmaj". Here, the example of FIG. 20 shows that the first candidate character string of the table corresponding to the numeric string "25625" of the word dictionary 14E is "clock".

Figure 21:
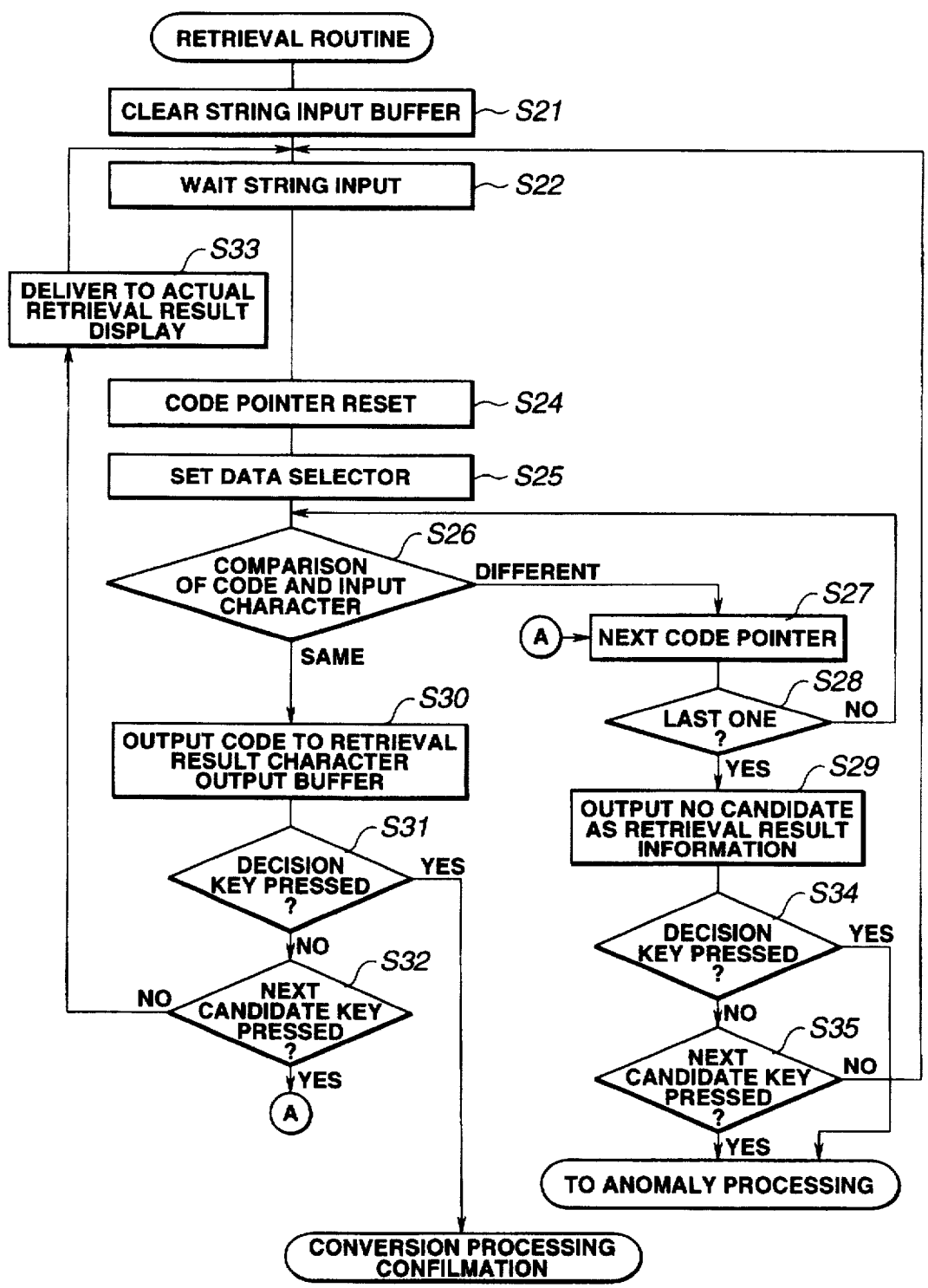
FIG. 21 is a flowchart for illustrating the operation of the dictionary retrieval section, essential part of the character input device according to the fourth embodiment of the present invention.

FIG. 21 shows a flowchart corresponding to the program with which the control section 40 of the dictionary retrieval section 15 is provided in the character input device according to the fourth embodiment. In this embodiment also, the control section 40 does not monitor "*" key, the conversion/next candidate key, resets the code pointer 42 (S24), puts the data selector signal in set state (S25), then, takes out codes stored in the character input buffer 41 from the beginning for commencing the retrieval from the block of single character in the word dictionary 14E.

Figure 22:
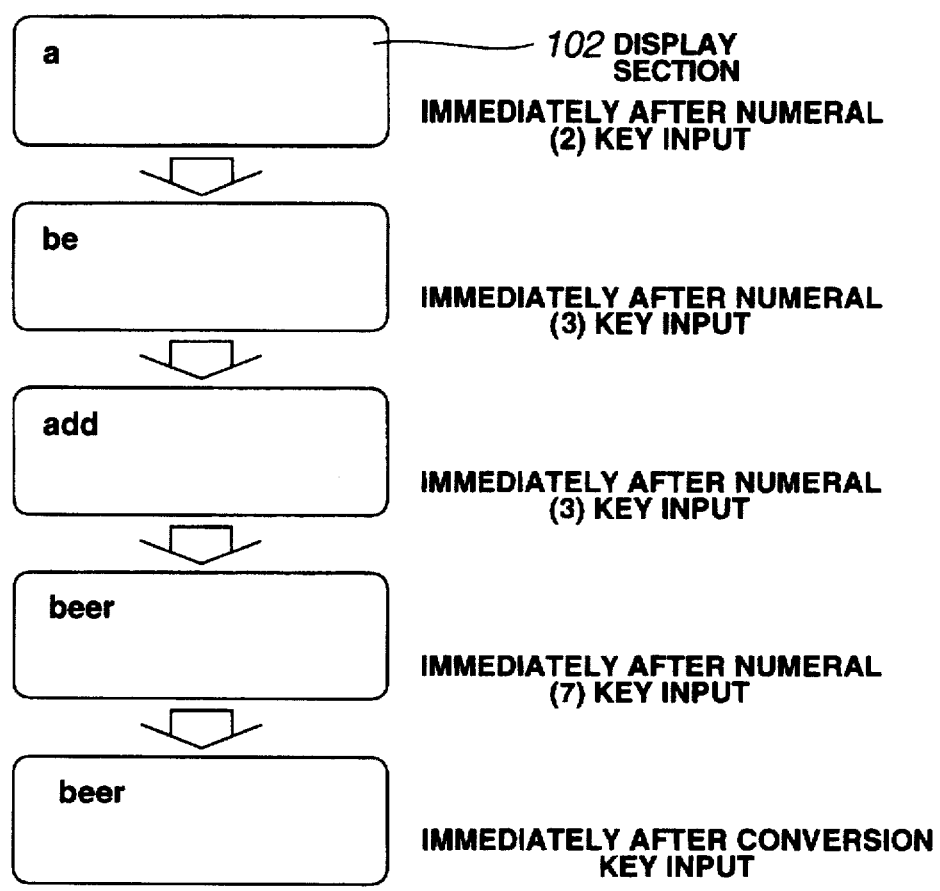
FIG. 22 is a diagram for illustrating the display procedure of the character input device according to the fourth embodiment of the present invention.

For this fourth embodiment, the description will be made on the key input "2337" corresponding to "beer". Each time respective key of "beer" is operated, "a", "be", "add", "beer" will be displayed as shown in FIG. 22. Namely, as the first candidate character in the table of candidate characters corresponding to "2" of the word dictionary 14E is "a", the first candidate word in the table of candidate characters corresponding to "23" of the word dictionary 14E is "be", the first candidate word in the table of candidate characters corresponding to "233" of the word dictionary 14E is "add" and the first candidate word in the table of candidate characters corresponding to "2337" of the word dictionary 14E is "beer", the converted candidate character or candidate character string is displayed in the said order without operation the conversion/next candidate key.

So long as the conversion/next candidate key is not operated, the actual retrieval result is supplied for display (S33), and the processing continues returning to the step S22. If it is displayed that no candidate exist on LCD display device 16 (S29), the operation of the decision key or the conversion/next candidate key is detected (S34, S35), and if these keys are not operated, the processing continues returning to the step S22 and if the decision key or the conversion/next candidate key is operated it is designed to shifts to the anomaly processing. In this embodiment, therefore, this composition can responds the an erroneous operation of the decision key or the conversion/next candidate key when there is no candidate character or candidate character string corresponding to the numeric string being entered.

So as to avoid that it result in no candidate character during the input, it is possible to allocate the respective character of the concerned key to respective numeral of the word dictionary 14E. In this case, as the result of conversion, the representative alphabetic string will be displayed as shown in FIG. 20.

Figure 23:
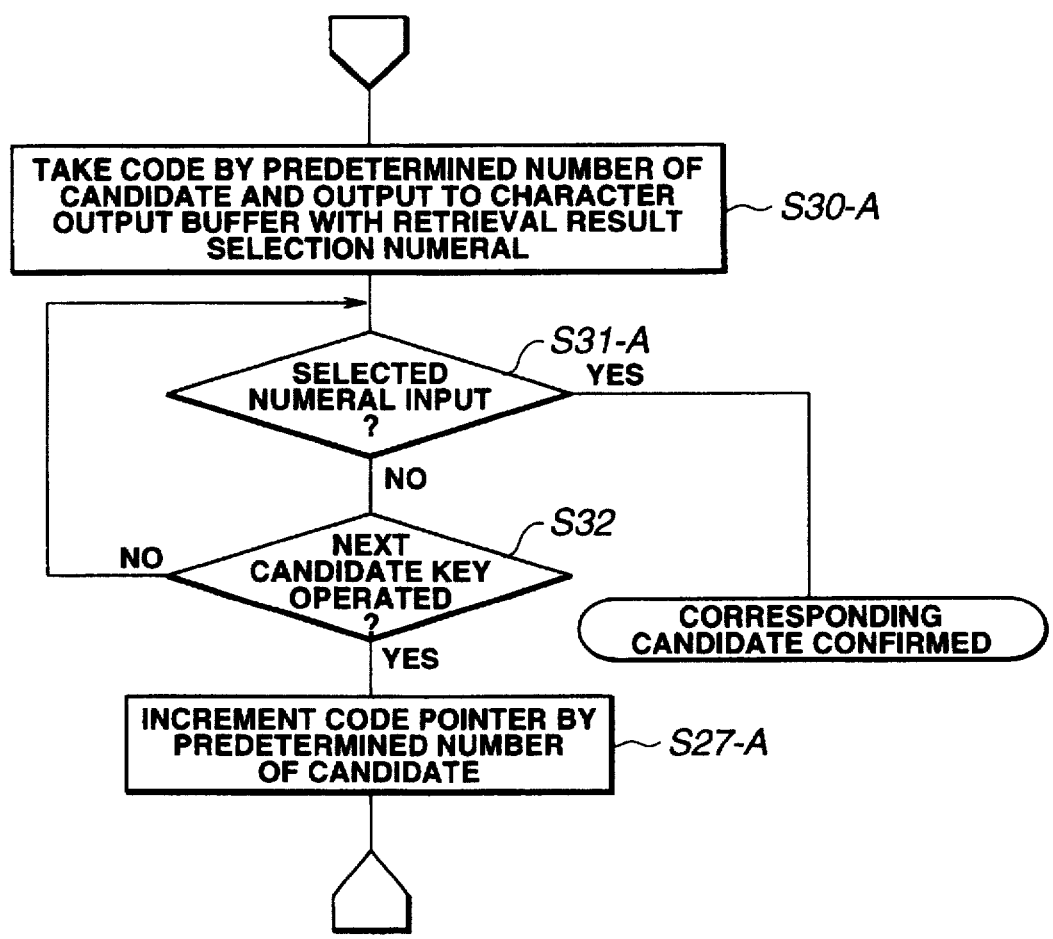
FIG. 23 is a flowchart for illustrating the operation of the dictionary retrieval section, essential part of the character input device according to the fifth embodiment of the present invention.
Figure 24:
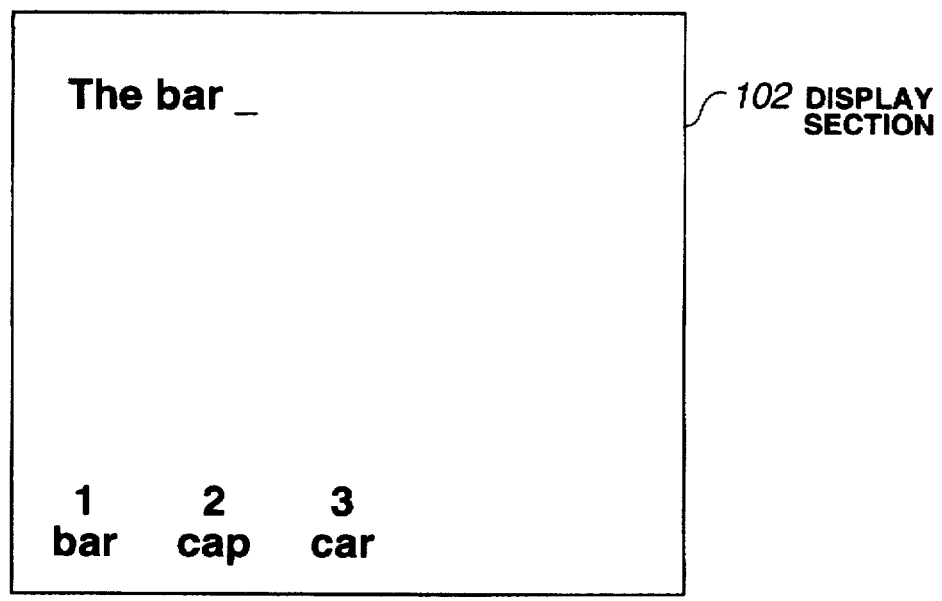
FIG. 24 is a diagram for illustrating the display procedure of the character input device according to the fifth embodiment of the present invention.

While in the said respective embodiments, only one conversion candidate is displayed. In the fifth embodiment, if there are a plurality of candidate character of candidate character string exist, they are displayed by a predetermined number. FIG. 23 shows a flowchart corresponding to the program with which the control section 40 of the dictionary retrieval section 15 is provided in the character input device according to the fifth embodiment. In this fifth embodiment, the processing corresponding to the steps S30–S32, S27 in FIG. 14 of the first embodiment is performed as shown in FIG. 23. Namely, existing candidates are taken out from the word dictionary 14E by a predetermined number and output to the retrieval result character output buffer 43 with the selected numeral (S30-A). Thus, when the numeral "227" is input, 3 candidates words "bar", "cap" and "car" are displayed with the numeral 1 to 3 for selection on the display screen of the display section 102 as shown at the bottom of FIG. 24.

The control section 40 waits for the input of selection number (S31-A) and when any number is input, confirms the candidate character corresponding to this number. If the selection number is not entered. It detects the operation of the next candidate key (S32), and when the next candidate key is operated. Increases the code pointer 42 by the said predetermined number of candidates (three in the example of FIG. 26 above) (S27-A) and proceeds to the retrieval of another candidate. Thus, in the fifth embodiment, when a plurality of candidates exist, they are displayed simultaneously for selection so as to facilitate a rapid decision of candidate characters.

Figure 25:
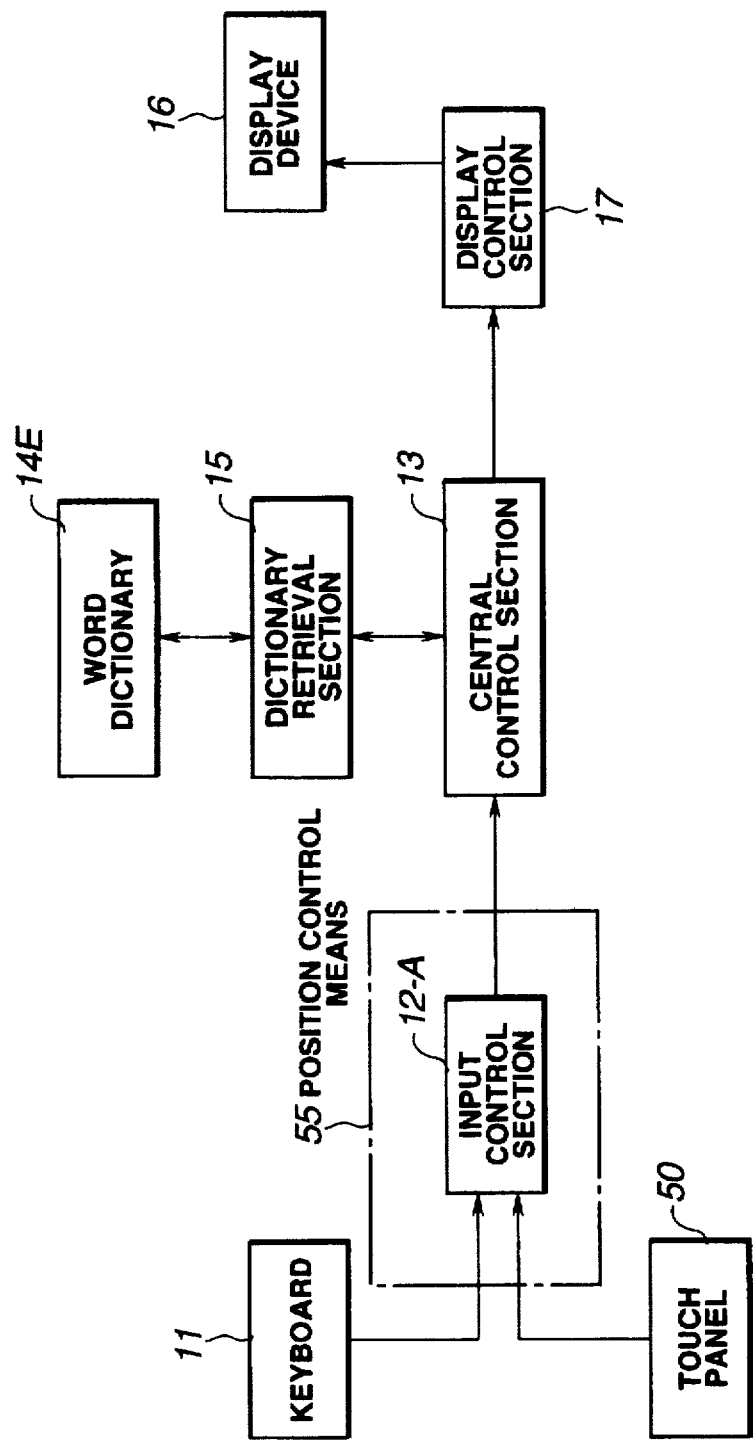
FIG. 25 is a composition diagram of the character input device according to the sixth embodiment of the present invention.
Figure 27:
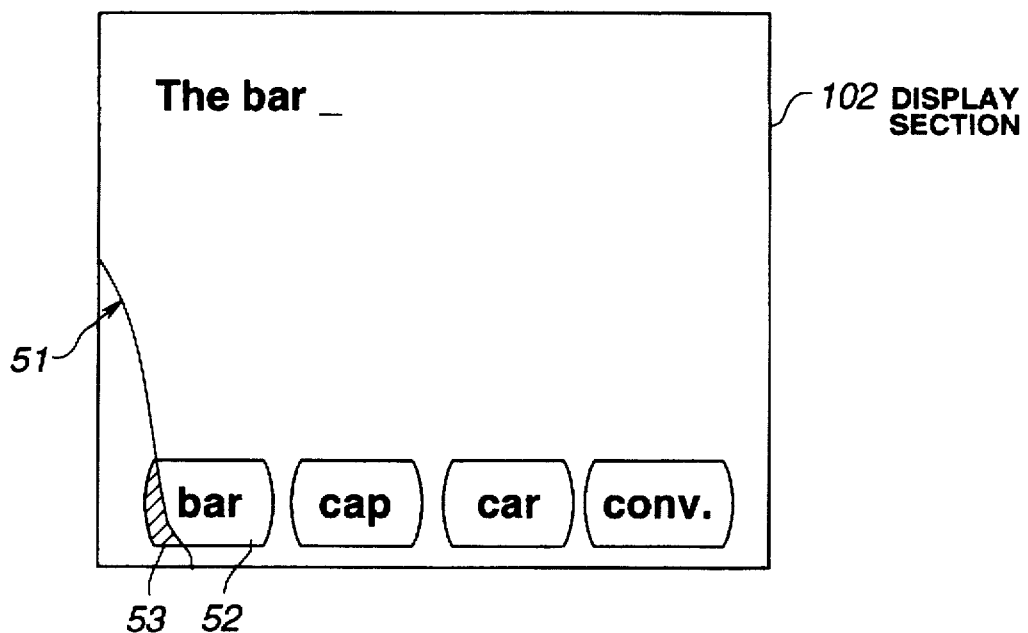
FIG. 27 is a diagram for illustrating the composition of the touch panel, essential part of the character input device according to the sixth embodiment of the present invention, and an example of display thereon.

FIG. 25 is a composition diagram of the character input device according to the sixth embodiment of the present invention. In this embodiment, a touch panel 50 is applied to the screen of the display device 16 and the input control section 12-A detects the operation input coordinates from this touch panel. In other words, a transparent sheet 51 is applied to the screen of the display section 102 corresponding to the display section 16 as shown in FIG. 27. A transparent electrode 52 is disposed at the prescribed position under the transparent sheet 51 and an opposite transparent electrode 53 is arranged via a transparent aeolotropic conductive rubber or others at the position on the screen in opposition to the transparent electrode 52. As shown in the drawing, for instance 4 transparent electrode 52 at the prescribed position under the transparent sheet 51 and opposite transparent electrodes 53 arranged in opposition to the transparent electrode 52 are disposed and column direction lines and row direction lines are connected thereto as the key matrix described in FIG. 4 and an input control section 12-A detects which position is operated as described for FIG. 4 to FIG. 7. Namely, the input control section 12-A composes a position detection means 55 for detecting the input operation position on the touch panel 50.

Figure 26:
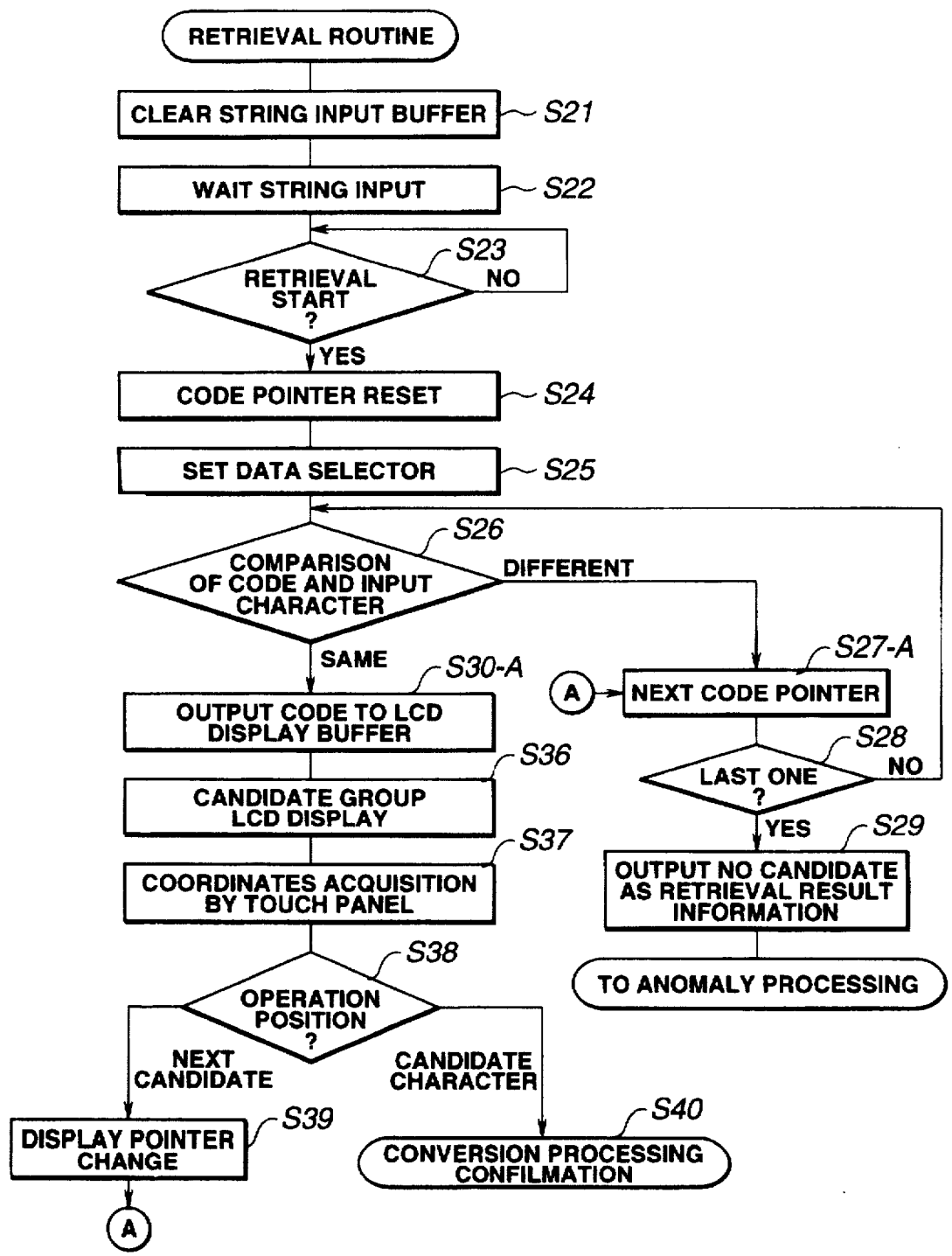
FIG. 26 is a flowchart for illustrating the operation of the dictionary retrieval section, essential part of the character input device according to the sixth embodiment of the present invention.

FIG. 26 is a flowchart corresponding to the program of the dictionary retrieval section 14 of the character input device according to the sixth embodiment. In this embodiment, the processing corresponding to the steps S30–S82, S27 in FIG. 14 of the first embodiment is performed as shown in FIG. 26. Namely, existing candidates are taken out from the word dictionary 14E by, a predetermined number and output to the retrieval result character output (LCD display) buffer 43 with the selected numeral (S30-A). Thus, when the numeral "227" is input and the conversion key is operated, the display control section 17 displays "bar", "cap" and "car" at the transparent electrode 52 of the display screen of the display section 102 (S36). The control section 40 detects the operation position on the touch panel 50 (S37), detects the displayed candidate character in correspondence with the coordinates o the operation position (S38) and confirms this candidate character (S40). Thus, the dictionary retrieval section 15 acts as decision means.

If the operation of the next candidate is detected (S38), the display pointer is modified (S39), it increases the code pointer 42 by the said predetermined number of candidates (three in the example of FIG. 29 above) (S27-A) and proceeds to the retrieval of another candidate. In other words, if the pointer for displaying the candidate in respect of candidate character string of the corresponding table of the word dictionary 14E and the pointer for retrieval of candidate character of the corresponding table of the word dictionary 14E are common, by advancing both of them by three, the next three candidates are taken out and displayed, if they exist. Thus, in the sixth embodiment, when a plurality of candidates exist, they are displayed simultaneously for selection on the touch panel 50 so as to facilitate a rapid decision of candidate characters.

Figure 28:
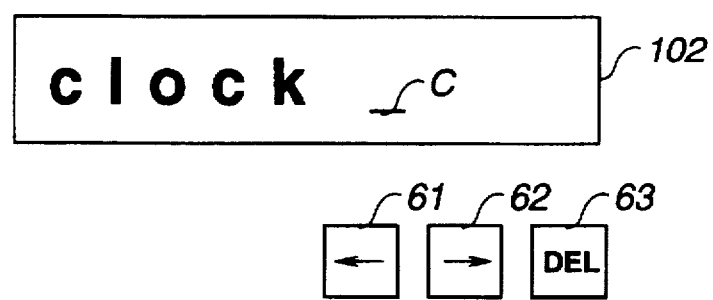
FIG. 28 is a diagram for illustrating the display section and the detail of keyboard, essential parts of the character input device according to an embodiment of the present invention.

In the character input device according to respective embodiment of the present invention, a cursor C is displayed for correcting the input character or others as shown in FIG. 28 and the keyboard it is provided with cursor shift keys 61, 62 and a delete key 63. In this drawing, a pair of cursor shift keys 61 and 62 are provided in right and left direction for displaying a line, however, in a composition for displaying more than one line, in addition to them, a pair of cursor shift keys in vertical direction are provided. The operation information of cursor shifts keys 61, 62 is also detected by the input control section as the operation information of other keys described for FIG. 4 to FIG. 7 and supplied to the display control section 17 via the central control section 18.

As for cursor display, the display control section 17 shift the cursor C to the lower line of the character display area by one character display area based on the cursor pointer. The display control section 17 controls the cursor pointer according to the program of the flowchart shown in FIG. 29, based on the character input and the operation information of cursor shift key. Namely, it detects the arrival of character code (S41) and advances the cursor pointer by one upon arrival of the character code (S42). By so doing, the cursor C advances by one. When the character code does not arrive, it detects if the cursor has shifted upon the arrival of the operation information of cursor shift keys (S43) and it the information does not arrive, it returns to the step S41 to continue to monitor and if the cursor is shifted, the cursor pointer will be increased or decreased according to the shift direction (S44). By so doing, the cursor C advances or moves back by one character. For correcting a character entered by mistake, the cursor C is shifted to the position of the character to be corrected by means of cursor shits keys 61, 62, the delete key 63 is operated to delete before entering a correct character. In respect of this, in the first embodiment, the display arrives only after the operation of the conversion/next candidate key, however, concerning the anomaly treatment after the display of no candidate on LCD display device 16 in the step S29, input numeral or input numeric string is displayed as in the second embodiment for ensuring the correction here. Namely, in anomaly treatment, numeral string set in the string input buffer 41 is delivered to the display control section 17. After correction, if the conversion/next candidate key is operated, the processing after the step S23 of the flowchart of FIG. 14 will be performed.

Figure 30:
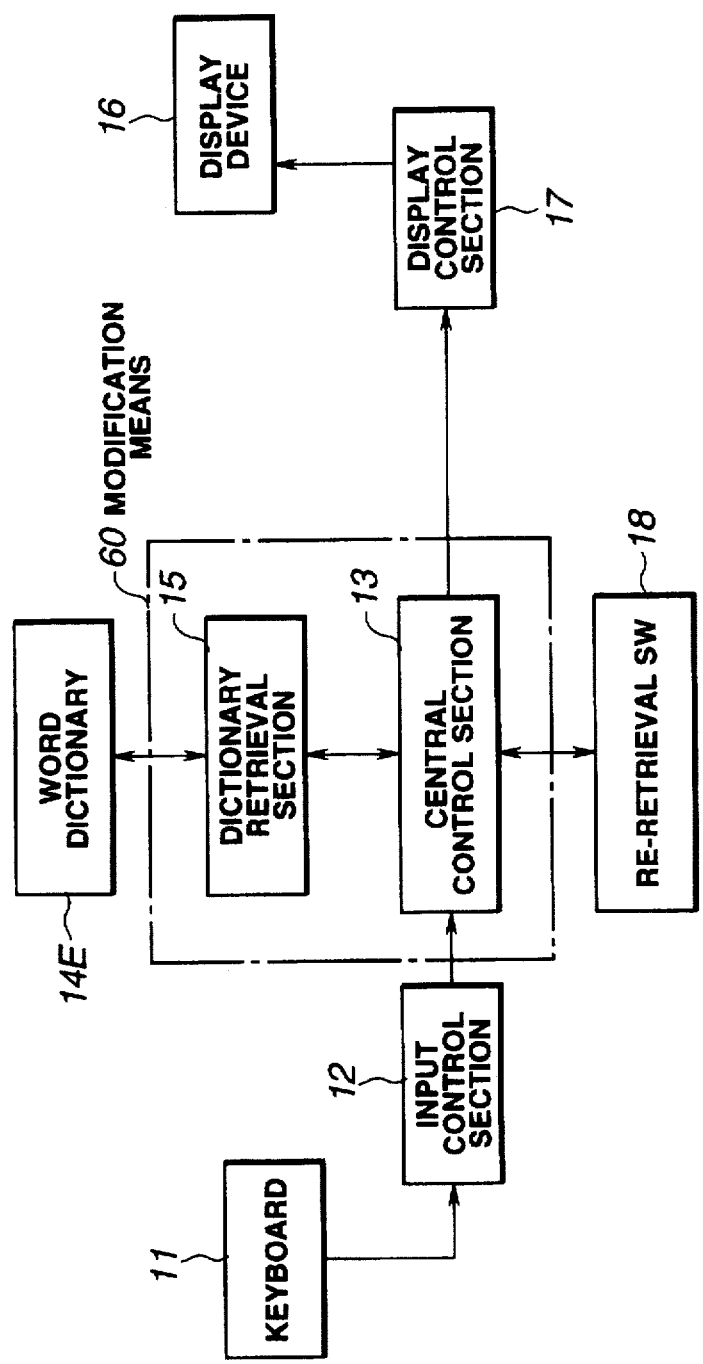
FIG. 30 is a composition diagram of the character input device according to the seventh embodiment of the present invention.

FIG. 30 is a composition diagram of the character input device according to the seventh embodiment of the present invention. In this embodiment, a re-retreival SW (switch) 18 is connected to the central control section 13 and if no candidate is displayed on LCD display device 16 after the retrieval of the word dictionary, input character of input character string is modified and further conversion will be directed by retrieving the dictionary again. In other words, if candidate character or candidate character string can not be obtained, the central control section 13 and the dictionary retrieve section 15 has a function to act as a modification means 60 to modify the input character or input character string provided that the said re-retrieval SW 18 is ON for directing further conversion. Here, the re-retrieval SW 18 is not a mechanical switch, but is composed of register.

Figure 31:
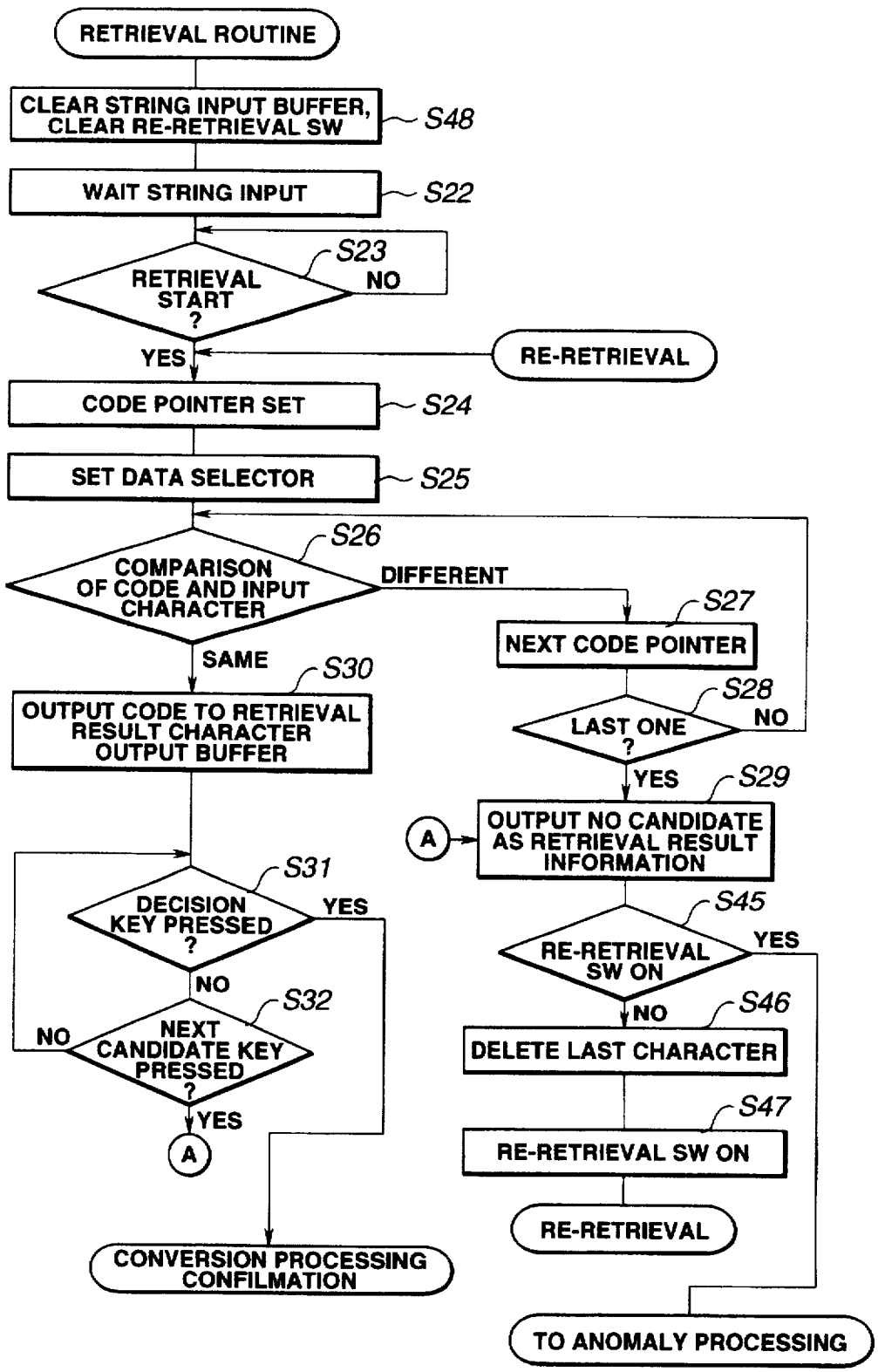
FIG. 31 is a flowchart for illustrating the operation of the dictionary retrieval section, essential part of the character input device according to the seventh embodiment of the present invention.

FIG. 31 is a flowchart corresponding to the program of the control section 40 of the dictionary retrieval section 15 of the character input device according to the seventh embodiment. In this embodiment, during the retrieval processing of the word dictionary 14E, the control section 40 clears the character input buffer 41 and resets the re-retrieval SW 18 (S48) and waits for the arrival of input character or input sting code (code of a numeric key (S22).The following processing is similar to the first embodiment, but it is different in that when no candidate is displayed on LCD display device 16 in the step S29, the processing of step S45 to S47 is performed.

Namely, in the step S29, when no candidate is displayed on LCD display device 16, next, it detects ON/OFF of the re-retrieval SW 18 (S45). For the first time, as it is reset OFF in the step S48, it branches to NO, the last one character (numeral) is deleted (S46), the re-retrieval SW 18 is set ON (S47) and reiterate the processing from the step S24 to retrieve the word dictionary 14E. By thus deleting the last character of a string, it is expected that it agrees with a candidate character registered in the word dictionary 14E by deleting, for instance, the final "s" of the plural form or a noun. In other words, in this embodiment, the input character string is corrected automatically.

In spite of such modification of the character string, when no candidate is displayed on LCD display device 16 in the step S29, as the re-retrieval SW18 is set ON, it branches to YES in the step S45 for proceeding to the anomaly processing. In this anomaly processing, as described for FIGS. 28, 29, it is possible to make correction. Moreover, as for the use of the function of this seventh embodiment, for instance, if special input is made on the keyboard 11 (key inputs that are not used normally, for example, the key operation such as "#*#?(?=numeral)?(?=numeral)"), the setting is cancelled and the automatic correction will not be performed. Thereafter, if it become necessary to use the automatic correction, the operator may repeat the said special input to set ON the automatic correction.

Figure 32:
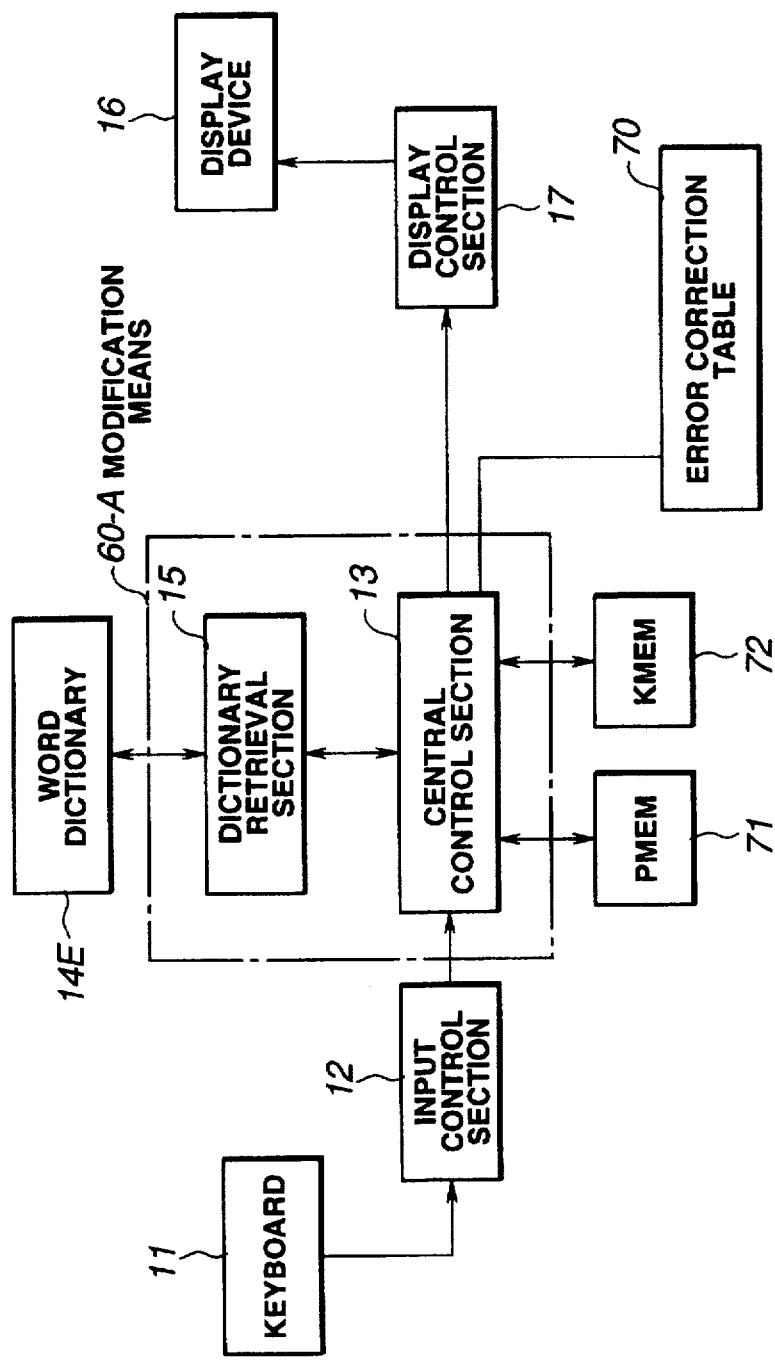
FIG. 32 is a composition diagram of the character input device according to the eighth embodiment of the present invention.

FIG. 32 is a composition diagram of the character input device according to the eighth embodiment of the present invention. In this embodiment, an error correction table 70, a memory (PMEM) 71 and a memory (KMEM) 72 are connected to the central control section 13. The error correction table 70 of this embodiment 70 is a candidate table of keys which may be operated by mistake during the key operation and is composed as shown in FIG.33. Namely, keys which may be operated by mistake during the key operation (i.e. keys deposed in proximity) are arranged in order of the higher probability in correspondence to the type of numeral keys "1" to "0". Key "1" may have its candidate of miss operation, however, in an example where no letter is allocated to this key, such candidate will not be used. The memory 71 stores the order of candidate number used or substitution and where of the input character or character string is substituted is set in the memory 72. When the candidate character or character string can not be obtained, the central control section 13 and the dictionary retrieval section 15 act as a modification means 60-A to use the said error correction table 70 for modifying the input character of string to make further conversion.

Figure 34:
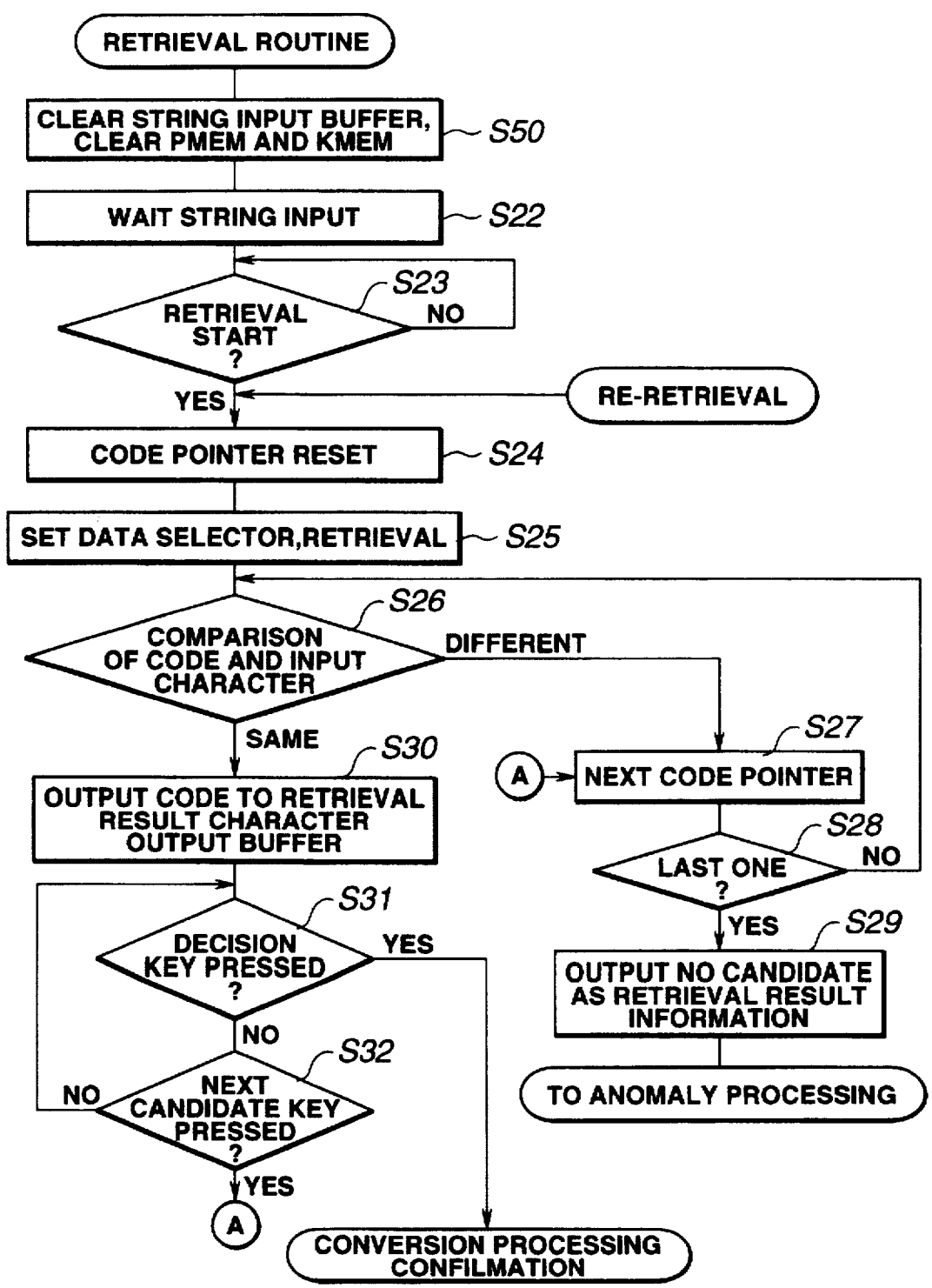
FIG. 34 is a flowchart for illustrating the operation of the dictionary retrieval section, essential part of the character input device according to the eighth embodiment of the present invention.
Figure 35:
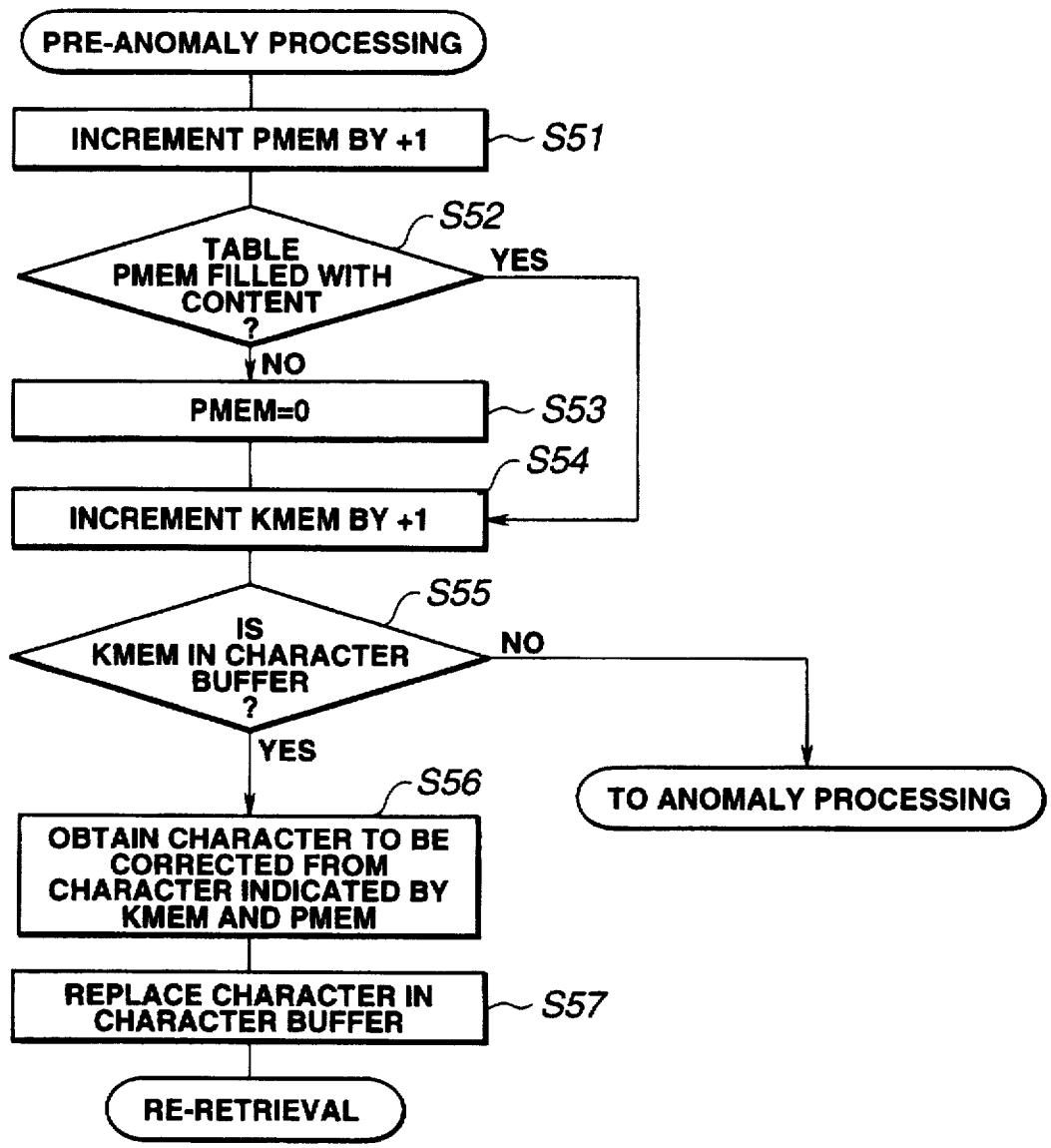
FIG. 35 is a flowchart for illustrating the operation of the dictionary retrieval section, essential part of the character input device according to the eighth embodiment of the present invention.
Figure 37:
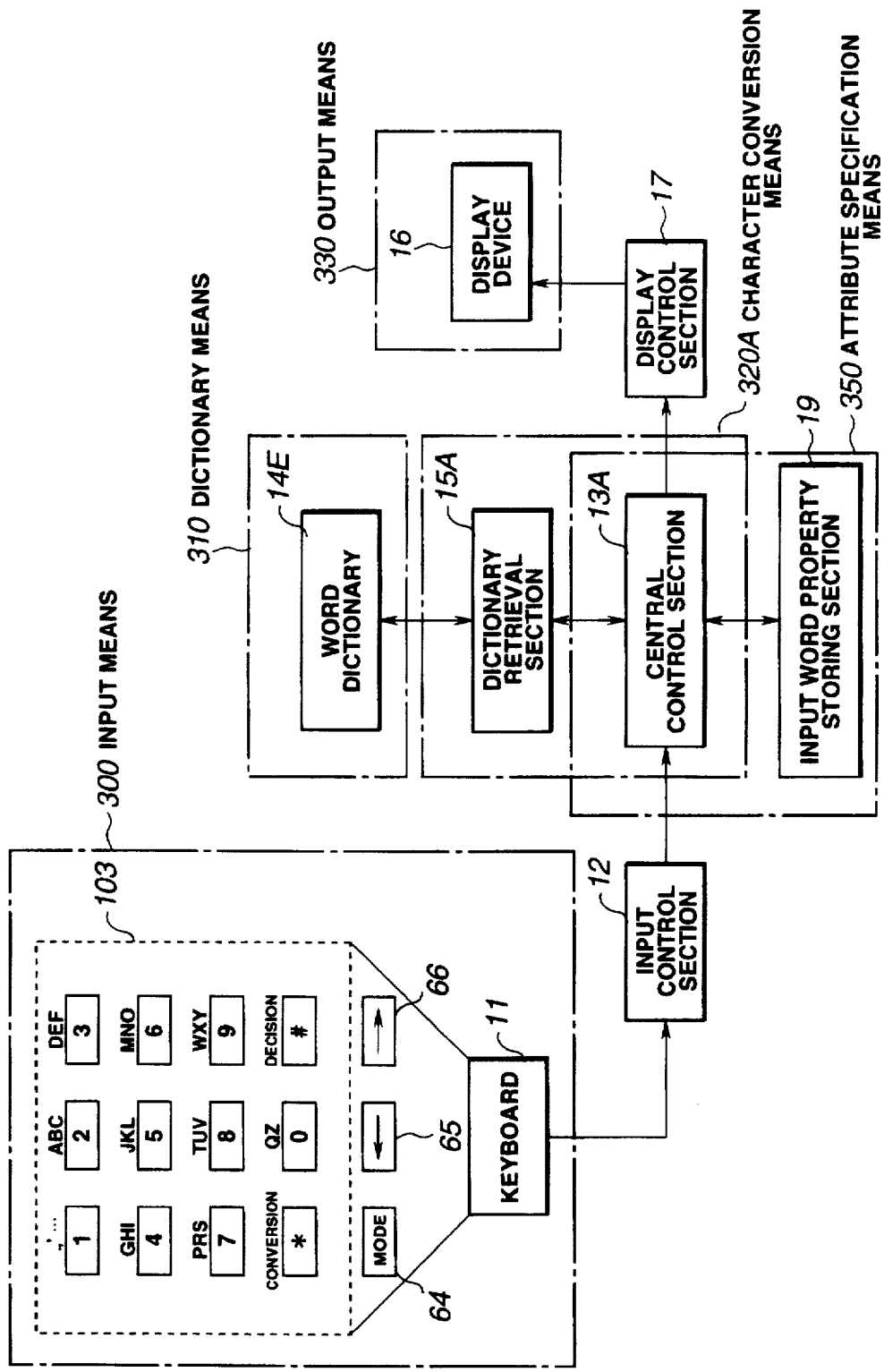
FIG. 37 is a composition diagram of the character input device according to the ninth embodiment of the present invention.

FIG. 34 and FIG. 35 are flowcharts corresponding to the program for the control section 40 of the dictionary retrieval section 15 of the character input device according to the eighth embodiment of the present invention. In this embodiment, during the retrieval of the word dictionary 14E, the control section 40 clears the character input buffer 41, clears the memory (PMEM) 71 and the memory (KMEM) 72 at the same time (S50) and waits for arrival of input character or input character string code (numeric key code). The further processing is similar to the first embodiment, but it is different in that when no candidate is displayed on LCD display device 16 in the step S29, it proceeds to the pre-anomaly processing shown in FIG. 37.

In the pre-anomaly processing shown in FIG. 35, the value of the memory 71 is incremented by "1" (S51) for detecting if there is a candidate in the error table 70 (S52). Namely, it is detected if there is a first candidate to be substituted. Initially, as clearly shown in FIG. 35, as there are candidates, it branches to YES and increment the content of the memory 71 by "12" (S52) and directs. In this case, to substitute the first one of input character or input character string. Then, it is detected if the character as the position directed by the memory 72 exists in the character input buffer 41 (S55). If one or more characters exist, the error correction table 70 is retrieved to retrieve the corresponding character from the character directed by the memory 72 and the order of candidate directed by the memory 71 (S56), the character at the position directed by the memory 72 in the string input buffer 41 is replaced by such retrieved character for continuing the processing from the step S24 in the flowchart of FIG. 34. Namely, the word dictionary 14E is retrieved to obtain a candidate character concerning the string obtained by the substitution. As the result of the foregoing, again if the retrieval result can not be obtain, the pre-anomaly processing will be performed again to make substitution abut the next candidate. If there is no more candidate for any character position, it branches to NO at the step S52, the memory 71 is reset (S53), the content of the memory 72 is incremented by "1" (S54). By doing so, the substitution will be made about the second character of the input string. Namely, in this embodiment, if an adjacent key is operated by mistake, the substitution and correction will be made automatically to obtain the intended input. After such automatic substitution and correction. If the substitution of the last character in the string ends up without obtaining a retrieval result, it branches to NO at the step S55 for the anomaly processing.

Figure 29:
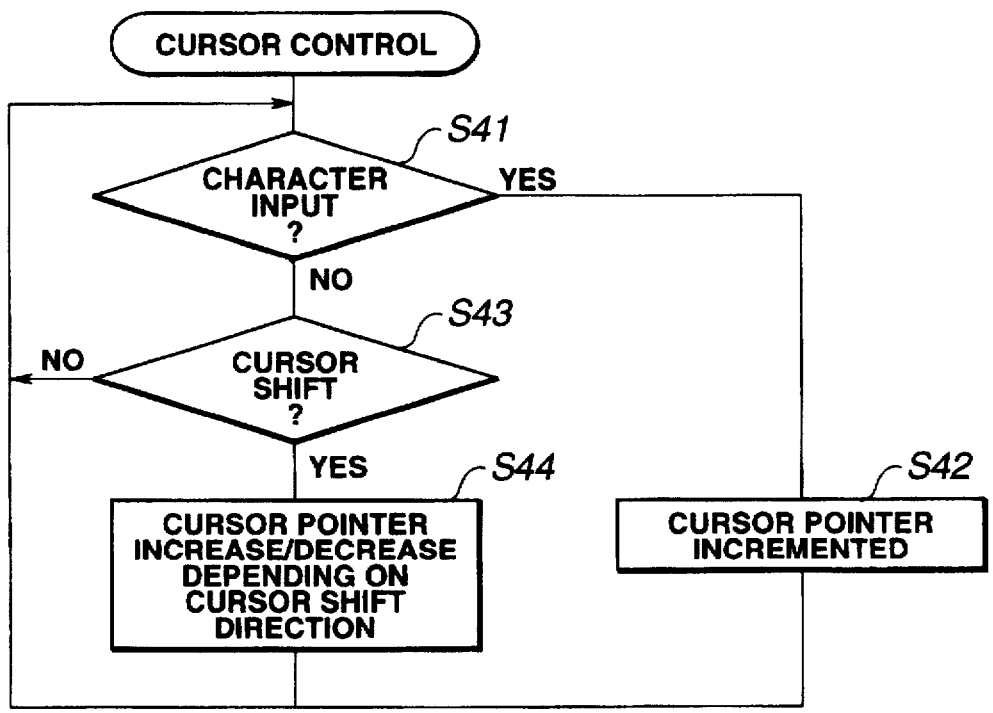
FIG. 29 is a flowchart for illustrating the cursor control of the character input device according to an embodiment of the present invention.

In the said anomaly processing, the correction can be made as mentioned for FIG. 28 and FIG. 29. Moreover, as for the use of the function of this h embodiment, for instance, if special input is made on the keyboard 11 (key inputs that are not used normally, for example, the key operation such as "#*#?(?=numeral)?(?=numeral)"), the setting is cancelled and the automatic substitution and correction will not be performed. Thereafter, if it becomes necessary to use the automatic substitution and correction, the operator may repeat the said special input to set ON the automatic substitution and correction. Additionally, In this embodiment, the substitution is made from the beginning of the input string, the same effect may be expected by substituting from the end.

Figure 36:
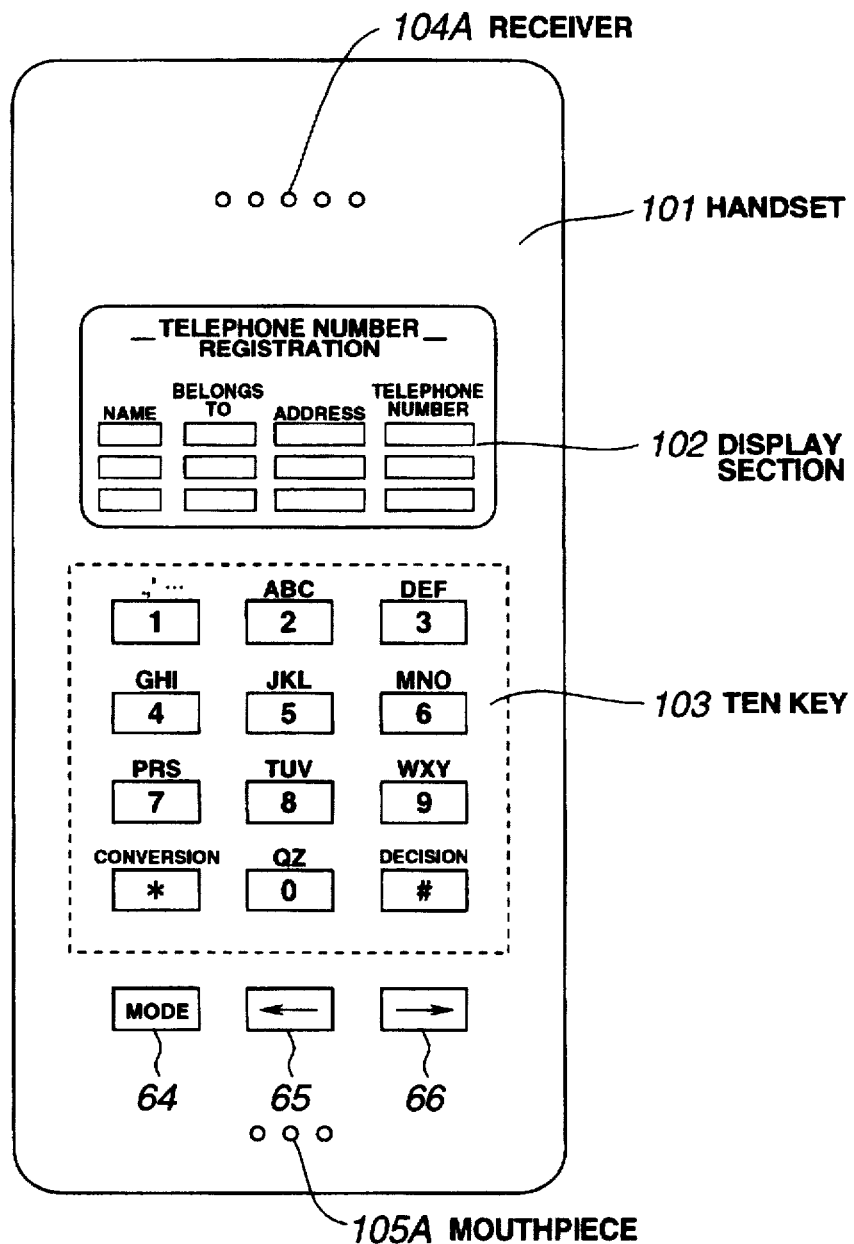
FIG. 36 is a front view of a cellular telephone including the character input device according to the ninth embodiment of the present invention.

Now the ninth embodiment of the present invention will be described. As shown in FIG. 36, a cellular telephone including the character input device according to this embodiment comprises a mode key 64, disposed under the ten key 103, for selecting a plurality of processing modes, a left shift key 65 and a right shift key 66 for moving a cursor K indicating the position of the character or character string to be entered on the display section 102. These keys may be replaced by any key of the ten key 103 by entering a predetermined special key. Symbols such as period, comma, apostrophe or others are allocated to "1" key. The mode key 64 is designed for calling one by one the available modes each time it is pressed and this device comprises, for instance, communication mode, data communication mode, character input mode, telephone number registration mode, fixed phrase input mode, retrieval mode, etc. If it is the case, the initial mode corresponding to communication mode and it shifts to communication mode if the mode key 64 is pressed once, to data communication mode if the mode key 64 is pressed once more, and the mode changes each time the key is operated, but at the last mode, if the mode key 64 is operated, the mode returns back to communication mode. When a plurality of lines are displayed on the display section 102 as shown in FIG. 36, the cursor may move over these lines by continuously pressing the left shift key 65 or right shift key 66. In other words, when the cursor K is placed at the rightmost position of the first line, if the right sift key 66 is pressed continuously, it shifts from the leftmost position of the first line to the rightmost position of the second line and then to the leftmost position of the second line. As described for FIG. 28 and FIG. 29, the display control of this cursor K is assumed by the display control section 17 by taking key control information by the central control section 13A shown in FIG. 37 through the input control section 12 and supplying the display control section 17 with the same.

In this embodiment, by specifying the property of character or string to be input, appropriate candidate characters or strings may be retrieved from the word dictionary 14E conveniently and the intended word (Chinese characters and others in Japanese) can be obtained rapidly. FIG. 31 is a composition diagram of the character input device according to the present invention. Namely, this character input device comprises a dictionary means 310 storing the correspondence of input character or input string and candidate character or character string as the result of conversion and property information thereof, an input means 300 including a plurality of keys to which a plurality of alphabetic letters are allocated, a conversion/next candidate key for directing the character conversion and a decision key for confirming the conversion result for entering character or string and necessary information, an output means 330 for displaying and outputting at least candidate character or candidate string as the result of conversion, a property specification means 350 for specifying the property of input character or string and a character conversion means 302A for obtaining a candidate character or candidate string corresponding to the property information specified by the said property specification means 350 and delivering this candidate character of candidate string to the said output means 330, for retrieving the said dictionary means 310 and obtaining candidate character or candidate string. The said property specification means 350 is composed of a central control section 13A and an input word property storing section 19. The input word property storing section 19 is used for storing the property information of the character or string being entered.

FIG. 38 illustrates a part of the content of the word dictionary 14E composing the dictionary means 310. In correspondence with numeric codes by the operation of the ten key, it stores characters or strings composed of alphabetic word and property information concerning the said characters or strings composed of alphabetic word such as place name, person's name, association name or others. In this example, two or more property information may be stored. For instance, the property "place" may be property "place name" and the property "place" and "person's name" are allocated to "Washington". The practical composition of this word dictionary 14E is as described using FIG. 11 to FIG. 13.

Figure 39:
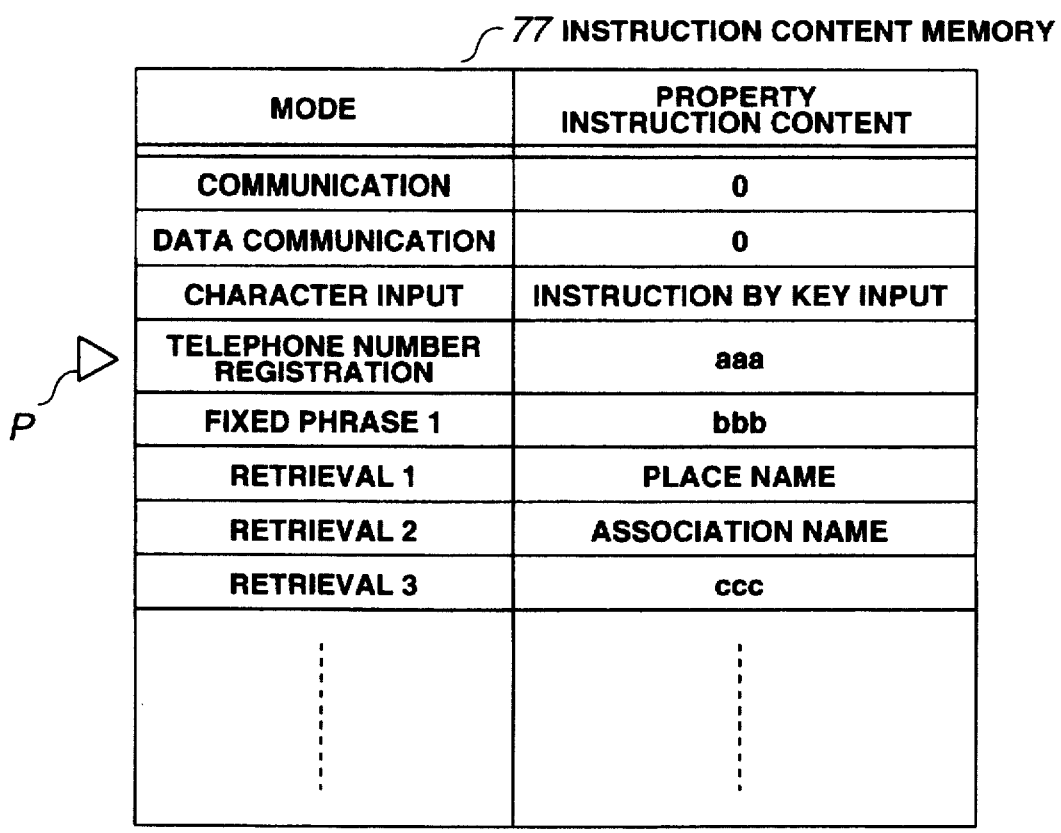
FIG. 39 Is a composition diagram of the instruction content memory used for the character input device according to the ninth embodiment of the present invention.
Figure 40:
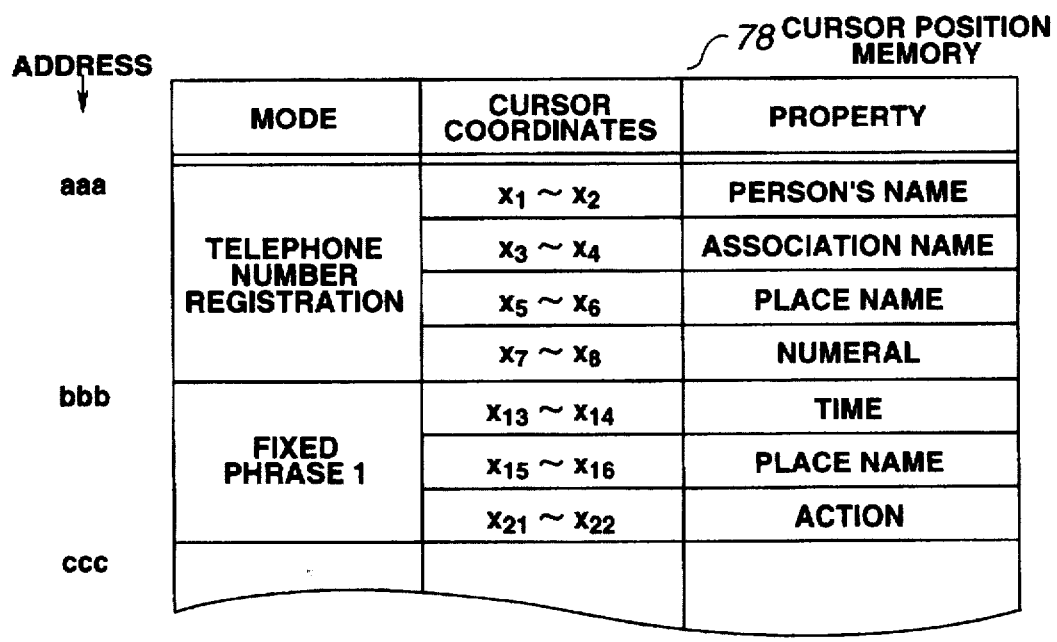
FIG. 40 is a composition diagram of the cursor position memory used for the character input device according to the ninth embodiment of the present invention.

Here, the central control section 13A of this embodiment is provided with a memory as shown in FIG. 39 and FIG. 40 for specifying the property. FIG. 39 is a composition diagram of the instruction content memory 77 where a plurality of mode concerning the processing of this device and the content of instruction for obtaining the property are stored in correspondence. Here, "0" is set for communication mode and data communication mode showing the property processing is not performed, "instruction by key input" is registered in correspondence with character input mode showing the character input mode follows the property information if the same if entered directly by key input, jump address "aaa" of the cursor position memory 78 or the like is set in correspondence with telephone number registration mode, fixed phrase 1 input mode, and retrieval 3 mode and the property information ("place name", "association name" and so on) is set as it is for retrieval 1 and retrieval 2. In FIG. 39 P is a pointer for indicating the mode being performed, the execution of telephone number registration for the example of FIG. 39.

FIG. 40 is a composition diagram of the cursor position memory 78 where the property information of a character or string concerning the input corresponding to the position of the cursor K is stored in correspondence. For instance, in telephone number registration mode, the jump address aaa is obtained from the instruction content memory 77 to jump to the address aaa of the cursor position memory 78 for specifying the property as any of "person's name", "association name", "place name" or "numeral" in correspondence with "cursor coordinates" to which the cursor K belongs (x1–x2, x3–x4, x5–x6, x7–x8 are representation by abscissa x of the area of input items "name", "assignment", "address" and "telephone number" on the display section 102 of FIG. 36. In other words, in telephone number registration mode, it is displayed on the display section 102 as shown in FIG. 36, and items to be entered being "name", "assignment", "address" and "telephone number", properties corresponding to these items "person's name", "association", "place name" and "numeral" are stored in correspondence with the cursor coordinates.

Figure 41:
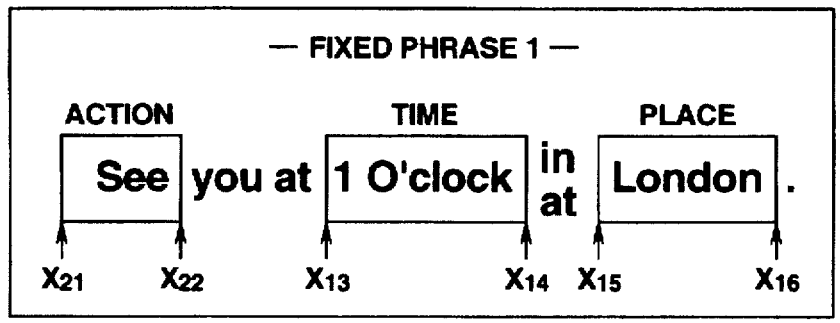
FIG. 41 is a diagram for illustrating an example of display in input mode of the fixed phrase 1 by the character input device according to the ninth embodiment of the present invention.
Figure 42:
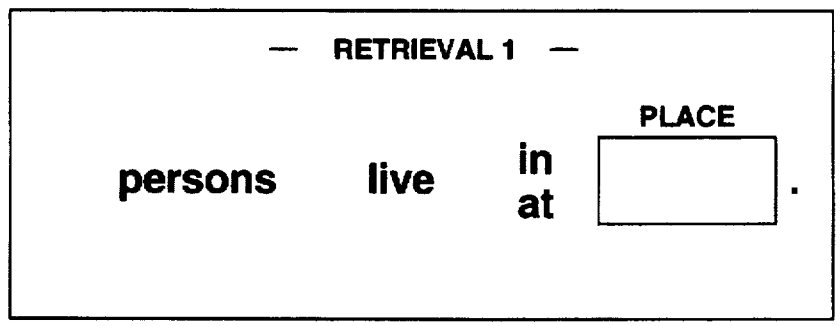
FIG. 42 is a diagram for illustrating an example of display in retrieval 1 mode by the character input device according to the ninth embodiment of the present invention.
Figure 43:
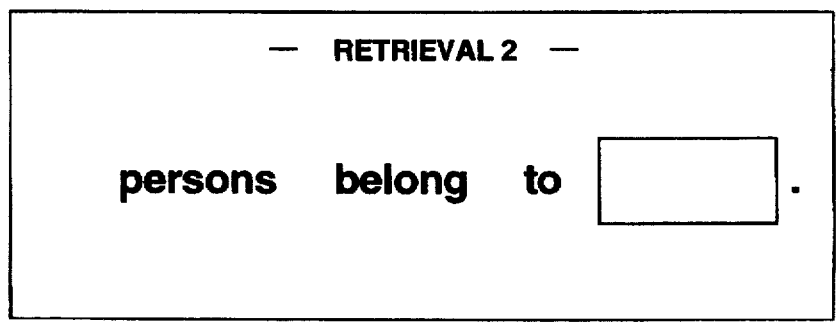
FIG. 43 is a diagram for illustrating an example of display in retrieval 2 mode by the character input device according to the ninth embodiment of the present invention.

On the other hand, In fixed phrase 1 input mode, as the display section 102 prompts to input the desire time, the desired place and the desired action as shown in FIG. 41, at the abscissa x13–x14 the property is "time", at the abscissa x15–x16 the property is "place name " and at the abscissa x21–x22 the property is "action". In this fixed phrase 1 input mode, it is possible to enter, for instance, "1 o'clock (time)", "London (place)" and "see (action)". Moreover, retrieval 1 mode is designed for retrieving data of person living in the specified place from the content of registration in the said telephone number registration mode and the display section 102 prompts, as shown in FIG. 42, input of a place name, so "London" may be entered for instance to retrieve persons living in London. So in retrieval 1 mode, the property being "place name", the property "place name" is directly stored in the instruction content memory 77 in correspondence with the retrieval 1. Retrieval 2 mode is designed for retrieve in data of persons belonging to a certain association from, for instance, the content of registration in the said telephone number registration mode and the display section 102 prompts, as shown in FIG. 43, input of an association name, so "Sales Dept." may be entered for instance to retrieve persons belonging to the Sales Dept. So in retrieval 2 mode, the property being "association name", the property "association name" is directly stored in the instruction content memory 77 in correspondence with the retrieval 2.

Figure 44:
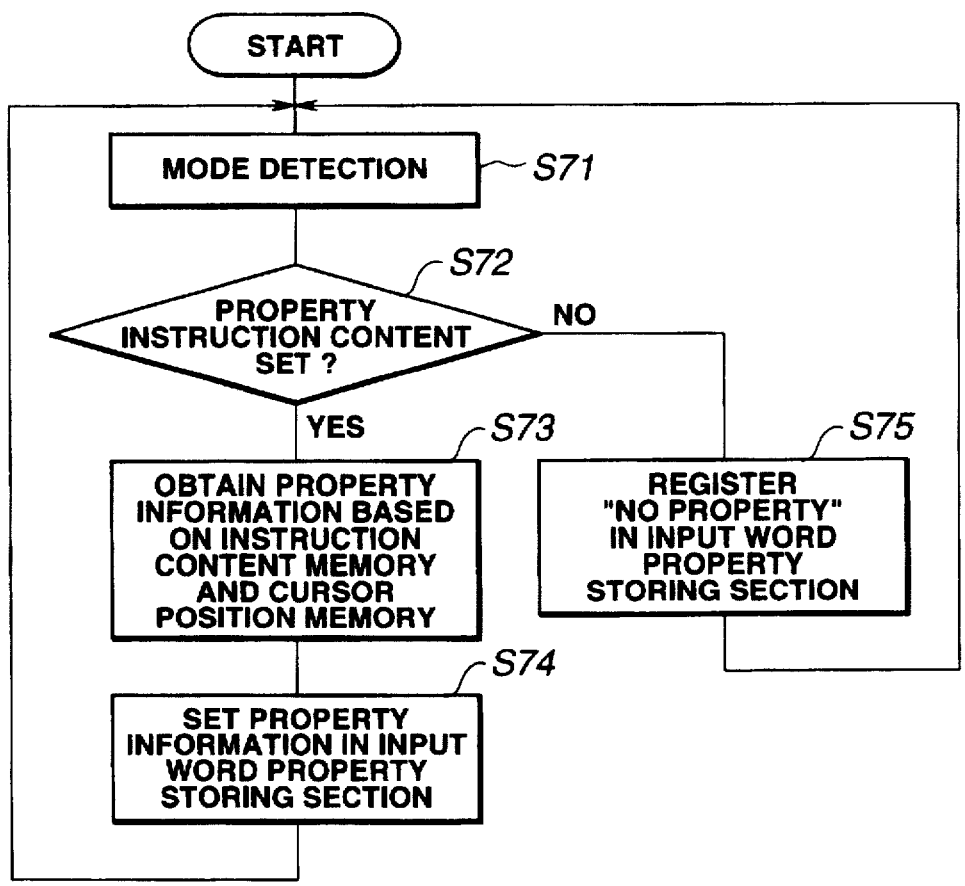
FIG. 44 is a flowchart for illustrating the property specification operation by the character input device according to the ninth embodiment of the present invention.

The central control section 13A acts as property information specification means 350 according to the program of the flowchart shown in FIG. 44, so now it will be described, when this device starts, the mode detection begins (S71). That is to say, in response to the operation of the mode key 64, the pointer P of FIG. 39 shifts to point the corresponding mode and the mode pointed by this pointer P will be detected. Here, referring to the concerned mode "telephone number registration" of the instruction content memory 77 shown in FIG. 39, it is detected if the property instruction information is set (S72). As jump address aaa to the coordinates position memory 78 is set in correspondence with "telephone number registration", the coordinates of the cursor K is obtained from the display control section 17, this coordinates value is compared with the cursor coordinates range stored in jump address aaa to the coordinates position memory 78 to detect in which range of cursor coordinates value does the cursor K exist for obtaining the corresponding property information (S73). As shown for instance in FIG. 36, when the cursor K exists in the area of input item "assignment", the cursor K coordinates exists in the range of abscissa x3–x4 of the cursor position memory 78 and the property "association name" can be obtained. In retrieval mode 1 or others, the property information can be obtained directly from the instruction content memory 77. Then, the central control section 13A sets this property information in an input word property storing section 19 (S74), returns to the step 71 to continue the processing. In the step S72, if it is detected that the property instruction content is not set (or "0" is set), "no property" is set in the input word property storing section 19 (S75), returns to the step 71 to continue the processing. Thus, the central control section 13A modifies continuously the property information.

Figure 45:
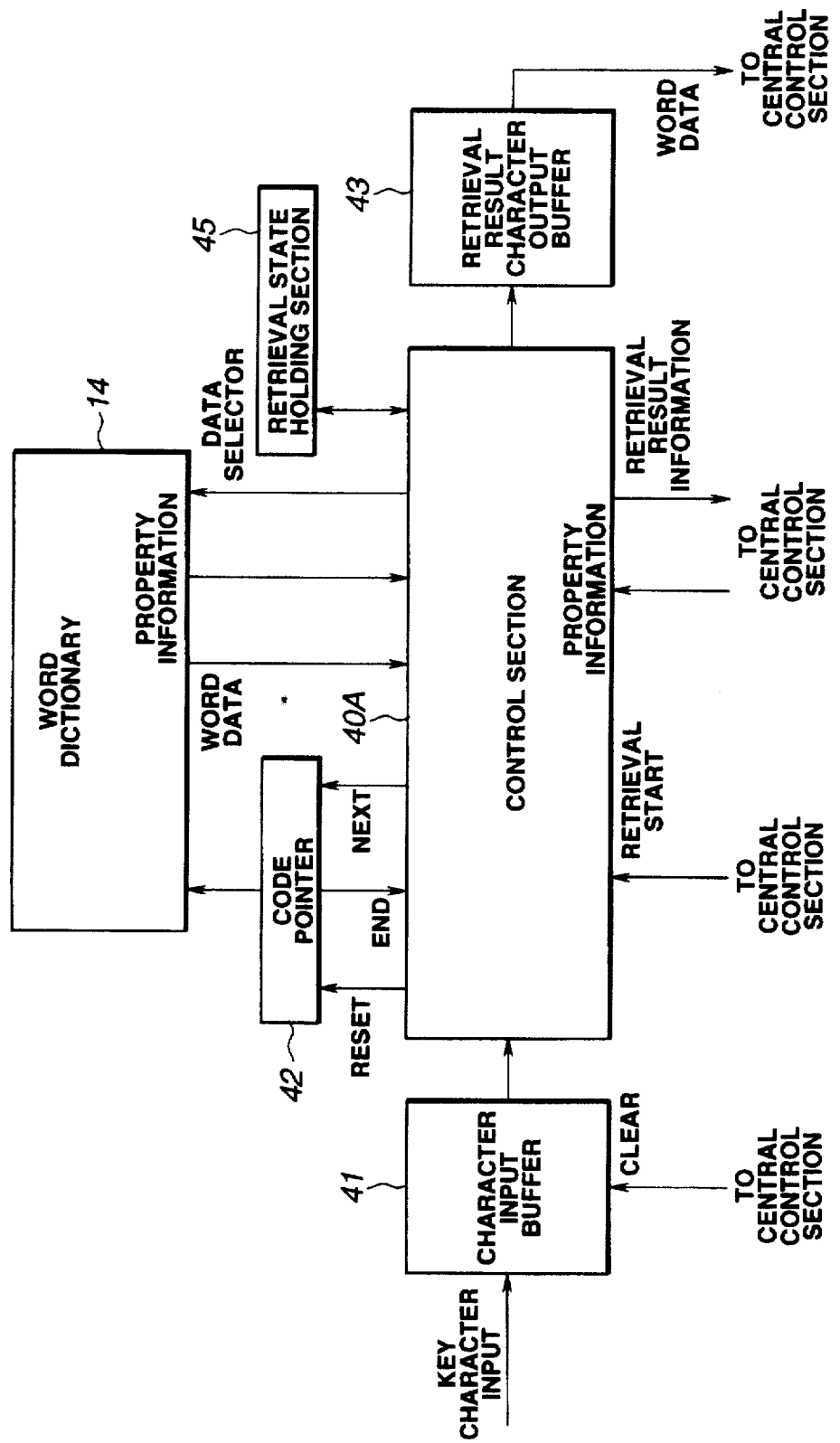
FIG. 45 is a composition diagram of the dictionary retrieval section, essential part of the character input device according to the ninth embodiment of the present invention shown In FIG. 37.

FIG. 45 is a detailed composition diagram of the dictionary retrieval section 15A. This dictionary retrieval section 15A is different from the dictionary retrieval section 15 of FIG. 9 in that it is provided with a retrieval state holding section 45 for receiving and storing property information from the input word property storing section 19 read and delivered by the central control section 13A. The central control 40A sets property information in the said retrieval state holding section 45, compares with the property information of the retrieval state holding section 45 when the property information is received from the word dictionary 14E with word data for deciding the candidate.

Figure 46:
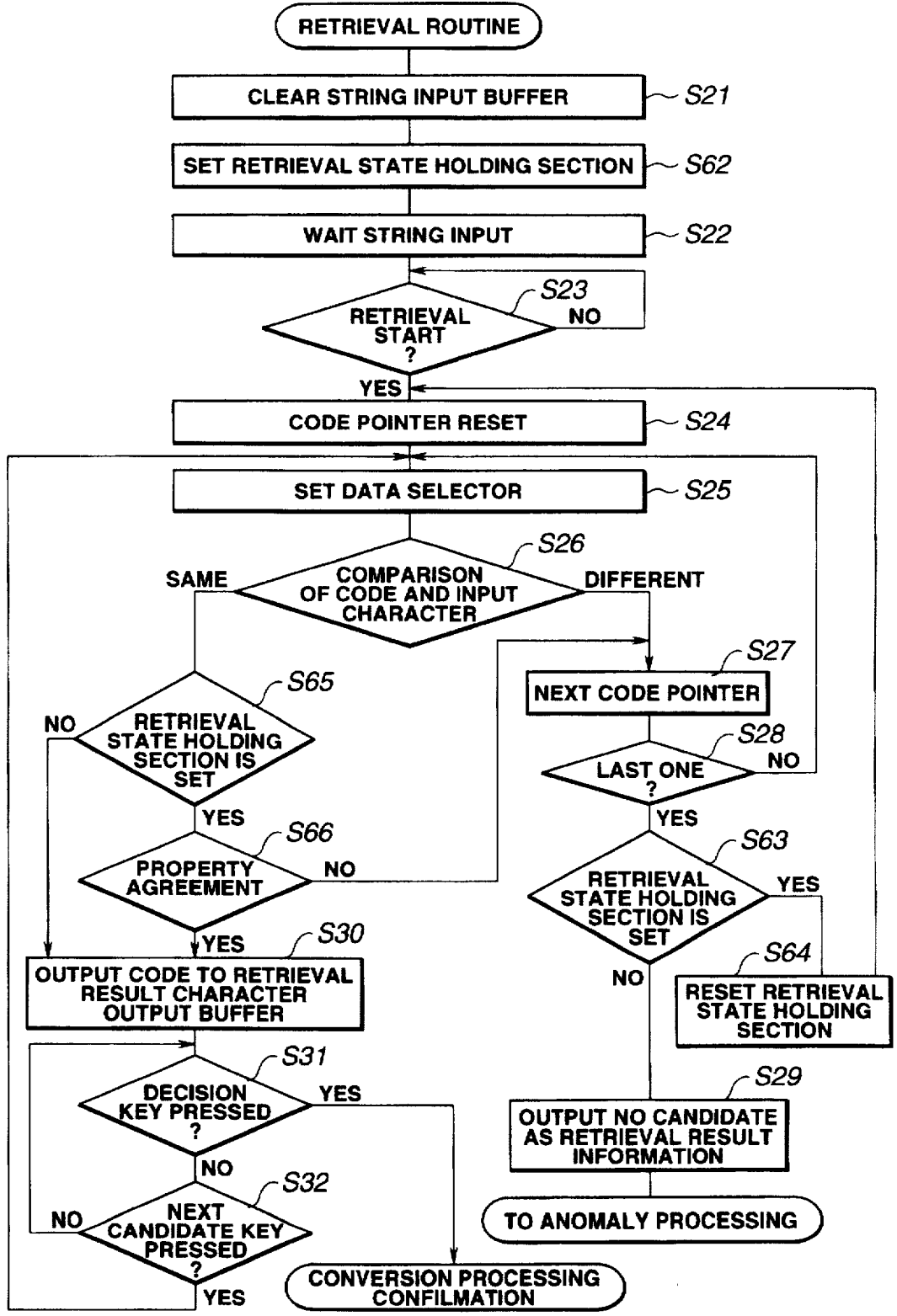
FIG. 46 is a flowchart for illustrating the candidate retrieval operation by the character input device according to the ninth embodiment of the present invention.

Now the operation of the said control section 40A according to the flowchart of FIG. 46. The control section 40A clears the character input buffer 41 (S21), receives property information from the input word property storing section 19 read and delivered by the central control section 13A and sets in the retrieval state holding section 45 (S62). As the result, property information from the input word property storing section 19 or "no property information" is set in the retrieval state holding section 45. The operation is similar to the first embodiment from the next step S22 to S26 for comparing input numeral or numeric string and the code of the word dictionary 14E and, if a candidate character corresponding to the input numeral or numeric string is not stored in the word dictionary 14e, the value o the code pointer will be incremented by delivering NEXT signal thereto (S27), it is detected if there is no candidate pointed by the code pointer 42 and the last entry is finished in the step S28, and if there is further entry, it returns to the step S26 to continue the processing. In the step S28, if it is detected that it is the last one, the content of the retrieval state holding section 45 is looked up to detect if the property information is set or not (S64). If the property information is set, it resets to "no property information" (S64) and returns to the step S25 to continue the operation.

On the other hand, if a candidate is detected in the step S26, the content of the retrieval state holding section 45 is looked up to detect if the property information is set or not (S65). Here, if property information is set, it is detected if this property information agrees with the property information of the obtained candidate (S66) and if they do not agree, it proceeds to the step S27 to retrieve another candidate. As mentioned before, the property information is added and stored after respective candidates (Str1–n) in FIG. 13. During such processing, if the property information agrees in the step S66, such candidate code is delivered to the retrieval result character buffer 43 (S30), the following processing is similar to the first embodiment. In the step S65, if the property information is reset or "no property information", it continues the same processing as the first embodiment without detecting agreement/non agreement of the property information.

Thus, in this ninth embodiment, the property of input character or string is specified, the candidate of the said property is extracted and delivered during the retrieval of candidate character or candidate string from the word dictionary 14E, the desired word (Chinese character and others) or others can be obtained rapidly. Namely, when a plurality of candidates exist corresponding to the input numeral of numeric string, only candidates of desired property ("place name" for example)are selected and output, the operator may effectively obtain the desired string (word) as the conversion result among a restricted number of candidates.

Moreover, in the said composition example, if it is composed to output beginning from the most frequently used candidate by providing the word dictionary 14E with use frequency information of each word, more frequently used candidates are output more rapidly so as to advantageously reducing the time necessary for obtaining the conversions result.

Figure 47:
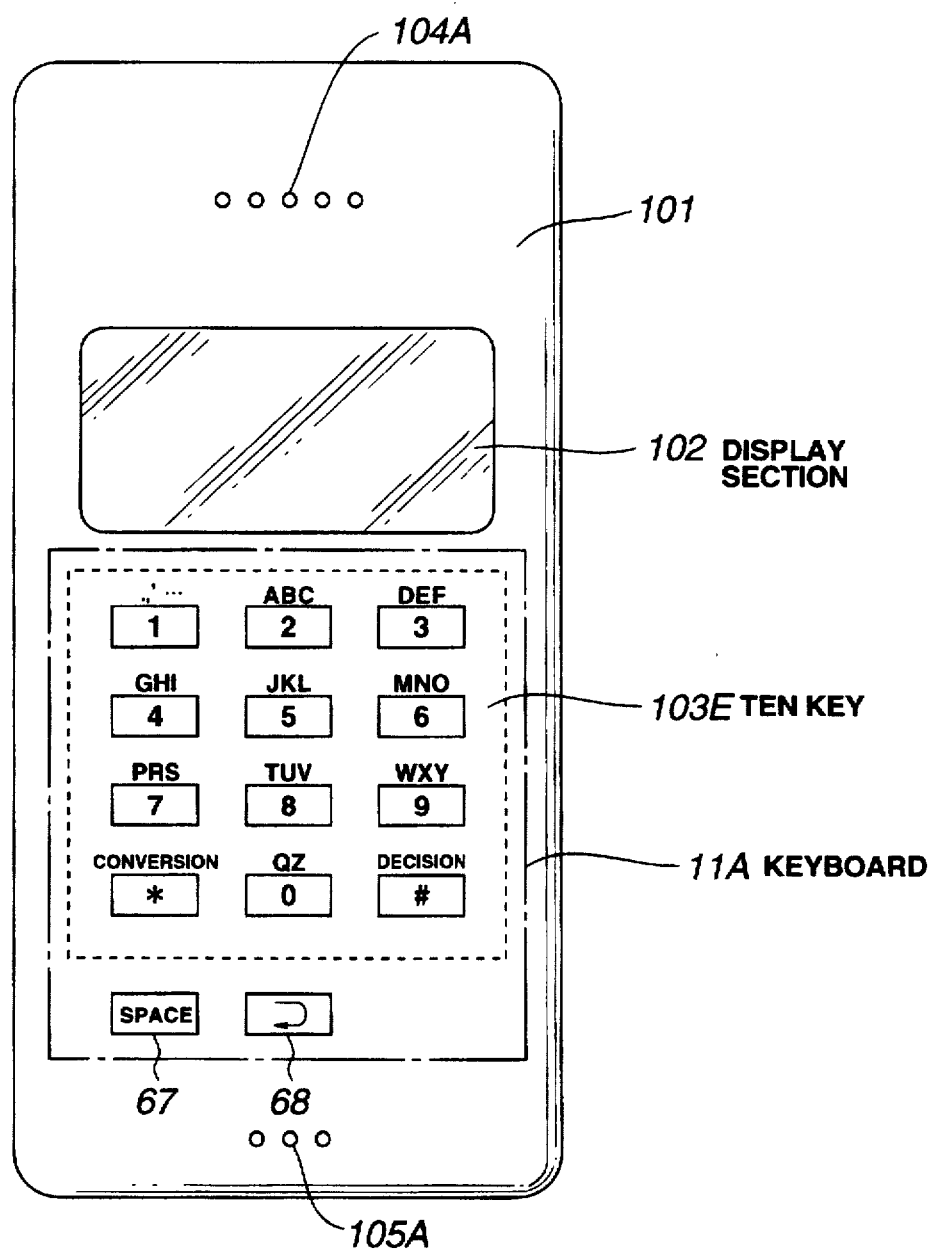
FIG. 47 is a front view of a cellular telephone including the character input device according to the tenth embodiment of the present invention.

Next, the tenth embodiment wherein the leading letter of a phrase is capitalized. As shown in FIG. 47, in the cellular telephone including this character input device, the keyboard 11A is composed of a space key 67 and a return key 68 disposed under the ten key 103E. Period, comma, apostrophe and others symbols are allocated to "1" key of the ten key 103E. Input codes from the keyboard 11A correspond to keys and respective character code of candidate character or candidate string in the word dictionary 13E is composed of small letters except for proper nouns.

Figure 48:
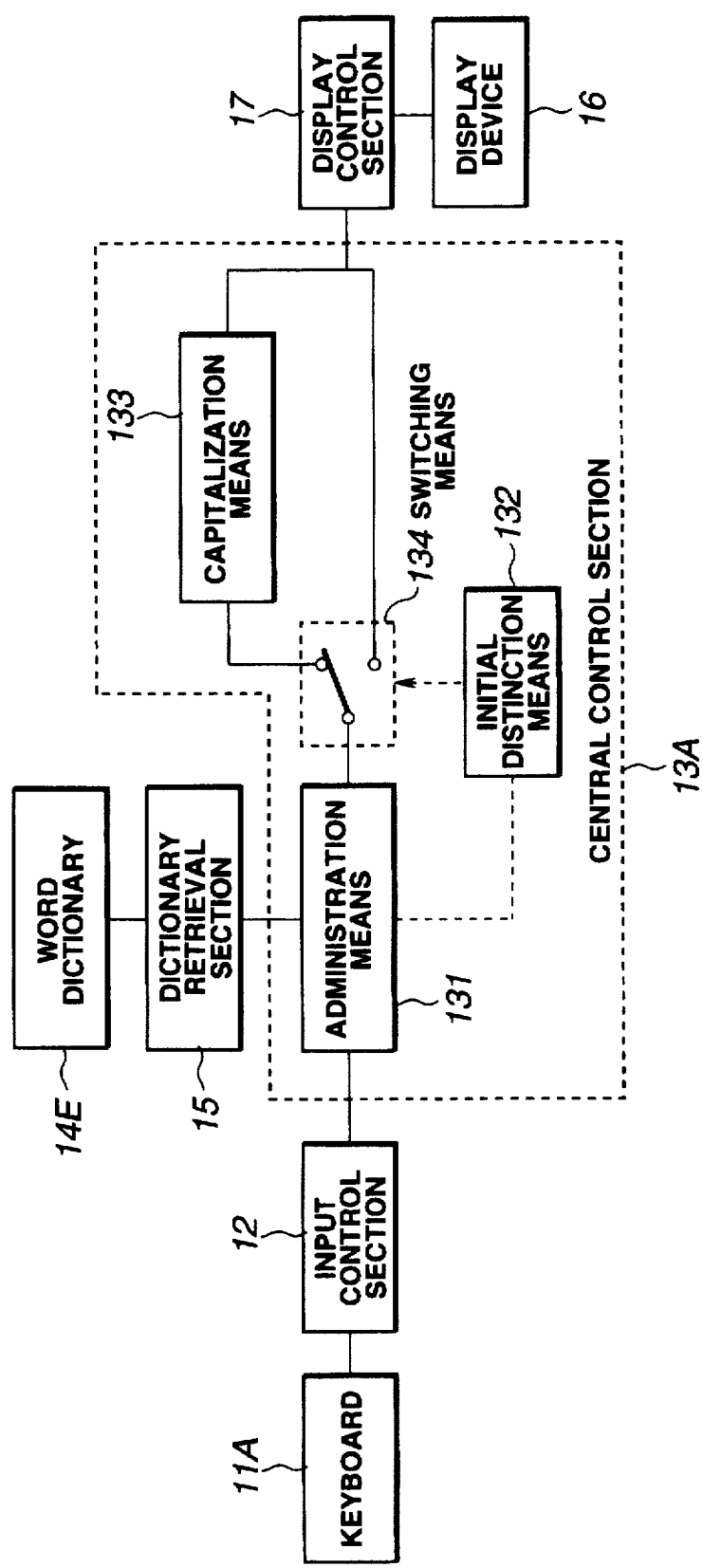
FIG. 48 is a composition diagram of the character input device according to the tenth embodiment of the present invention.

FIG. 48 show the composition of the said character input device. This embodiment differs from the composition of FIG. 3 in the composition of the central control section 13A. Namely, the central control section 13A comprises an initial distinction means 132 for distinguishing the initial based on the code arrangement corresponding to the key to be entered, a capitalization means 133 for converting the given character code into a capital letter code and outputting it and a switching means 134 for outputting the character code to be output through the said capitalization means 133 or outputting as it is depending on the distinction result of the said initial distinction means 132, the central control section 13A includes also an administration means 131 for receiving the code corresponding to the operated key, accumulating as it is or converted when it is a predetermined code, and for delivering it to the dictionary retrieval section 15 to retrieve candidate by consulting the word dictionary 14E if it is not a predetermined code, so as to obtain the code of candidate character or candidate string concerning the retrieval result. Then, the accumulated code and the code of the retrieval result by the dictionary retrieval section 15 are arranged in sequence for delivering to the switching means and the initial distinction means 132. Here, the predetermined code means the code by the operation of "1" key to which space key 67, return key 68 and period are allocated.

Upon the detection of space code and return code among code arrangements delivered by the administration means 131, the initial detection means 132 detects if the first precedent code (except for the predetermined code) is a period code or not, if it is the case (the first precedent code (except for the predetermined code) is a period code), it directs the switching means 134 to deliver a code of one character to the capitalization means 133, and if it is not the case, lets the code delivered as it is. Note that, initially, the switching means 134 lets the first one character code to the capitalization means 133 and the following codes as they are and then, in response to the instruction of the initial discrimination means 132, acts to deliver the said one character code to the capitalization means 133 and the following code as it is. When switching is directed by the intialization distinction means 132, the initial character code shall be output from the administration means 131.

Figure 49:
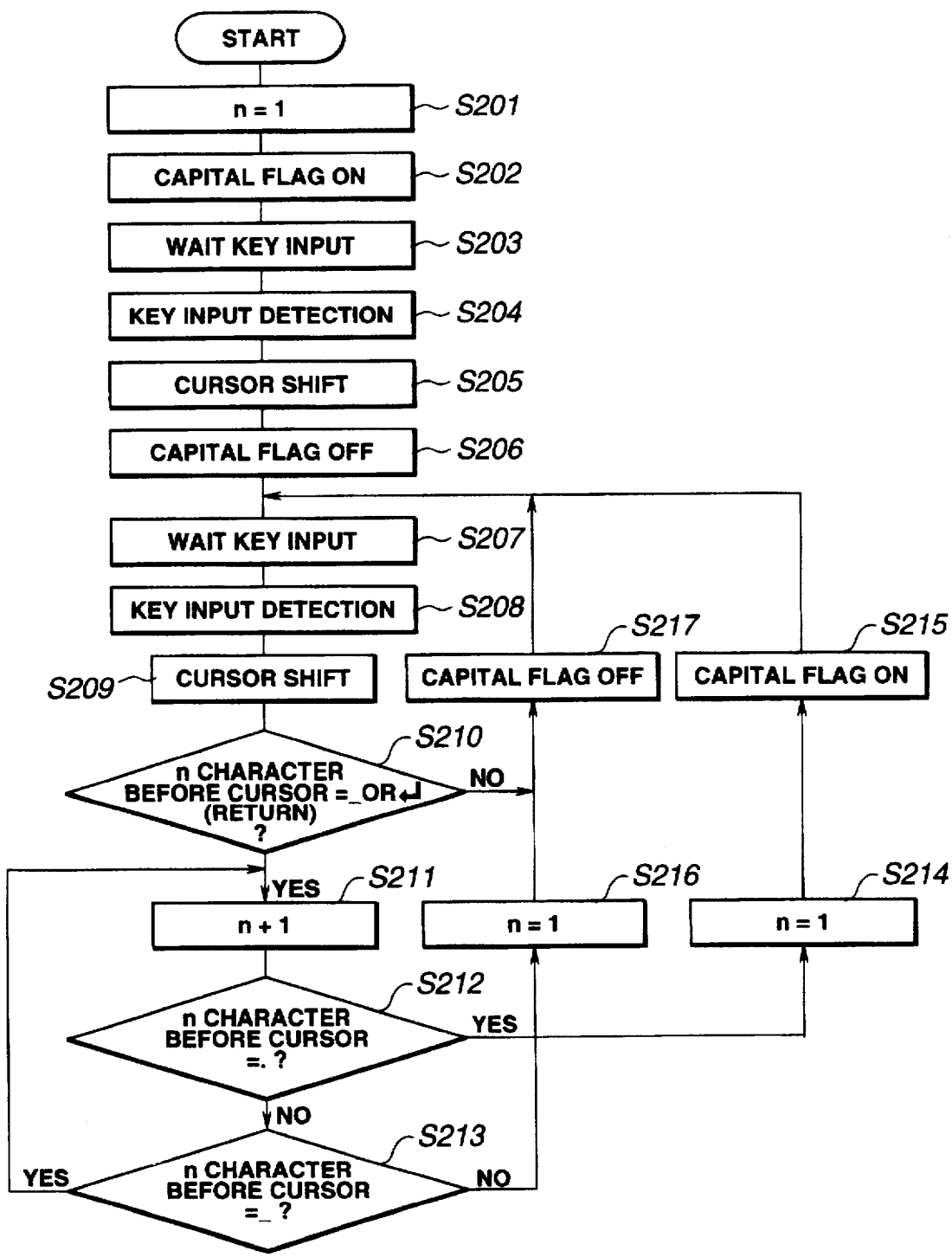
FIG. 49 is a flowchart for illustrating the operation of the character input device according to the tenth embodiment of the present invention.

To be sore specific, the central control means 13A composed of a computer controls ON/OFF of the capital flag of the main memory base on the program of the flowchart of FIG. 49 and converts the code based on it, so now this will be described. When the device is put on, it starts, sets the value n of the character position register of the main memory in 1 (s201) and sets ON the capital flag (s202). Next, it waits for arrival of the key input result delivered from the input control means 12 (s203), detects the key input (s204), directs the display control section 17 to shift the cursor key K (FIG. 42 and others) (s205) and sets OFF the capital flag (s206). As a result of the foregoing processing, as the capital flag is set when the key is entered for the first time, the character code concerning the conversion result of the concerned character shall be capital letter code, and for the character entered next, as the capital flag is OFF, the character code concerning the conversion result thereof is output as it is.

Therefore, when it is entered so as to obtain "This is a pen. That is a book.", the initial "T" will be capitalized and the following "h" will be a small letter. Moreover, the central control section 13a awaits for the key input result delivered fro the input control means 12 (s207), detects the key input (s208), directs the display control section 17 to shift the cursor key K (FIG. 42 and others) (s209) and detects if the character code n characters before this cursor K is a space code or a return code (s210). Here, as "his" is input following "T", one character before the cursor K is not a space code or a return code, it branched to no at the step s210, capital flag OFF is maintained (s217),and the operation continues from the step s207. During the said processing, as the final "s" of "This" and a space are input,it branches to yes at the step s210, the value n of the character position register is incremented by 1 to become "2" (s211). Then, it is detected if the character code 2 characters before the cursor K is a period code or not (s212). In the said example, as it is a "s" code and not a period, it proceeds to the step s213 to detect if the character code 2 characters before the cursor K is a space code or not (s213). In the forementioned example, as it is not a space code too (it is a "s" code.), the value n of the character position register is set back to 1 (s216) to proceeds the operation from the step s217. Thus, the processing will be performed as above, and when a space before "That" is detected, steps s210, s211 and s212 are executed to branch to yes there and the value n of the character position register is set back to 1 (s214), the capital flag is set on (s215) to continue the processing of the step s207 and thereafter. As the result, "T" of "That" will be capitalized. Here, the pass of branching to yes at the step s213 and returning to the step s211 corresponds to the processing corresponding to the case where a plurality of spaces are input after a period.

Capital flag ON/OFF being controlled as mentioned before, based on this ON/OFF of the capital flag, the output code to the display section 17 is converted and the initial letter of a phrase will be capitalized and output. In the said character code conversion, capital code and small letter code of an alphabet is different of 20 H (H in hexa) as shown in FIG.50, the capital code can be obtained by subtracting 20 H (H in hexa) from the small letter code.

Figure 51:
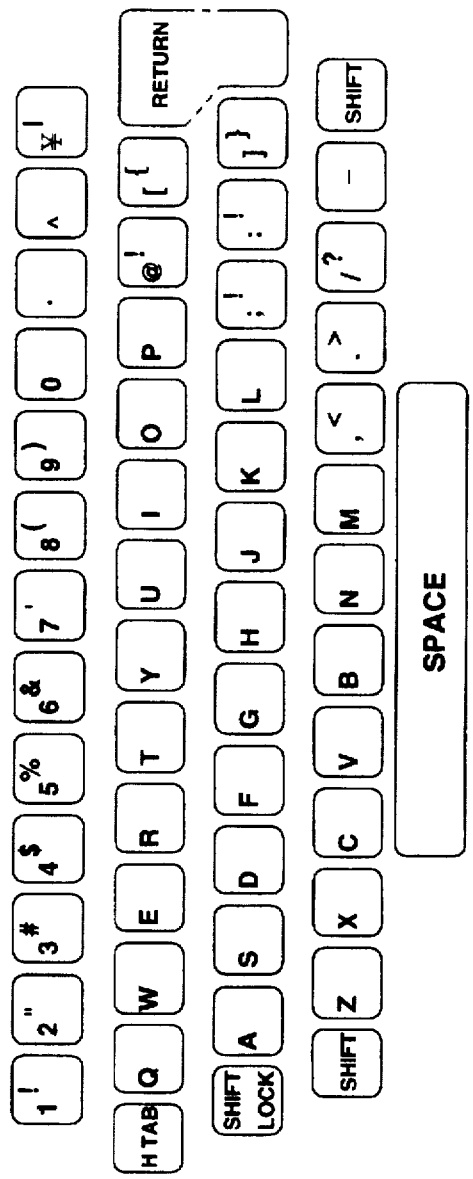
FIG. 51 is a diagram for illustrating the key layout of a full keyboard.

In the foregoing example, a character input device provided with a plurality of keys to which a plurality of alphabets are allocated was described, but the automatic conversion function of small letter code to capital code may be applied to a character input device provided with a full keyboard such as typewriter. In other words, in a character input device adopting a full keyboard wherein all alphabetic letters are allocated as shown in FIG.47 to respective key one by one as shown in FIG. 51, small letters are entered in normal shift state and a capital letter corresponding to a character key is entered by pressing a desired character key all the way operating the shift key. Namely, As shown in FIG. 53, if the output "This is a pen. That is a book." should be output as shown in FIG. 54, the character key "T" should be pressed all the way operating the shift key respectively when one enters "T" of "This" and "T" of "That", which is rather troublesome. In FIG. 53 to FIG. 56, "*" designates the input of a space key. On the other hand, in FIG. 54–FIG. 56, respective character is shown by capital letter as indicate at the key top.

In another full keyboard provided with a "caps" key, it is composed to switch over between capital and small letter. If such a full keyboard is employed and the output "This is a pen. That is a book." should be output, "caps" key should be operated before and after entering "T", initial of "This" and before and after entering "T", initial of "That" as shown in FIG. 55, which is also rather troublesome.

Figure 52:
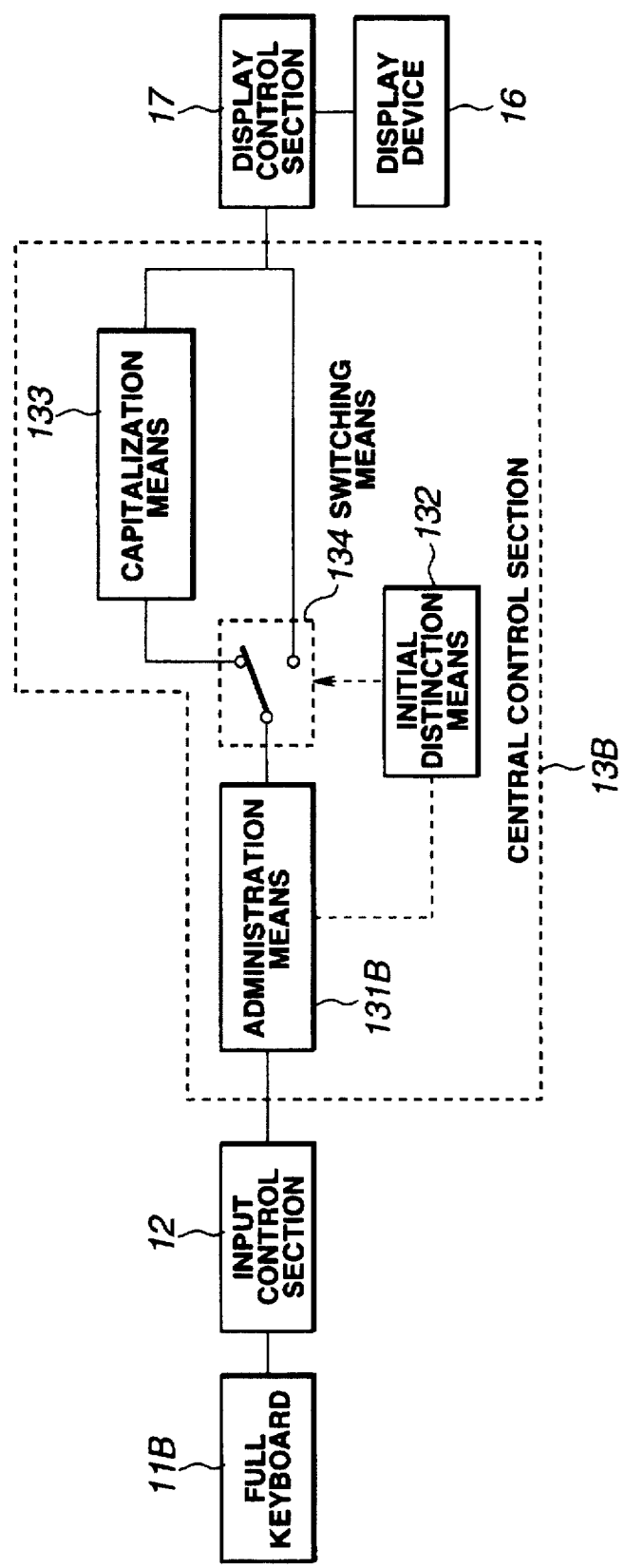
FIG. 52 is a composition diagram of the character Input device using a full keyboard.

So the character input device is composed as shown in FIG. 52. In other words, a full keyboard 11B shown in FIG. 51 is adopted and small letter code is capitalized by the central control section 138. The input control section 12 generates a character code corresponding to the character key (small letter character code in normal shift state and capital character code if it is entered with the operation of the shift key) to be delivered to the administration means 131B. The administration means stores the code without delivering it to the dictionary retrieval section 15 and outputs synchronized with the distinction by the initial distinction means 132. In practice, the operation proceeds following the program of the flowchart shown in FIG. 49 mentioned above, and the character code is converted based on it. Thus, when the full keyboard 11B shown in FIG. 51 is employed, initials will be capitalized and output automatically by entering "THIS*IS*A*PEN.*THAT*IS*A*BOOK." in normal shift state, without operating the shift key, as shown in FIG. 56 and the operator will be advantageously delivered from a conventional troublesome key operation.

Figure 57:
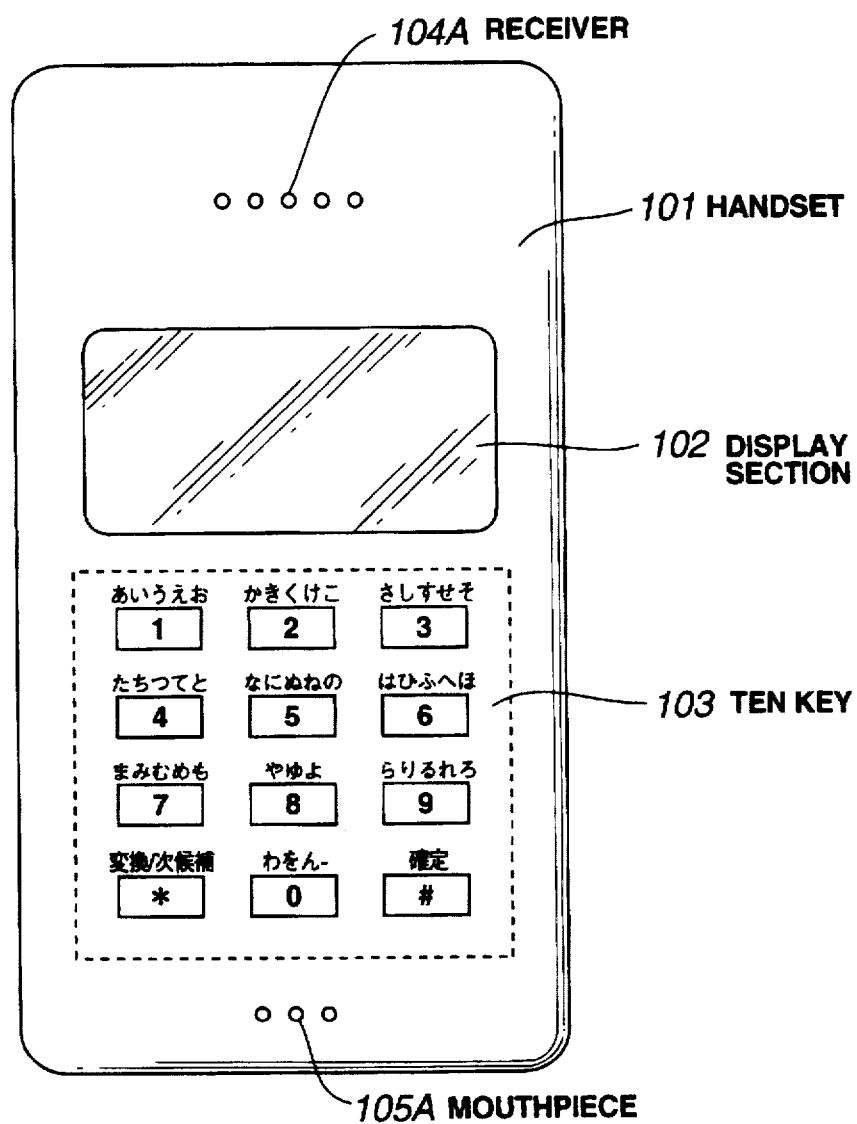
FIG. 57 is a front view of a cellular telephone including the character input device corresponding to Japanese input according to an embodiment of the present invention.

Now, a character input device capable of Japanese input will be described. FIG. 57 is a front view of a cellular telephone including the character input device according to an embodiment of the present invention. A handset 101 is composed of a rather flat rectangular parallelopipedal case, a ten key (dial key) 103E comprising keys in 4 rows 3 columns from the center to the bottom of the surface thereof and a display section 102 for displaying character, symbol or other information at the top thereof. Above the display section 102, there is provided a receiver section 104A for listening to the transmitted voice, and below the ten key 103E, there is provided a mouthpiece section 105A for inputting the voice.

Figure 58:
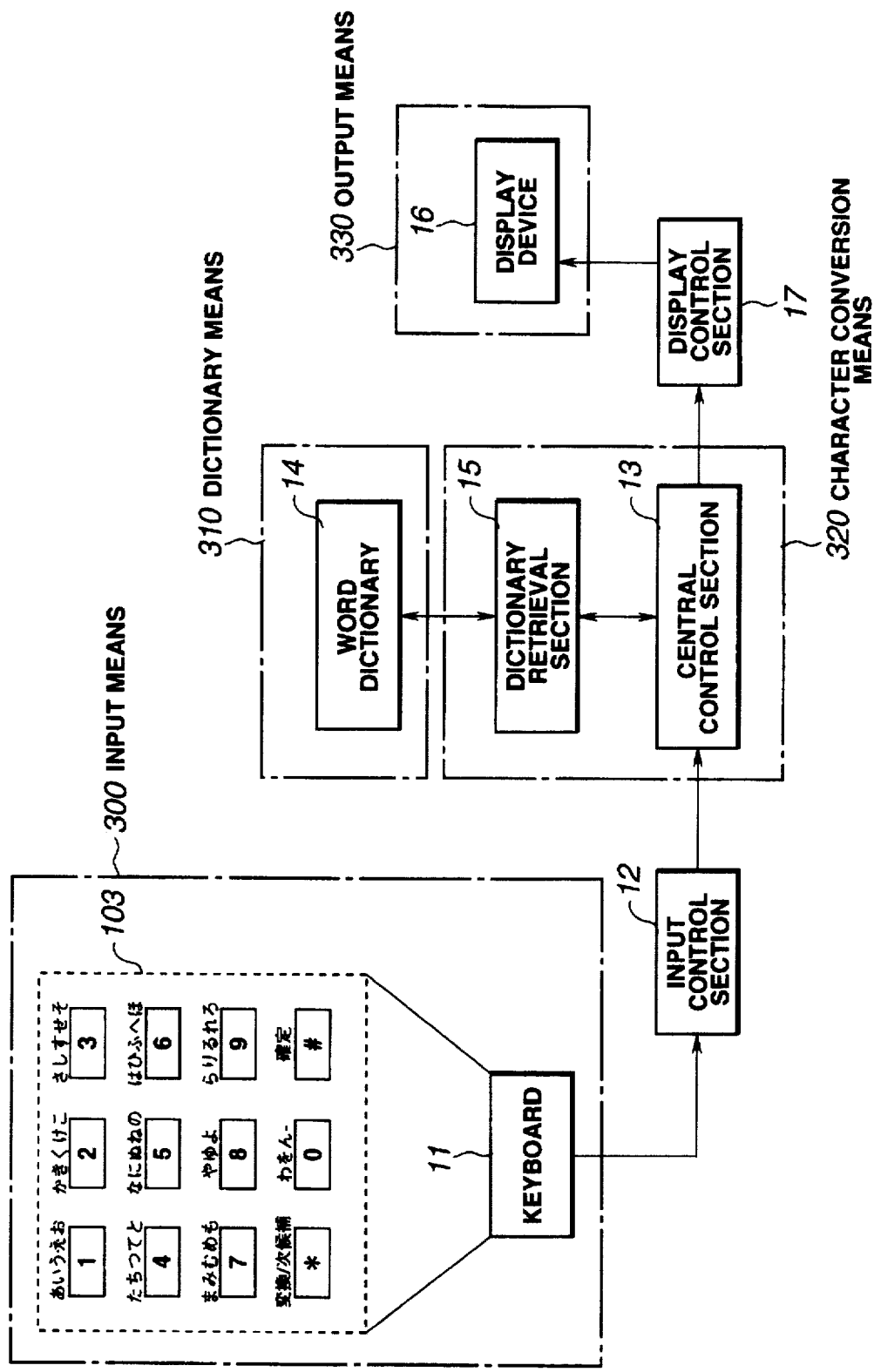
FIG. 58 is a composition diagram of the character input device corresponding to Japanese input according to an embodiment of the present invention.

The inner composition of the said cellular telephone is similar to the first embodiment shown in FIG. 2. FIG. 58 is a composition diagram of the cellular telephone of FIG. 57 put in the operation mode of character input device. This composition corresponds to the portion comprising the input section 2 and the character input/output section 7 of FIG. 2. The character input device includes a keyboard 11 for entering characters or others, a input control section 12 for collection information of key operation on the keyboard 11 and for delivering to a central control section 13, a central control section 13 for integrally control respective sections of the character input device, a word dictionary 14E which is a dictionary means 310 storing the correspondence between input character or input string and candidate character or candidate string as the result of conversion, a dictionary retrieval section 15 for retrieving the corresponding candidate character or candidate string referring to the word dictionary 14E concerning the input character or string delivered from the central control section 13, a display device 16 comprising LCD or others for displaying characters or other information and a display control section 17 for performing the control displaying candidate character or candidate string or others on the display device 16 under the control of the central control section. A plurality of kana are distributed to respective numeric keys of the ten key 103 of the keyboard.

Now Japanese kana input will be described. Kana characters include kata-kana notation disclosed in U.S. Pat. No. 4,872,196 and another hira-kana notation and this embodiment shall be described about hira-kana notation. The matrix corresponding to the U.S. Pat. No. 4,872,196 is shown in hira-kana notation if FIG. 59. In this hira-kana matrix, the row beginning with "A" is called "a" row, the row beginning with "KA" "ka" row, the row beginning with "SA" "sa" row, and "ta" row, "na" row, "ha" row, "ma" row, "ya" row, "ra" row and "wa" row thereafter. In addition to this, kana characters include "n (NN)" allocated to "0" key and "-(long vowel mark)".

In normal dial key disposition, 5 characters of "a" row are allocated to "1" key, 5 characters of "ka" row to "2" key and so on; like this kana characters are allocated up to "0" key. However, "ya", "yu" and "yo" are allocated to "8" and "wa", "wo", "n" and "-" are allocated to "0"key. Moreover, "*" key is employed as conversion/next candidate key and "#" key is employed as decision key. In the foregoing, the keyboard 11 comprises a plurality of keys to which a plurality of kana are allocated, a conversion key for directing character conversion and a decision key for confirming the result of conversion so as to constitute an input means 300, the display device 16 constitutes an output means 330 for at least displaying and outputting candidate character or candidate string as the result of conversion and the central control section 13 and the dictionary retrieval section 15 constitute a character conversion means 320 for obtaining candidate character or candidate string through retrieval of the said dictionary means 310 in respect of a character corresponding to a key or of a plurality of characters corresponding to a plurality of keys entered from the input means 300 and for supplying the said output means 330 with this candidate character or candidate string.

The composition of the said keyboard 11 is similar to the first embodiment shown in FIG. 4, the composition of the input control section 12 is similar to the first embodiment shown in FIG. 5, the content of the memory table 22 included in the said input control section 12 is similar to the composition of the first embodiment shown in FIG. 6, and the key loading operation assumed by the control section 20 included in the said input control section 12 is similar to the operation of the first embodiment shown in FIG. 7. Moreover, the detailed composition of the display control section 17 of the character input device according to this embodiment is similar to the composition of the first embodiment shown in FIG. 8 and the detailed composition of the dictionary retrieval section 15 of the character input device according to this embodiment is similar to the composition of the first embodiment shown in FIG. 9.

Figure 62:
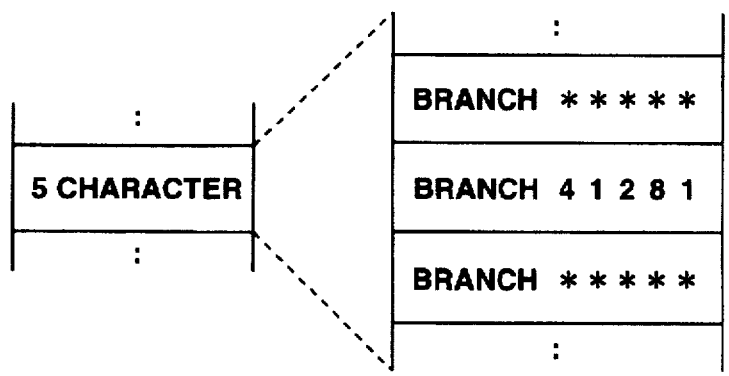
FIG. 62 is a composition diagram of essential parts of the dictionary shown in FIG. 61.
Figure 63:
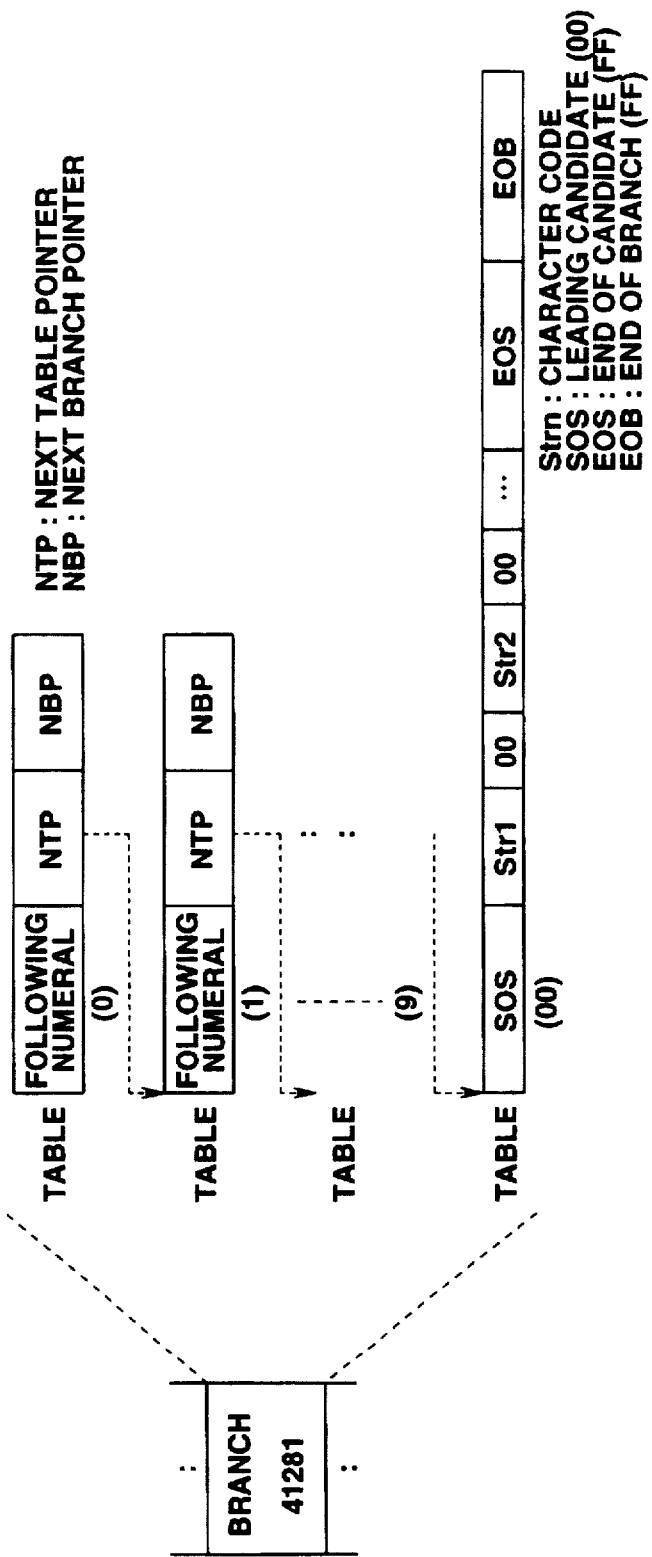
FIG. 63 is a more detailed concrete composition diagram of the essential section of the dictionary shown In FIG. 62.

FIG. 60 shows the content stored in the word dictionary 14. Namely, in correspondence to the numeric code by the operation of the ten key 103, dictionary information comprising kana character or string, Chinese character or string, property information including article, location, time and others and other information are stored in correspondence. To be more specific, the word dictionary 14 is composed as shown in FIG. 61 to FIG. 63. First, the word dictionary 14 is composed of blocks divides into character number unit as shown in FIG. 61. As shown in FIG. 62, the block corresponding to respective number of characters is composed of a plurality of branches corresponding to numeric string of the concerned number of characters. Here, a plurality of branches corresponding to numeric strings of 5 characters exist in the block of 5 characters and the branch corresponding to the numeric string "41281" among them is shown explicitly while the specific numeral is shown by "*" in other branches. Moreover, FIG. 63 shows the content of the branch corresponding to the numeric string "41281". The branch contains tables corresponding to the following numerals (0) to (9) if they exist (two tables if only (1) and (8) exist as the following numeral) and a table corresponding to SOS(00) indicating the leading candidate corresponding to the numeric string when there is no following numeral.

The table corresponding to the following numerals (0) to (9) contains corresponding following numerals, a pointer NTP of the next table and a pointer NBP of the next branch in set. On the other hand, the table corresponding to SOS (00) contains a code SOS(00) indicating the leading candidate of the case when no following numeral exist ( corresponding to the numeric string "41281" in this case), a character or string code Str1–Strn (represent n candidates by character code from 1 to n), a code EOS (FF) indicating the end of candidate character or candidate string code and a code EOB (FF) indicating the end of the branch in set. If a plurality of candidates exist, the code EOS(FF) indicating the leading character is also registered between respective ones of the plurality of candidates. If the property information should be memorized. It is set after the character code Str1–Strn of the respective candidate with a symbol indicating the property information.

If a plurality of candidate character or candidate string exist as mentioned above, it is not only because of the existence of homonyms as in usual Japanese word processor, but also because a plurality of kana are allocated to a single key. For instance, when "1" key is operated and then "2" key is operated successively, as it concerns "a" row and "ka" row, "aka", "aki", "ike", "oke" and other candidate strings exist as meaningful word among combinations of any of "a", "i", "u", "e" and "o" and any sound of "ka", "ki", "ku", "ke" and "ko". These words means respectively "red", "autumn", "pond" and "tab" and correspond to respective Chinese character in the Japanese column of FIG. 64 and stored by Chinese character code, hira-kana code or kata-kana code in the word dictionary 14. While for the numeric string "41281" shown as example in FIG. 63, as meaningful words, "Tokyo", "Telkyo" or others exist as shown in FIG. 65.

In the present invention, voiced sounds including "G,Z, J,D,B" and the p-sound in the kana syllabary shown in FIG. 66 and 67 are entered replaced by sounds in parentheses of FIG. 66, 67. Independent of this input, the word dictionary 14 is composed so that candidates of voiced sounds including "G,Z,J,D,B" or candidates of the p-sound in the kana syllabary are output. For instance, the dictionary is so composed that, when "402" is input, not only candidates which may be read "tenki" but also those read "denki" are also included and when "69" is input, not only candidates which can be read "hari" but also "bari" are included. More over, in Japanese, contracted sounds or syllabic nasals are noted by small letters of "ya", "yu", "yo" or "tu", but these small letters shall be entered in capital. For example, in the notation of "Tokyo", "kyo" includes a small letter of "yo", but a numeric string "41281" representing the pronunciation "Tokiyou" when it is capitalized shall be entered.

Figure 68:
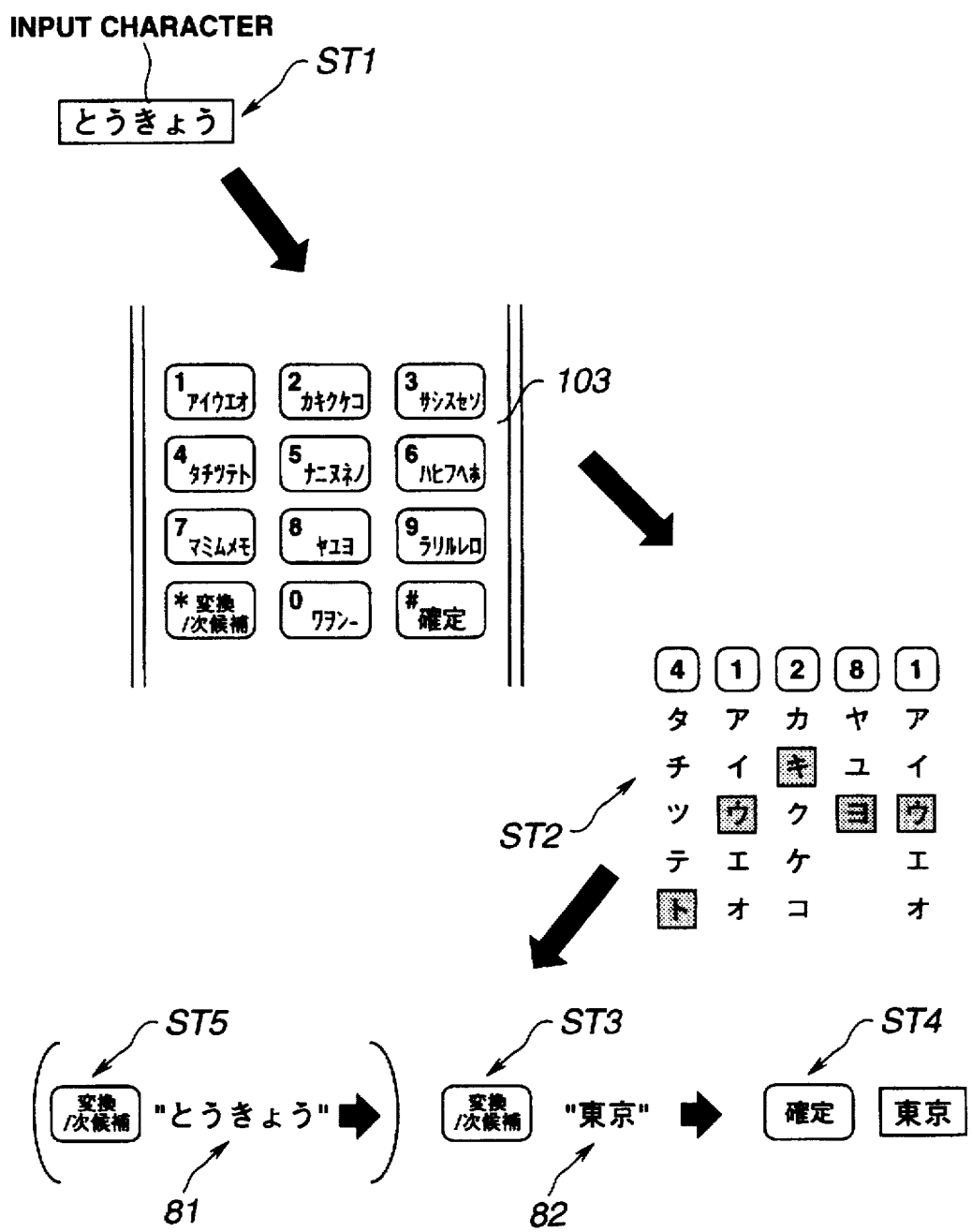
FIG. 68 is a diagram for illustrating the input operation using the character input device corresponding to Japanese input of the present invention.

The control section 40 of the dictionary retrieval section 15 shown in FIG. 14 processing the retrieval of the word dictionary 14 according to the program of the flowchart shown in FIG. 14, the operation of the control section 40 will be described according to this flowchart. The control section 40 clears a character input buffer 41 (S21) and waits for the arrival of the code of input character or input string (code of numeric key) (S22), in this example, the operator wants to enter "Tokyo" as input character as shown in ST1 in FIG. 68. There, the operator operates the corresponding key of the ten key 103 of a cellular telephone. Different from the ten key 103 of FIG.57, kana are indicated directly on the rounded key top of the ten key 103 in FIG. 68 and kana are kata-kana and not hira-kana. This shows that an appropriate input can be made both by the ten key 103 in the form of FIG. 57 or this ten key 103 of FIG. 68 for this character input device. The numeric key of the ten key 103 is operated "41281" as shown by ST2 in FIG. 68. It is shown that the operator made input desiring the encircled kana among kana corresponding to "41281" of ST2.

Then, by the operation of the input control section 12 described for FIG. 7, a code corresponding to the operated numeric key is obtained and a code string corresponding to the said "41281" is stored in the character input buffer 41. Next, the operator presses "*" key, that is conversion/next candidate key for conversion as shown by ST3 in FIG. 68. The operation of this "*" is also converted into a code by the operation of the input control section 12 described for FIG. 17 and then delivered to the central central section 13. On reception, the central control section 13 transmits a retrieval start signal to the central control section 40 of FIG. 9. There, as shown in FIG. 14, the control section 40 monitoring the retrieval start (S23) resets a code pointer 42 (S24) and put a data selector signal in set state (S25). Next, the control section 40 takes out codes stored in the character input buffer 41 from the beginning and start the retrieval from the block of single character of the word dictionary 14E. The retrieval procedure is identical for any number, so the description will begin with the retrieval in the block of 3 characters.

Figure 69:
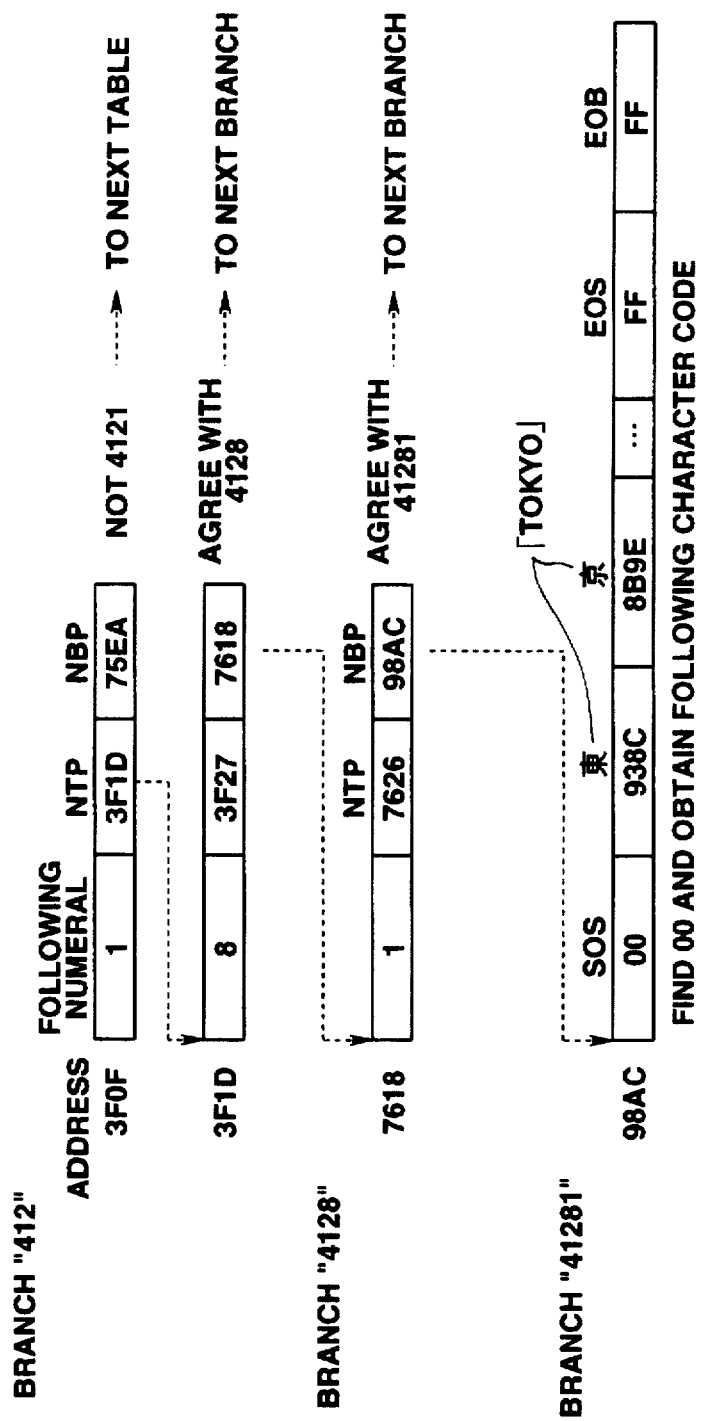
FIG. 69 is a diagram for illustrating the dictionary retrieval by the input operation using the character input device corresponding to Japanese input of the present invention.

FIG. 69 is a diagram for illustrating the processing from the retrieval in the block of 3 characters. It arrives at the table of the address "3F0F" of the block of 3 characters in response to the numeric string "412". The following number in this table is "1" and different from the fourth number "8" of the numeric string "4128" stored in the character input buffer 41, so the next table will be retrieved based on NTP. Here exist only a candidate with the numeral "1" following the numeric string "412" and a candidate with "8", so the table of candidate with following number "8" is retrieved immediately. Usually, however, tables of following numerals as much as they exist such as table with the following numeral "1", then table with the following numeral "2", then table with the following numeral "3" and so on before arriving at the table of the following numeral "8".

When the following numeral agrees, it arrives at the first table of the branch "4128" of 4 characters based on NBP of this table. In this table, as the following numeral is "1". It agrees with the fifth numeral "1" of the numeric string "41281" stored in the character input buffer 41. When the following numeral agrees. It arrives at the next branch "41281" based on NBP of this table. Here, originally, as there is no following numeral stored in the character input buffer 41. It retrieves a table wherein "00" is set in the area of following numeral. In this example of FIG. 67, it is supposed there is no candidate having a numeral following the numeric string "41281" even in the word dictionary 14E or no table. It arrives from the table of the branch "4128" directly to the table of the address "98AC" where "00(-SOS)" is set in the area of following numeral.

In the example of FIG. 69, as "Tokyo" is set by 2 Chinese characters in the first candidate string, the code of 2 Chinese characters corresponding to "Tokyo" is read in response to the output value "0" of the code pointer 42. The forementioned processing corresponds with the processing from "Retrieval" (S25) to the loop (S26, S27, S28) in FIG. 14. The increment of the code pointer 42 in the step 27 corresponds to the sequential table retrieval in FIG. 16 and, at the same time, to the read-out by specifying respective candidate character in the target table. Therefore, in practice, the retrieval of candidate character made in FIG. 16 is equivalent to the retrieval of the word dictionary 14E shown in FIG. 10. In this example 2 Chinese characters corresponding to "Tokyo" is obtained, however. If a candidate character corresponding to the entered numeric string does not stored in the word dictionary 14E, the value is increased by supplying the code pointer 42 with NEXT signal (S27), the loop from S28 to S26 is reiterated and eventually, if candidate character or candidate string can not be retrieved, it branches to YES at S28. In other words, END signal is returned from the code pointer 42. There, the control section 40 transmits "No candidate" as retrieval result information to the central control section 13. Receiving this "No candidate", the central control section 13 supplies the display control section 17 with character font "No candidate" for displaying that no candidate exist by means of LCD display device 18 (S29).

The code of 2 Chinese characters corresponding to "Tokyo" obtained as mentioned above is transmitted to the retrieval result character output buffer 43 (S30). Base on the retrieval result information, the central control section 13 is notified with the result output, the code of 2 Chinese characters corresponding to "Tokyo" is taken into the central control section 13 from the retrieval result character output buffer 43, transmitted to the display control section 17 and then delivered to the (LCD) display device 18 for visualization as described for FIG. 8. Namely 2 Chinese characters corresponding to "Tokyo" is displayed on the (LCD) display device 16. The control section 40 of the word dictionary 14E monitors the operation of the decision key or the next candidate key (S31, S32). The operation of the decision key or the next candidate key is transmitted from the input control section 12 to the central control section 13 as in the operation of the forementioned conversion key.

In the example of FIG. 66, as 2 Chinese characters corresponding to "Tokyo" are desired characters, the decision key is pressed as shown in ST4. Receiving the code of the decision key, the central control section 13 shifts the retrieval signal to inactive. Receiving this, the control section 40 of the dictionary retrieval section 15 branches to YES from the step 31 for confirming the said candidate character. When hira-kana corresponding to "Tokyo" is stored as the first candidate and then 2 Chinese characters corresponding to "Tokyo" is stored in the word dictionary 14E in correspondence with "41281", first hira-kana 81 corresponding to "Tokyo" is displayed as shown in parentheses at ST5 in FIG. 66, the next candidate key is operated in response to this, the value of the code pointer 42 is increased by receiving NEXT signal (S27), the code of the next candidate. 2 Chinese characters corresponding to "Tokyo" are obtained for proceeding from S26 to S30 to display 2 Chinese characters 82 corresponding to "Tokyo". In this case also, as 2 Chinese characters 82 corresponding to "Tokyo" are the intended characters, the decision key is pressed as shown in ST4. The further processing is as shown above.

As mentioned above, the character input device according to this embodiment of the present invention comprising respective key to which a plurality of kana are allocated and moreover, the conversion/next candidate key and the decision key, it allows to input and select appropriately candidate strings composed of candidate character corresponding to a kana allocated to the operated key or the combination of kana string allocated to a plurality of operated key. Namely, it is appropriate for a information terminal provided with few keys.

Figure 70:
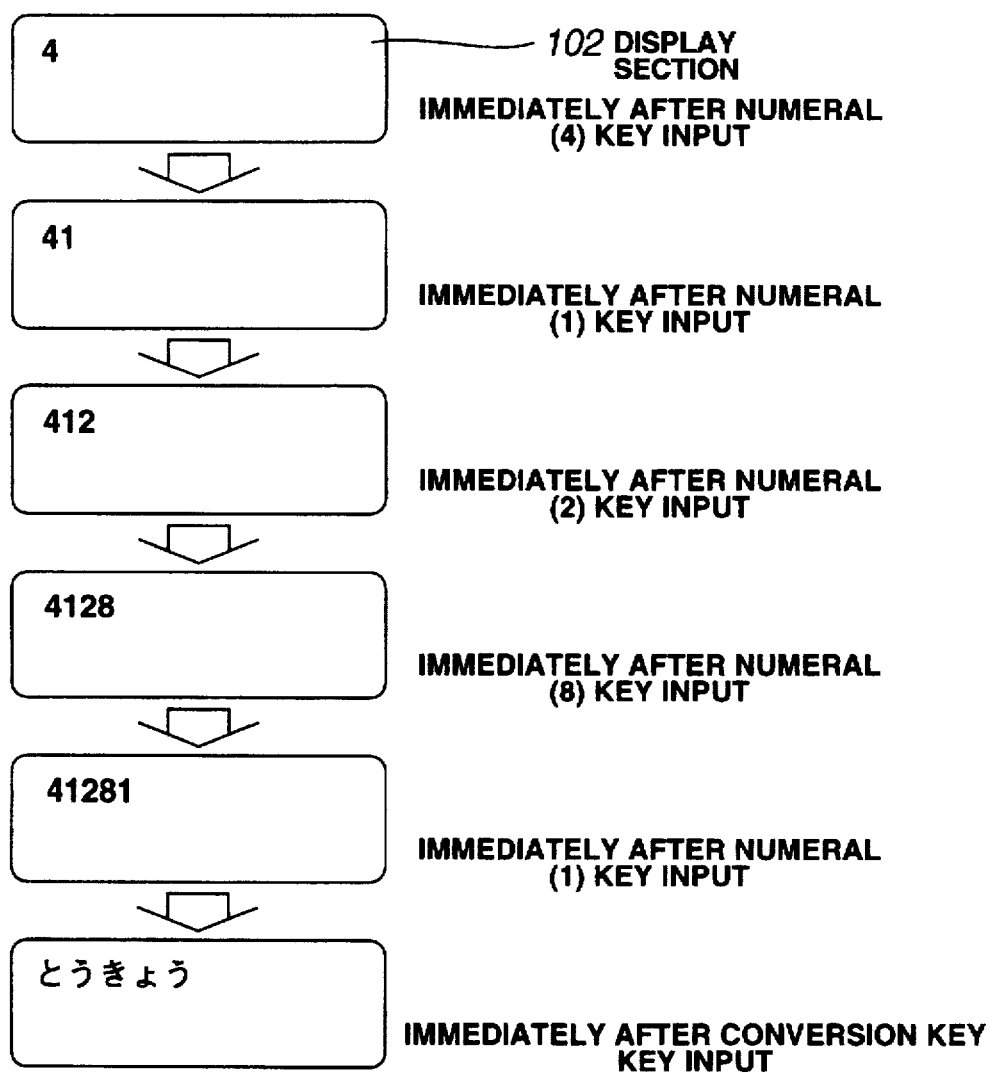
FIG. 70 is a diagram for illustrating the first example of the display procedure by the character input device corresponding to Japanese input of the present invention.

In the said embodiment, as nothing is displayed in the display section 102 if "*" key, that is conversion/next candidate key. In not operated, the operator can not check if the key operation is correct so as to deteriorate the maniability. So the program corresponding to the flowchart of FIG. 14 with which the control section 40 of the dictionary retrieval section 15 is replaced by a program corresponding to the flowchart of FIG. 17. In other words, when "41281" corresponding to the reading of "toukiyou" is key entered, each time the respective key is operated, as the numeral corresponding to the operated key will be displayed increasingly such as "4", "41", . . . . , "41281" as shown in FIG. 70, the operator can confirm that the key operation is accepted, that the key operation is correct, namely, that the numeral key to which respective kana of the reading "toukiyou" is allocated is operated. When "*" key, that is conversion/next candidate key, is operated, the character conversion is performed using the word dictionary 14, the code of the corresponding candidate character is read from the word dictionary 14 and displayed in place of the display of the said numeric string "41281". Here, the example of FIG. 70 shows that the first candidate string of the table corresponding to the numeric string "41281" of the word dictionary 14 is "Tokyo" in hira-kana.

Figure 71:
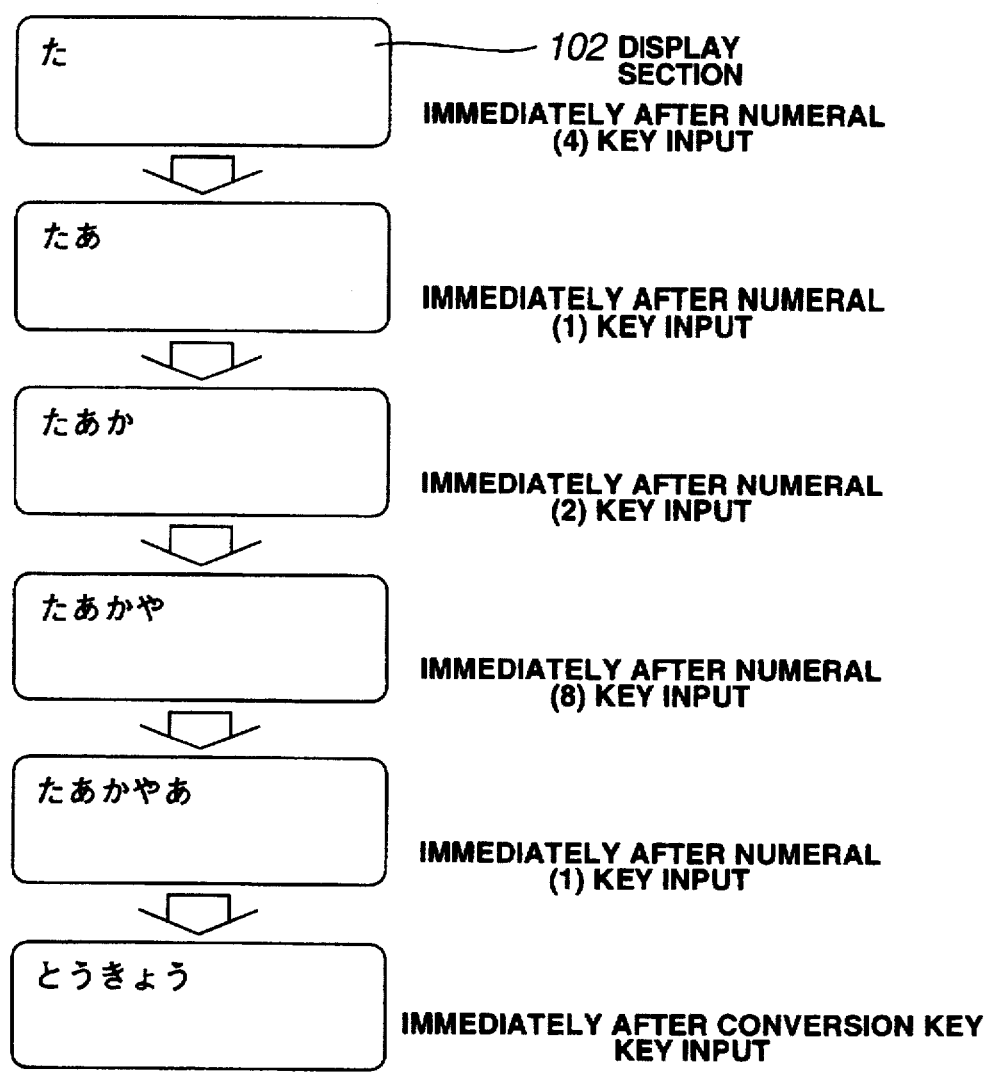
FIG. 71 is a diagram for illustrating the second example of the display procedure by the character input device corresponding to Japanese input of the present invention.

Additionally, the control section 40 of the dictionary retrieval section of the character input device corresponding to Japanese input comprises also a table for converting numeric codes into the representative character of each row of hira-kana matrix and transferring the representative character of each row obtained from numeric codes to the display control section 17. The display control section 17 patterns it to write into the image memory 33 for displaying the corresponding character. To be more specific, the said table is a table wherein code of "1" and code of "a", code of "2" and code of "ka", code of "3" and code of "sa", . . . . , code of "0" and code of "wa" are associated. Performing the processing of the flowchart shown in FIG. 19, when "41281" corresponding to the reading of "touklyou" is key entered, each time the respective key is operated, as the row character corresponding to the operated key will be displayed increasingly such as "ta", "taa" , . . . , "taakayaa" as shown in FIG. 71, the operator can confirm that the key operation is accepted, that the key operation is correct namely, that the numeral key to which respective kana of the reading "toukiyou" is allocated is operated. When "*" key, that is conversion/next candidate key, is operated, the character conversion is performed using the word dictionary 14, the code of the corresponding candidate character is read from the word dictionary 14 and displayed in place of the display of the said row string "taakayaa". Here, the example of FIG. 71 shows that the first candidate string of the table corresponding to the numeric string "41281" of the word dictionary 14 is "Tokyo" in hira-kana.

Figure 72:
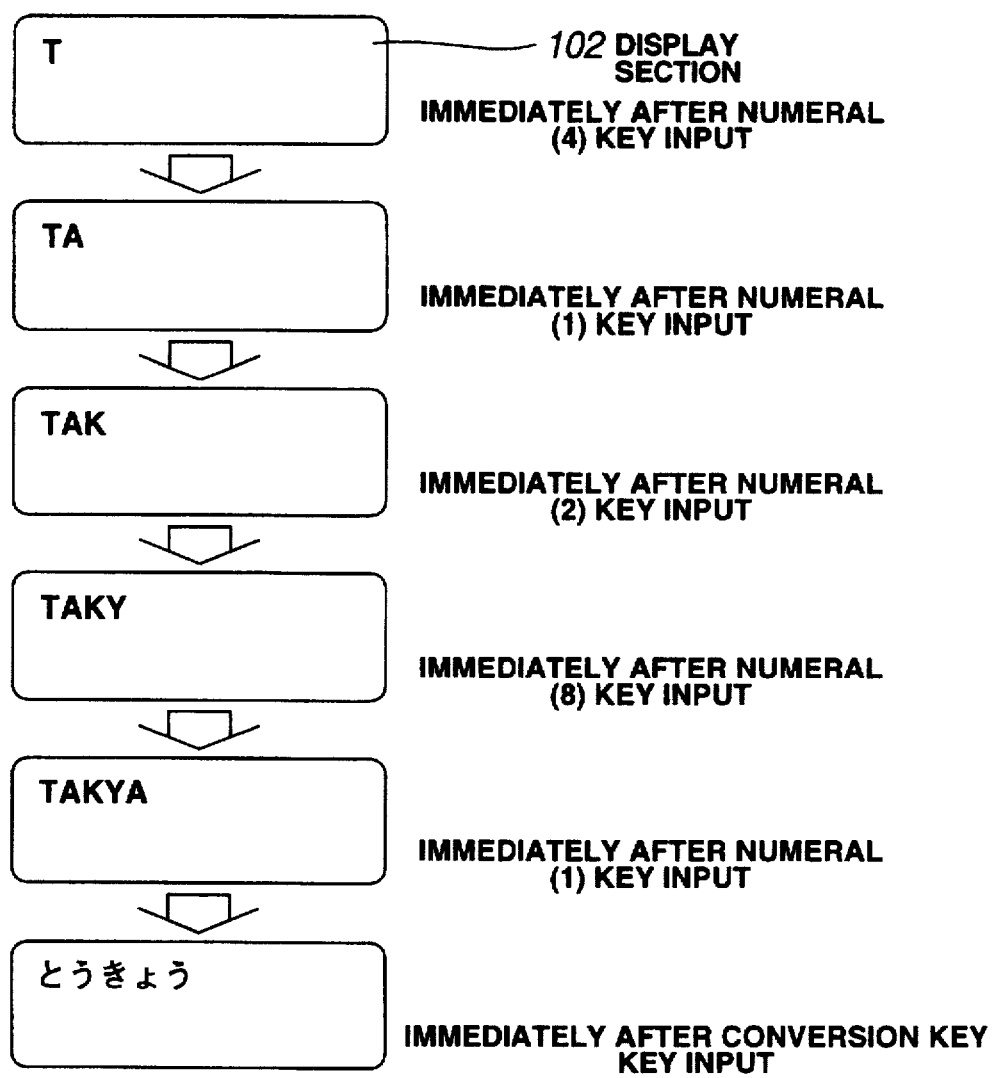
FIG. 72 is a diagram for illustrating the third example of the display procedure by the character input device corresponding to Japanese input of the present invention.

FIG. 72 illustrates the alphabetic representation of representative character of each row of hira-kana matrix. In this case, in the table of the central control section 13, code of "1" and code of "A", code of "2" and code of "K", code of "3" and code of "S", . . . . , code of "0" and code of "W" are associated. Therefore, when "41281" corresponding to the reading of "toukiyou" is key entered, each time the respective key is operated, as the row character corresponding to the operated key will be displayed increasingly such as "T", "TA", . . . . , "TAKYA" as shown in FIG. 72, so the operator can confirm that the key operation is accepted, that the key operation is correct, namely, that the numeral key to which respective kana of the reading "toukiyou" is allocated is operated. In this example, the conversion is performed by the table of the central control section 13, however, in other embodiments, it is also possible to obtain directly in hira-kana code or directly in roman letter code the representative character of respective row of hira-kana matrix by means of a memory table of the input control section 12 shown in FIG. 5. In this case, the word dictionary is also composed to associate string of a representative character or string in hira-ka code or romam letter code of the representative character of each row of hira-kana matrix and candidate character or candidate string. In such a composition also, it is possible to confirm the acceptance of key input and the correct operation and moreover, to obtain an appropriate character or string (word) with few key input.

Figure 73:
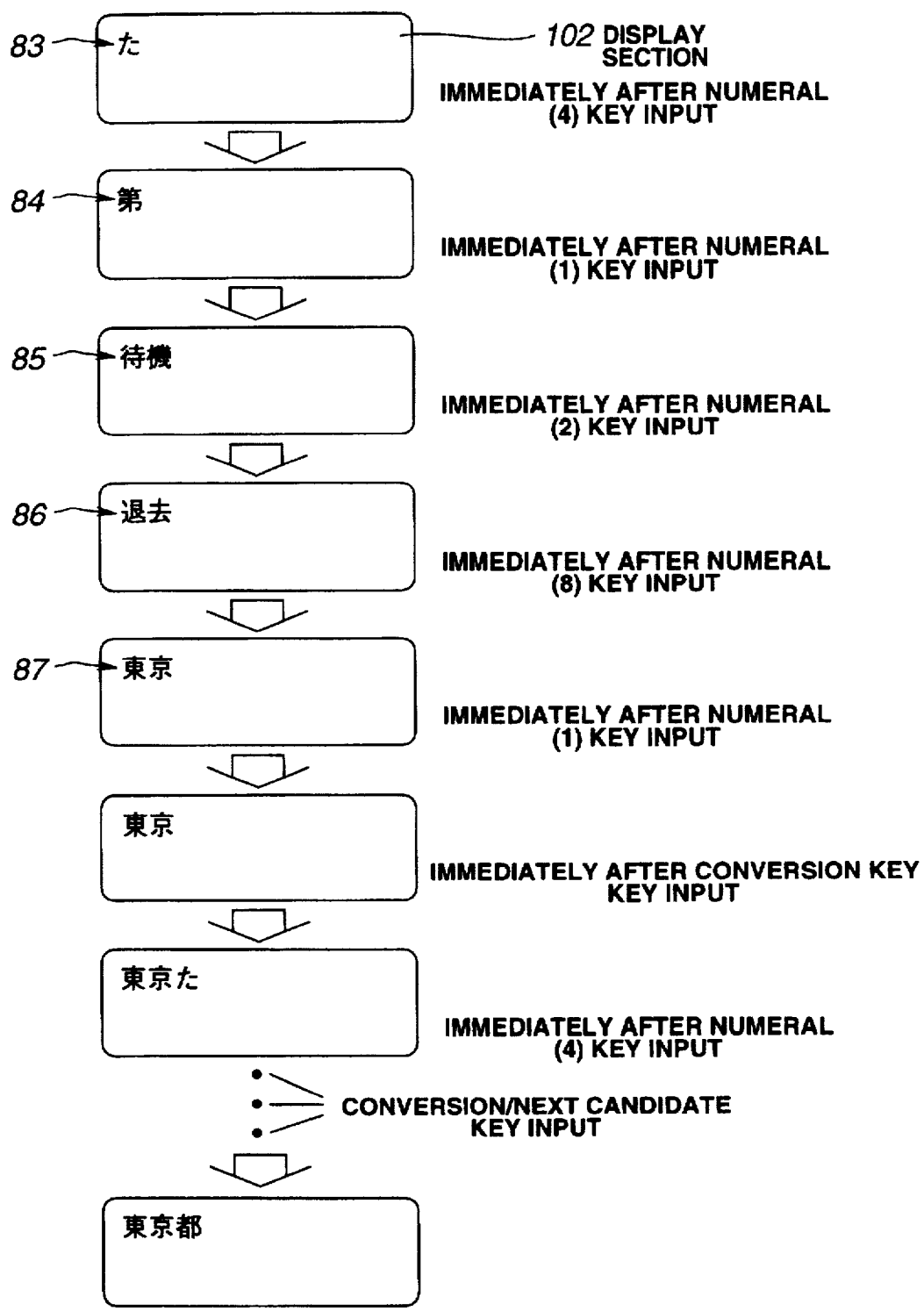
FIG. 73 is a diagram for illustrating the forth example of the display procedure by the character input device corresponding to Japanese input of the present invention.
Figure 74:
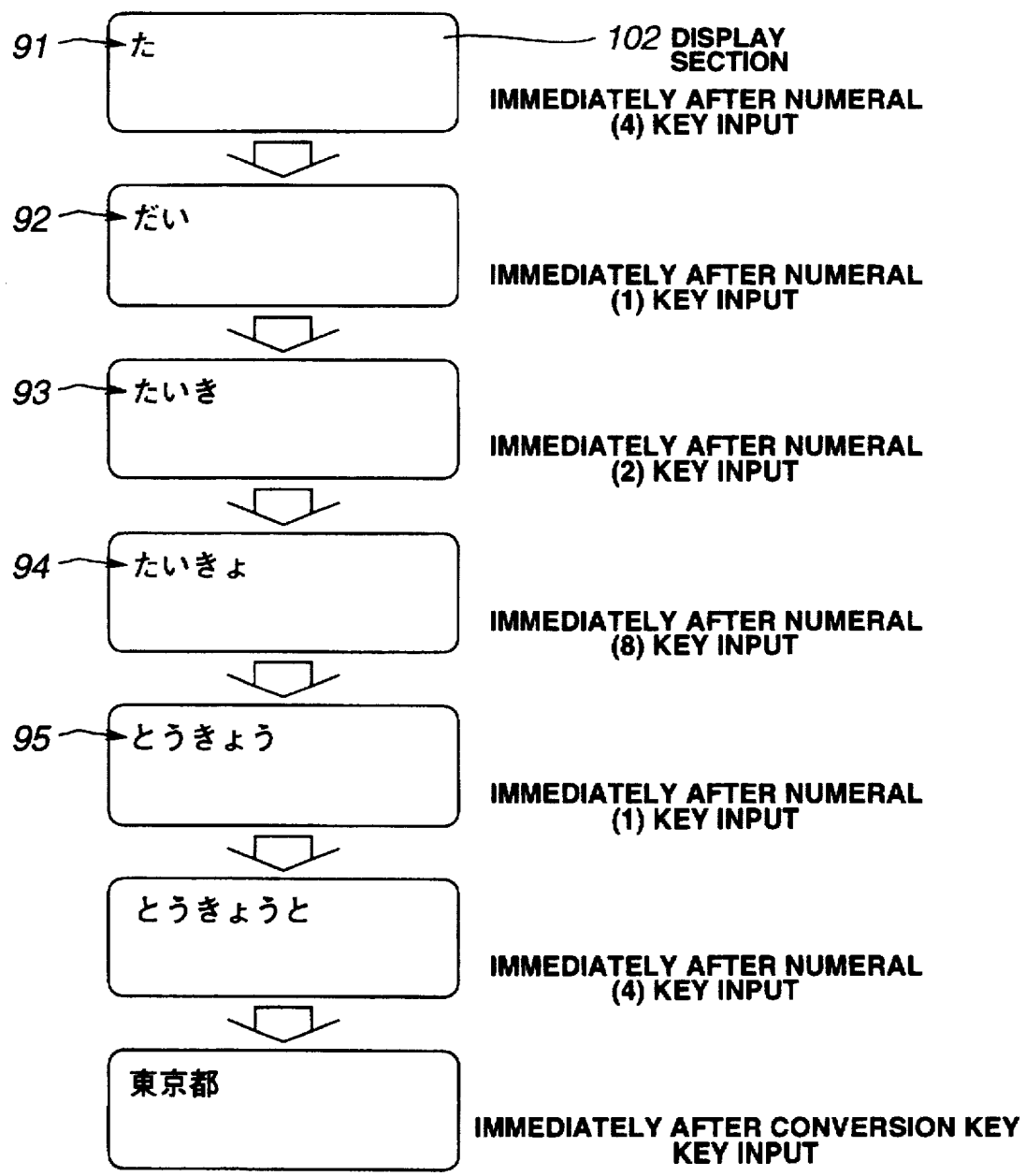
FIG. 74 is a diagram for illustrating the fifth example of the display procedure by the character input device corresponding to Japanese input of the present invention.

Moreover, in a Japanese character input device, by performing a flowchart corresponding to the program of FIG. 21 with which the control section 40 of the dictionary retrieval section 15 is provided in the character input device according to the fourth embodiment, when "41281" corresponding to the reading of "Tokyo" is key entered, each time the respective key is operated, hira-kana 83 corresponding to the reading "ta", Chinese character 84 corresponding to the reading "dai", Chinese character 85 corresponding to the reading "taiki", . . . . , Chinese character 87 corresponding to the reading "toukiyou" will be displayed as shown in FIG. 73. In other words, as the first candidate of the table of candidate character corresponding to "4" of the word dictionary 14 is a hira-kana 83 corresponding to the reading "ta", the first candidate of the table of candidate character corresponding to "41" of the word dictionary 14 is a Chinese character 84 corresponding to the reading "dai", the first candidate of the table of candidate character corresponding to "412" of the word dictionary 14 are Chinese characters 85 corresponding to the reading "talki", the first candidate of the table of candidate character corresponding to "4128" of the word dictionary 14 are Chinese characters 86 corresponding to the reading "taikiyo" and the first candidate of the table of candidate character corresponding to "41281" of the word dictionary 14 are Chinese characters 87 corresponding to the reading "toukiyou", converted candidate character or candidate string may be displayed in the said order without any operation of the conversion/next candidate key.

Here, so as to avoid "no candidate character" in the course of entering, a character of the respective row name may be allocated to each numeral of the word dictionary. In this case, as the result of conversion, row name characters will be displayed as shown in FIG. 71. For indicating that it is a conversion result without operation of the conversion/next candidate key. In FIG. 72, as the first candidate of the candidate character table corresponding to a numeral or numeric string of the word dictionary 14 is displayed the display result of a variation example set with a hira-kana code of the authentic first candidate. In other words, the first candidate of the table of candidate character corresponding to "4" of the word dictionary 14 is a hira-kana 91 corresponding to the reading "ta", the first candidate of the table of candidate character corresponding to "41" of the word dictionary 14 are hira-kana 92 corresponding to the reading "dal", the first candidate of the table of candidate character corresponding to "412" of the word dictionary 14 are hira-kana 93 corresponding to the reading "talki", the first candidate of the table of candidate character corresponding to "4128" of the word dictionary 14 are hira-kana 94 corresponding to the reading "taikiyo" and the first candidate of the table of candidate character corresponding to "41281" of the word dictionary 14 are hira-kana 95 corresponding to the reading "toukiyou". Thus, by key entering "41281", each time the respective key is operated, hira-kana 91, 92, . . . , 93 will be displayed as shown in FIG. 72. It is obvious that hira-kana is displayed in response to the key operation without using the conversion/next candidate key and, moreover, the operator may confirm a correct input.

Figure 75:
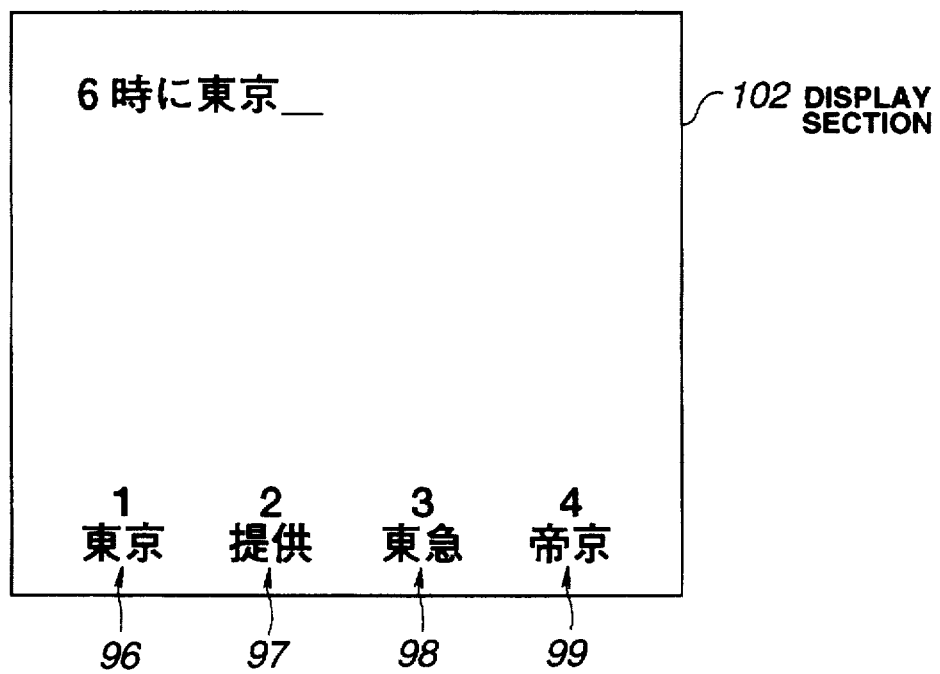
FIG. 75 is a diagram for illustrating the sixth example of the display procedure by the character input device corresponding to Japanese input of the present invention.

Additionally, performing the processing of the flowchart shown in FIG. 25 according to the fifth embodiment, a predetermined number of existing candidates are taken from the word dictionary 14 and output to the retrieval result character output buffer 43 with selected number. Thus, can Chinese characters 96–99 corresponding to the numeric string "41281" are displayed with the numeral 1 to 4 for selection on the display screen of the display section 102 as shown at the bottom of FIG. 7. The control section 40 waits for the input of selection number and when any number is input, confirms that candidate character. If the selection number is not entered, it detects the operation of the next candidate key, and when the next candidate key is operated. Increases the code pointer 42 by the said predetermined number of candidates (four in the example of FIG. 75 above) and proceeds to the retrieval of another candidate. Thus, in this embodiment, when a plurality of candidates exist, they are displayed simultaneously for selection so as to facilitate a rapid decision of candidate characters.

Figure 76:
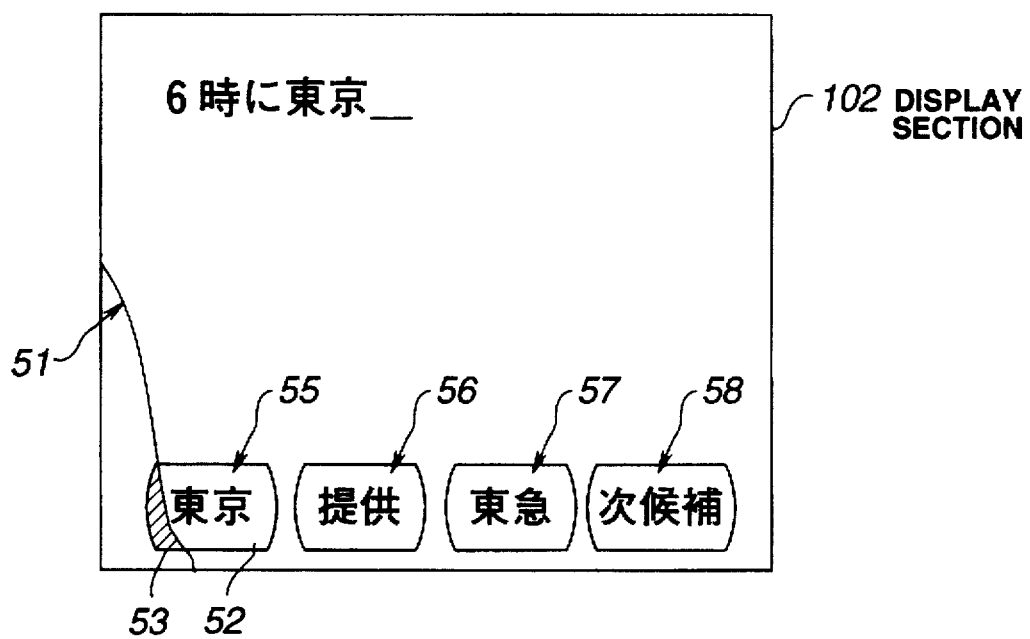
FIG. 76 is a diagram for illustrating the composition of the touch panel, essential part of the character input device according to the character input device corresponding to Japanese input of the present invention, and an example of display thereon.

Moreover, when the composition of the forementioned sixth embodiment to the character input device corresponding to Japanese input, the display control section 17 displays Chinese characters 55 corresponding to "toukyou". Chinese characters 58 corresponding to "teikyou". Chinese characters 57 corresponding to "toukyu" and Chinese characters 58 corresponding to the next candidate at the transparent electrode 52 of the display screen of the display section 102. If the operation of the next candidate is detected, the display pointer is modified. It increases the code pointer 42 by the said predetermined number of candidates (three in the example of FIG. 76 above) and proceeds to the retrieval of another candidate. In other words, if the pointer for displaying the candidate in respect of candidate string of the corresponding table of the word dictionary 14E and the pointer for retrieval of candidate character of the corresponding table of the word dictionary 14 are common, by advancing both of them by three, the next three candidates are taken out and displayed, if they exist. Thus, when a plurality of candidates exist, they are displayed simultaneously for selection on the touch panel 50 so as to facilitate a rapid decision of candidate characters.

Figure 77:
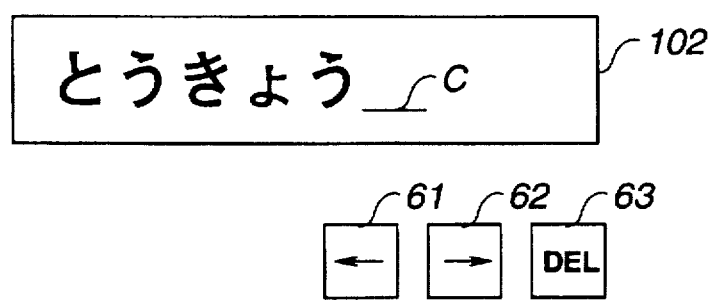
FIG. 77 is a diagram for illustrating the display section and the detail of keyboard, essential parts of the character input device corresponding to Japanese input of the present invention.

In the said character input corresponding to Japanese input, a cursor C is displayed as shown in FIG. 77 for correcting the input character or others as in the composition of FIG. 28 and the keyboard 11 is provided with cursor shift keys 61, 62 and a delete key 63. Here, based on character input and cursor shift keys operation information, the display control section 17 controls the cursor pointer according to the program shown in the flowchart of FIG. 29. In anomaly processing, it is designed to display input numeral or input numeric string so as to ensure the correction at this point. In other words, in anomaly processing, the numeric string set in the string input buffer 41 is delivered to the display control section 17. After the correction, if the conversion/next candidate key is operated, the processing after the step S23 of the flowchart of FIG. 14 will be executed. This allows to correct a miss input appropriately.

In an embodiment of the character input device corresponding to Japanese input adopting the composition of the seventh embodiment, by deleting the last character of a string, for instance, a propositional particle of Japanese or other words attached to a noun, it is expected that it agrees with a candidate character registered in the word dictionary 14. In other words, the input string is corrected automatically even in Japanese input.

Moreover, in an embodiment of the character input device corresponding to Japanese input adopting the composition of the eighth embodiment, miss input keys are replaced by adjacent keys for re-conversion and automatic correction.

Figure 78:
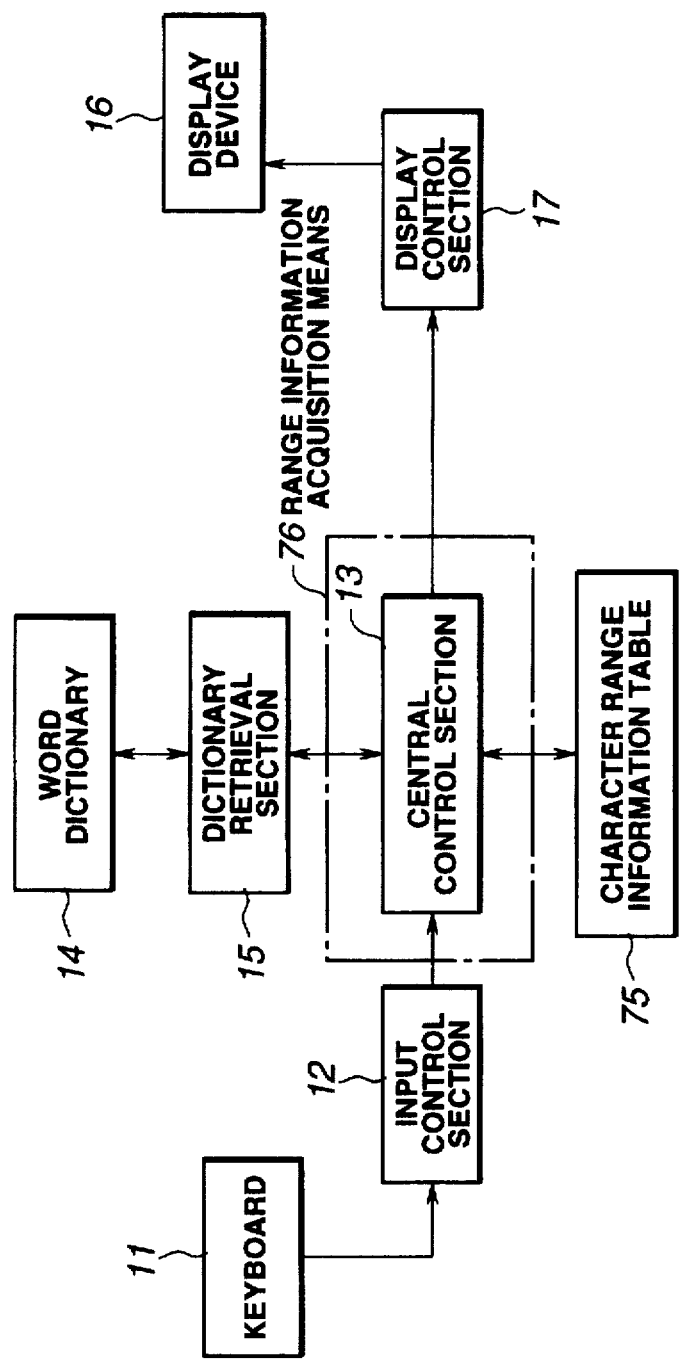
FIG. 78 is a composition diagram of the character input device corresponding to Japanese input of the present invention.
Figures 79, 80:
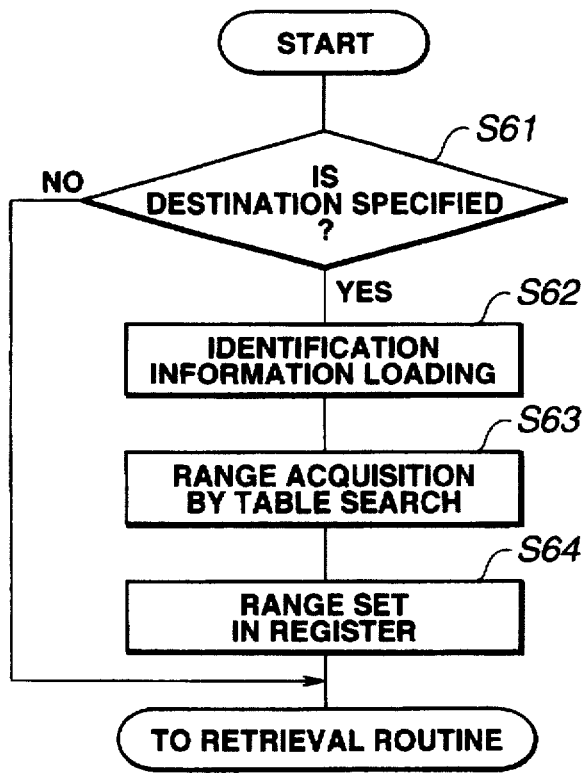
FIG. 79 is a diagram illustrating the inside of the character range information table, essential part of the character input device corresponding to Japanese input of the present invention.
FIG. 80 is a flowchart illustrating the character range information acquisition operation of the character input device corresponding to Japanese input of the present invention.

FIG. 78 is a composition diagram of the character input device corresponding to Japanese input provided with a function to transmit character codes with in the range in response to the capacity of the partner's terminal. That is to say, Japanese may be noted in a plurality of notification including hira-kana, kata-kana, alphabetic notation shown in hira-kana matrix or Chinese character and not all terminals assume all these notifications. In other words, to assume all these notifications, the terminal should be provided with a dictionary for this notification and a pattern memory for patterning this execution code, so it is composed to treat only a desired range of notification considering cost or other factors. In this embodiment, a character range information table 75 is connected to the central control section 13 for storing previously the character range (up to kana, or including Chinese character) which can be treated in response to the identification information (for instance, telephone number) of the terminal as shown in FIG. 79. The central control section 13 constitutes a range information acquisition means 76 for obtaining range information from the character range information table 75 and delivering it to the dictionary retrieval section 15 constituting a character conversion means.

The central control section 13 constituting the range information acquisition means 76 obtains range information by performing the program of the flowchart of FIG. 80, in other words, detects if the interlocutor is specified (S61). In this embodiment, before entering the mode of character input device, it directs to input according to the interlocutor specification by, for instance, a special number for entering the identification information (telephone number) of the terminal. The central control section 13 takes it (S62), retrieves the character range information table 75 for obtaining range information indicating the character range which the corresponding partner's terminal may handle with (S63). Such obtained range information is stored in a register with the said identification information (telephone number) (S64). Thereafter, it proceeds to the retrieval routine of the word dictionary 14.

Figure 81:
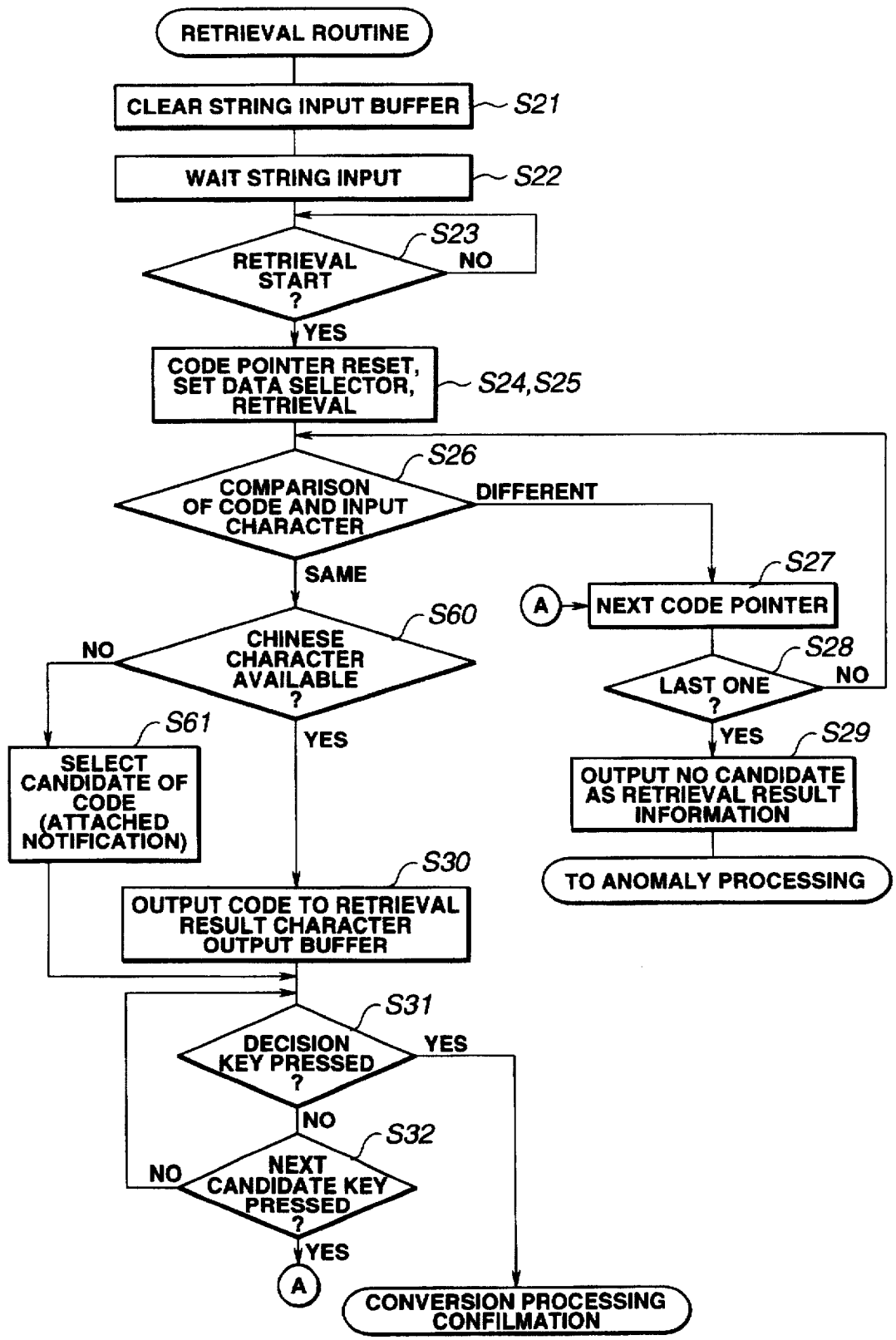
FIG. 81 is a flowchart illustrating the operation of the dictionary retrieval section, essential part of the character input device corresponding to Japanese input of the present invention.
Figure 83:
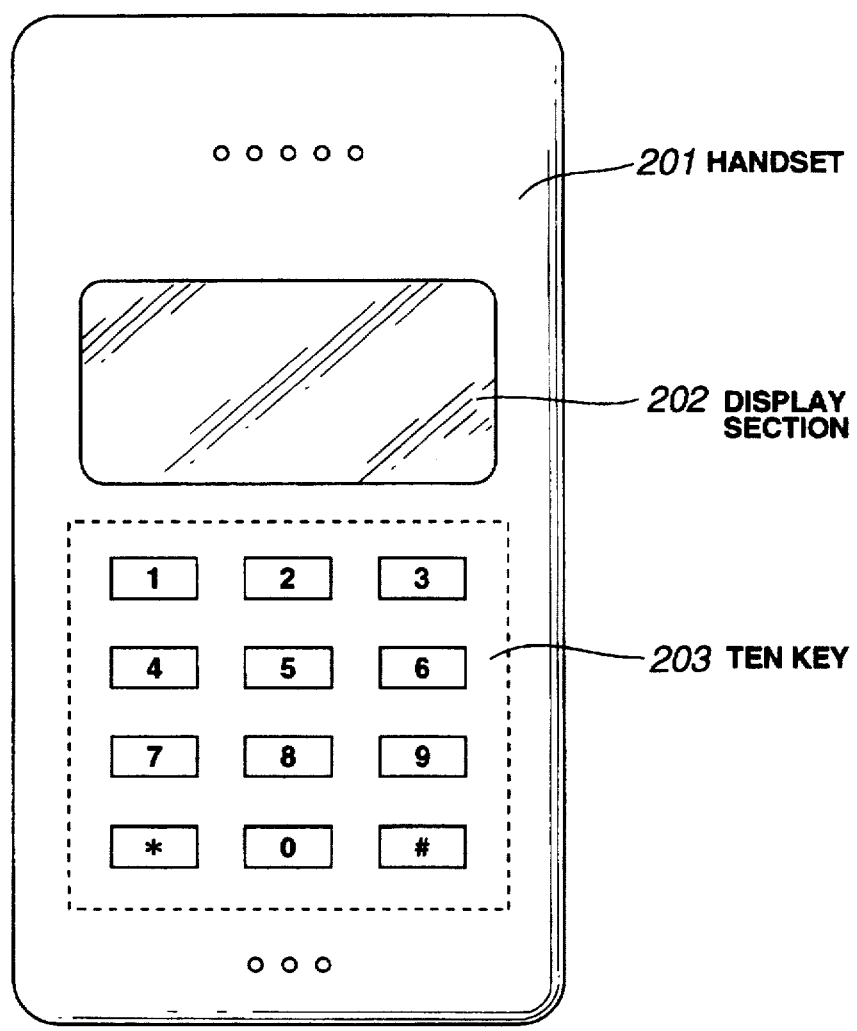
FIG. 83 is a front view of a cellular telephone including the character input device according to the present invention.
Figures 86, 87:
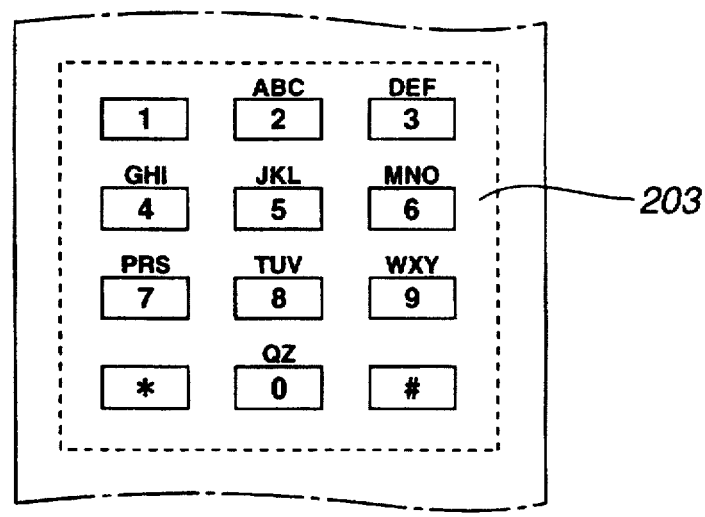
FIG. 86 is a diagram showing a conversion table used for the conventional fixed phrase input.
FIG. 87 is a diagram showing a ten key section of the character input device according to an conversion embodiment.

FIG. 81 is a flowchart corresponding to the program the control section 40 of the dictionary retrieval section 15 in this character input device. In this embodiment, the processing up to the detection of candidate character or candidate string in the step S26 is similar to the first embodiment. But when a candidate is detected, it detects if the partner's terminal can treat Chinese character or not referring to the said register (S60) and if the availability is negative, it selects a candidate in kana code (S61). In this case, Chinese character code may be selected for attached notification. Thus, if the partner's terminal can not deal with Chinese character, candidates in kana are selected (with the attached Chinese character notification if the accompanying notification is available on the embodiment) for display.

When the input character is confirmed as mentioned above, string code and identification information of the partner's terminal stored in the said register are delivered from the character input/output section 7 to the communication control section 6 as shown in FIG. 2 and then call and data transmission will be realized be means of transmission/reception section 3 and antenna 5. Thus, character conversion is realized in response to the capacity of the partner's terminal, appropriate codes are transmitted so as to avoid inability of the processing at the partner's terminal. When identification information not registered in the character range information table 75, it will be processed as if it is impossible to deal with Chinese character. In other word, processing is performed by a lower function to prevent inability of the processing at the partner's terminal.

In this character input device, the range is determined by the ability of Chinese character treatment, however, ranges may be divided by up to numeral, or up to alphabetic notation by hira-kana matrix, or up to non standard character by the same type, or others. In these cases, range information of the table is also subdivided in correspondence. In such case (at it is the case for this embodiment), the dictionary should be composed according to the lower function of treatment. Namely, kana code should be provided for the same word in addition to candidates in Chinese character. Numeric candidate, roman letter candidate are also prepared to constitute a dictionary.

Moreover, while in this embodiment, range information is prepared in advance, the content of this character range information table 75 may be updated. For this, for instance, a special number may direct to update the content of the character range information table 75 for entering a pair of interlocutor identification information and range information. Thus, the central control section 13 updates the content of the character range information table 75. If the identification information concerns the same interlocutor, the information will be substituted and if it concerns a new interlocutor, the information will be newly registered. Additionally, a protocol may be established before the communication with the partner's terminal for obtaining range information by DTMF (dual tone multi frequency) signal or, the switching network may send the range information obtained from the partner's terminal using a control channel. In these cases also, it is possible to transmit advantageously message or other character codes in correspondence with the capacity of the partner's terminal.

Even with a character input device corresponding to Japanese input, it is possible to display a restricted number of candidate character or candidate string for facilitating the selection by including property information in the word dictionary 14 and constituting as shown in FIG. 82. FIG. 82 illustrates a part of the content of the word dictionary 14 composing the dictionary means 310. In correspondence to numeric codes by the operation of the ten key 103, character or string in kana, character of string in Chinese character of others, or property information such a place name, person's name, association name or others concerning candidates of said character or string in Chinese character or others are stored. In this example, only one property information is stored for the candidate of said character or string in Chinese character or others, two or more property information may be stored. For instance, the property "place" may be property "place name" and the property "action" may be attributed to "give me" belonging to the property "general". The practical composition of this word dictionary 14 is as described using FIG. 11 to FIG. 13.

Even when there is a plurality of character or string candidates corresponding to the input numeral or numeric string, only character or string candidates satisfying the specified property information are selected for display by means of the composition and the operation as described referring to FIG. 37 to FIG. 46. Thus the operator may effectively obtain the word of the desired conversion result among relatively restricted number of candidates.

What we claim is:

1. A character input terminal device comprising:

dictionary means for storing character or character string and candidate character corresponding to the character or candidate character string corresponding to the character string;

input means for entering characters or character string including a plurality of keys with which a plurality of characters are associated, a conversion/next candidate key for designating character conversion and a decision key for deciding the designated conversion;

output means for at least displaying and outputting candidate character or candidate character string obtained as a result of conversion; and character conversion means for obtaining candidate character or candidate string by retrieving said dictionary means, with respect to the input character or input character string entered from said input means, and for transmitting this candidate character or candidate character string to said output means.

2. A character input terminal device of claim 1 comprising:

a touch panel provided in the display area of the candidate character or candidate character string output by said output means;

position detection means for detecting the input operation position on this touch panel; and decision means for confirming the conversion result based on the corresponding relation between the result detected by this position detection means and the display position of candidate character or candidate character string.

3. A character input terminal device claimed in claim 1 comprising:

modification means for modifying the input character or input character string, when candidate character or candidate character string can not be obtained in the processing of said character conversion means.

4. A character input terminal device of claim 3 wherein:

the modification means deletes a final character of the input character string so that the input character string is modified.

5. A character input terminal device of claim 3 wherein:

said modification means comprises a candidate table of keys which might be operated erroneously during the key operation and modifies the input characters or input character strings according to said candidate table.

6. A character input terminal device comprising:

dictionary means for storing numeral or numeral string and candidate character corresponding to the numeral or candidate character string corresponding to the numeral string;

input means for entering numeral or numeral string including keys with which a plurality of characters are associated, a conversion/next candidate key for designating character conversion and a decision key for deciding the designated character conversion;

output means for at least displaying and outputting candidate character or candidate character string obtained as the result of conversion; and character conversion means for obtaining candidate character or candidate character string by retrieving said dictionary means, with respect to the input numeral or input numeral string entered from said input means, and for transmitting this candidate character or candidate character string to said output means.

7. A character input terminal device claimed in claim 1 or 6 comprising: code sending means for detecting a code corresponding to a key of the input means to which characters are distributed if said key is operated, and for transmitting said code to the output means.

8. A character input terminal device of claim 6 wherein: when a key of the input means to which characters are distributed is operated, said character conversion means retrieves said dictionary means to obtain candidate character or candidate character string corresponding to the numeral entered, and transmits this candidate character or candidate character string to said output means.

9. A character input terminal device of claim 6 wherein:

said dictionary means stores candidate characters or candidate character strings in a prescribed order, and when a key of said input means to which characters are distributed is operated, said character conversion means retrieves said dictionary means to obtain a first candidate character or candidate character string, and transmits this candidate character or candidate character string to said output means.

10. A character input terminal device claimed in claim 1 or 6, wherein:

said character conversion means retrieves said dictionary means for obtaining candidate character or candidate character string and, if a plurality of candidate characters or candidate character strings are found, transmits these candidate characters or candidate character strings to said output means in a predetermined number for display, and the device further comprises a candidate selection means for selecting one of the plurality of candidate characters or candidate character strings displayed on said output means.

11. A character input terminal device comprising:

dictionary means for storing character or character string and candidate character corresponding to the character or candidate character string corresponding to the character string;

input means for entering characters or character string including a plurality of keys with which a plurality of characters are associated, a conversion/next candidate key for designating character conversion and a decision key for deciding the designated conversion;

output means for at least displaying and outputting candidate character or candidate character string obtained as a result of conversion;

character conversion means for obtaining candidate character or candidate character string by retrieving said dictionary means, with respect to the input character or input character string entered from said input means, and for transmitting this candidate character or candidate character string to said output means;

transmission means for transmitting the confirmed characters or character strings, and range information acquisition means for obtaining range information of character codes which can be processed by a party to be called, wherein said character conversion means retrieves said dictionary means based on the range information of the receiving party terminal obtained from said range information acquisition means.

12. A character input terminal device comprising:

dictionary means for storing character or character string and candidate character corresponding to the character or candidate character string corresponding to the character string;

input means for entering characters or character string including a plurality of keys with which a plurality of characters are associated, a conversion/next candidate key for designating character conversion and a decision key for deciding the designated conversion;

output means for at least displaying and outputting candidate character or candidate character string obtained as a result of conversion;

character conversion means for obtaining candidate character or candidate character string by retrieving said dictionary means, with respect to the input character or input character string entered from said input means, and for transmitting this candidate character or candidate character string to said output means;

transmission means for transmitting the confirmed characters or character string, and range information table for correlating identification information of a party to be called to the range information of the character codes which can be processed, wherein the dictionary means is retrieved by the character conversion means based on the range information obtained from said range information table according to the identification information of the party.

13. A character input device comprising:

dictionary means storing the correspondence of input character or input character string corresponding to candidate character or candidate character string obtained as a result of conversion and attribute information thereof;

input means for entering characters or character strings and necessary information including a plurality of keys to which a plurality of characters are distributed, a conversion/next candidate key for designating character conversion and a decision key for confirming the conversion result;

output means for at least displaying and outputting the candidate character or candidate character string as a result of conversion; and attribute specification means for specifying the attribute of input character or input character strings based on information to be entered from the said input means; and character conversion means for obtaining the candidate characters or candidate character strings corresponding to the specified attribute information specified by said attribute specification means by retrieving the dictionary means, and for supplying said output means with the obtained candidate character or candidate character string, with respect to one of characters corresponding to keys entered by said input means and to character string corresponding to a plurality of keys.

14. A character input device of claim 13 comprising:

instruction content memory for storing the correspondence of a plurality of modes and the instruction content for obtaining the attribute.

wherein the attribute specification means detects the mode in process, and obtains the instruction content corresponding to the detected mode from said instruction content memory, thereby for obtaining the attribute of characters or character strings concerned with the input base on said concerned instruction content.

15. A character input device of claim 13 or 14 comprising:

a cursor displays means for displaying on said output means a cursor position indicating the position of character or character string being input during the input of character or character string;

a cursor position memory storing correlated attribute information of characters or character strings corresponding to the cursor position; and wherein said attribute specification means obtains the attribute of the characters or character strings based on the cursor display position displayed on said cursor display means and the content of said cursor position memory.

16. A character input terminal device claimed in claim 13 or 14 wherein:

said attribute specification means obtains the attribute of the input characters or character strings in accordance with the instruction content of the attribute of the characters or character strings entered from the input means.

17. A character input device comprising:

input means for inputting a character code, and provided with a plurality of keys to which one or more characters is allocated;

sentence head distinction means for distinguishing a sentence head based on code arrangement corresponding to keys entered from said input means;

capitalization means for converting a provided character code into a capital character code and for outputting the converted character code;

output means for at least displaying and outputting the characters corresponding to a provided character code; and switching means for selecting one of outputting the converted character code to said output means through the said capitalization means and outputting the provided character code based on the distinction result from said sentence head distinction means.

18. A character input device of claim 17 wherein:

when one or more space code exists ahead of a character or a period code exists ahead of a return code, the sentence head distinction means determines the character to be the sentence head character.

19. A character input device comprising:

dictionary means for storing input characters or input character strings and candidate characters corresponding to the input characters or candidate character strings corresponding to the input character strings;

input means for entering characters or character strings including a plurality of keys to which a plurality of characters are distributed, a conversion/next candidate key for designating character conversion and a decision key for confirming the designated character conversion;

character conversion means for obtaining candidate characters or candidate character strings by retrieving the said dictionary means, with respect to the input characters or input character strings;

sentence head distinction means for distinguishing the sentence head based on code arrangement corresponding to keys entered from said input means and code arrangement in response to said character conversion means;

capitalization means for converting the obtained character code into a capital character code;

output means for at least displaying and outputting the characters corresponding to the obtained character code; and switching means for selecting one of outputting the converted character code to said output means through the said capitalization means and outputting the obtained character code, depending on the distinction result of said sentence head distinction means.

20. A character input terminal device comprising:

input means for inputting character or character string including a plurality of keys with which a plurality of characters are associated, a conversion/next candidate key for designating character conversion and a decision key for deciding the designated conversion;

dictionary means for storing character or character string and candidate character corresponding to the character or candidate character string corresponding to the character string;

character determining means for determining the stored candidate character corresponding to the input character or for determining the stored candidate character string corresponding to the input character string; and display means for displaying one of the determined candidate character and the determined candidate character string.

21. A character input terminal device comprising:

input means for inputting numeral or numeral string including a plurality of keys with which a plurality of characters are associated, a conversion/next candidate key for designating character conversion and a decision key for deciding the designated conversion;

dictionary means for storing numeral or numeral string and candidate character corresponding to the numeral or candidate character string corresponding to the numeral string;

character determining means for determining the stored candidate character corresponding to the input numeral or for determining the stored candidate character string corresponding to the input numeral string; and display means for displaying one of the determined candidate character and the determined candidate character string.

22. A recording apparatus storing a computer program for use in a character input terminal device including an input unit for inputting character or character string including a plurality of keys with which a plurality of characters are associated, a conversion/next candidate key for designating character conversion and a decision key for deciding the designated conversion; a display unit for displaying character and character string; and a processor for executing the program;

the recording apparatus comprising:

dictionary means for storing character or character string and candidate character corresponding to the character or candidate character string corresponding to the character string;

character determining means for determining the stored candidate character corresponding to the input character or for determining the stored candidate character string corresponding to the input character string; and display controlling means for outputting one of the determined candidate character and the determined candidate character string to the display unit.

23. A recording apparatus storing a computer program for use in a character input terminal device including an input unit for inputting numeral or numeral string including a plurality of keys with which a plurality of characters are associated, a conversion/next candidate key for designating character conversion and a decision key for deciding the designated conversion; a display unit for displaying character and character string; and a processor for executing the program;

the recording apparatus comprising:

dictionary means for storing numeral or numeral string and candidate character corresponding to the numeral or candidate character string corresponding to the numeral string;

character determining means for determining the stored candidate character corresponding to the input numeral or for determining the stored candidate character string corresponding to the input numeral string; and display controlling means for outputting one of the determined candidate character and the determined candidate character string to the display unit.

24. A character input terminal device comprising:

input means for inputting character or character string including a plurality of keys with which a plurality of characters are associated, a conversion/next candidate key for designating character conversion and a decision key for deciding the designated conversion;

dictionary means for storing character or character string and candidate character corresponding to the character or candidate character string corresponding to the character string;

character determining means for determining the stored candidate character corresponding to the input character or for determining the stored candidate character string corresponding to the input character string; and display means for displaying one of the determined candidate character and the determined candidate character string;

wherein the dictionary means stores the candidate character selected from each one of characters associated with each operated key, and the candidate character string selected from each one of character strings associated with each set of operated keys.

25. A character input terminal device comprising:

input means for inputting numeral or numeral string including a plurality of keys with which a plurality of characters are associated, a conversion/next candidate key for designating character conversion and a decision key for deciding the designated conversion;

dictionary means for storing numeral or numeral string and candidate character corresponding to the numeral or candidate character string corresponding to the numeral string;

character determining means for determining the stored candidate character corresponding to the input numeral or for determining the stored candidate character string corresponding to the input numeral string; and display means for displaying one of the determined candidate character and the determined candidate character string, wherein the dictionary means stores the candidate character selected from each one of characters associated with each operated key, and the candidate character string selected from each one of character strings associated with each set of operated keys.

* * * * *